(12) United States Patent
Doken

(10) Patent No.: US 11,914,765 B2
(45) Date of Patent: Feb. 27, 2024

(54) SYSTEMS AND METHODS FOR DISPLAYING AND ADJUSTING VIRTUAL OBJECTS BASED ON INTERACTIVE AND DYNAMIC CONTENT

(71) Applicant: Rovi Guides, Inc., San Jose, CA (US)

(72) Inventor: Serhad Doken, Bryn Mawr, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/674,559

(22) Filed: Feb. 17, 2022

(65) Prior Publication Data
US 2023/0259202 A1 Aug. 17, 2023

(51) Int. Cl.
| | |
|---|---|
| G06F 3/01 | (2006.01) |
| G06T 19/00 | (2011.01) |
| G06T 19/20 | (2011.01) |
| G06T 13/00 | (2011.01) |

(52) U.S. Cl.
CPC .............. *G06F 3/013* (2013.01); *G06F 3/017* (2013.01); *G06T 13/00* (2013.01); *G06T 19/006* (2013.01); *G06T 19/20* (2013.01)

(58) Field of Classification Search
CPC .............................. G06T 19/006; G06F 3/013
See application file for complete search history.

(56) References Cited

U.S. PATENT DOCUMENTS

| | | | |
|---|---|---|---|
| 9,854,315 B1 | 12/2017 | Trollope et al. | |
| 9,875,313 B1 | 1/2018 | Cierniak et al. | |
| 11,269,967 B1 | 3/2022 | Voss | |
| 11,321,886 B2 | 5/2022 | Wang et al. | |
| 2008/0313567 A1 | 12/2008 | Sabin et al. | |
| 2016/0026253 A1* | 1/2016 | Bradski | ................ H04N 13/128 345/8 |
| 2016/0225012 A1 | 8/2016 | Ha et al. | |
| 2018/0253145 A1 | 9/2018 | Swaminathan et al. | |
| 2018/0336591 A1 | 11/2018 | Neumeier | |
| 2020/0026922 A1* | 1/2020 | Pekelny | ................ G06T 19/006 |
| 2020/0388177 A1* | 12/2020 | Recker | .................... G06F 3/011 |

(Continued)

OTHER PUBLICATIONS

ARObjectAnchor, https://developer.apple.com/documentation/arkit/arobjectanchor, retrieved on Mar. 2, 2022.

(Continued)

*Primary Examiner* — Shivang I Patel
(74) *Attorney, Agent, or Firm* — Haley Guiliano LLP

(57) ABSTRACT

Systems and methods for overlaying virtual objects in a virtual environment based on user interest and user interactions are disclosed. The methods analyze a live view of a surface viewed through camera or a transparent lens and determine if the policies of the surface allow overlaying of virtual objects. The method fetches a virtual object and calculates a score based on user interest, user gaze, and user engagement. Virtual objects that meet the policies of the surface and a scoring criterion are overlayed on the surface in the virtual environment and enhanced based on a plurality of enhancement factors. Virtual objects are also overlayed in frames of a live broadcast based on their scores. Virtual objects displayed on a conference call interface, which may be meeting tools or icons associated with other conferencing functionality, are enhanced, or removed from the user interface based on their utilization.

22 Claims, 36 Drawing Sheets

(56) References Cited

U.S. PATENT DOCUMENTS

2021/0398316 A1* 12/2021 Panse .................... G06T 19/006
2022/0377403 A1    11/2022 Lu et al.
2023/0259249 A1     8/2023 Doken
2023/0260219 A1     8/2023 Doken

OTHER PUBLICATIONS

ARParticipantAnchor, https://developer.apple.com/documentation/arkit/arparticipantanchor, retrieved on Mar. 2, 2022.
ARWorldMap, https://developer.apple.com/documentation/arkit/arworldmap, retrieved on Mar. 2, 2022.
Camera, Lighting, and Effects, https://developer.apple.com/documentation/arkit/camera_lighting_and_effects, retrieved on Mar. 2, 2022.
Creating a Multiuser AR Experience, https://developer.apple.com/documentation/arkit/creating_a_multiuser_ar_experience, retrieved on Mar. 2, 2022.
Environmental Analysis, https://developer.apple.com/documentation/arkit/environmental_analysis, retrieved on Mar. 2, 2022.
U.S. Appl. No. 17/674,561, filed Feb. 17, 2022, Serhad Doken.
U.S. Appl. No. 17/674,563, filed Feb. 17, 2022, Serhad Doken.

* cited by examiner

Display Space Allowance / Restrictions

| Space | Dimension | Allowance / Restriction | Types of items allowed |
|---|---|---|---|
| Space 1 | 12 x 18 Inches | Allowed | Conform to policy |
| Space 2 | 8 x 12 Inches | Restricted | No displays allowed |
| Space 3 | 14 x 10 | Allowed with conditions | Can only display items if related to Macy's |
| Space 4 | 5 x 5 Inches | Allowed | Movie titles from the local movie theater |
| Space 5 | 6 x 8 | Restricted | No displays allowed |

FIG. 10

SYSTEMS AND METHODS FOR DISPLAYING AND ADJUSTING VIRTUAL OBJECTS BASED ON INTERACTIVE AND DYNAMIC CONTENT

FIELD OF INVENTION

Embodiments of the present disclosure relate to displaying, adjusting, and enhancing virtual objects, such as in an augmented or virtual reality, live streaming, or video conferencing environment, based on interactive and dynamic content.

BACKGROUND

Virtual objects are being used on virtual or physical surfaces for information augmentation, presentation, animation or simply to attract engagement. Gaining user attention is greatly sought after by media industry. Use of virtual objects is rapidly becoming one of the most frequently used mediums to gather attention and increase, and ultimately monetize, engagement. One way to attract and retain attention through use of virtual objects is to adjust and adapt their representation to fit the context in which they appear. Current methods of using virtual objects are mostly static and do not bend into the shape or form of the environment to dynamically attract and keep the user's attention. Instead, they become one of many virtual objects on a screen and create clutter instead of gaining focused and sustained attention.

With the current use of virtual objects, methods may overlay the virtual object without considering where they are overlayed. Overlaying the virtual object without accounting for the environment may cause a variety of problems. For example, some parties may object to where the virtual object is overlayed. Also, if the virtual object is overlayed on a portion of the surface that has shapes, contours, or curvatures that are not suitable for the virtual object, the effect may be unrealistic or awkward. Or the virtual object may not be visible due to the background shapes, contours, colors or patterns.

Randomly displaying virtual objects without an understanding of the viewer's interest, including their current needs, may also cause an issue that is unaddressed by the current methods. If the virtual object is not relevant to the viewer or does not address the viewer's current needs, the likelihood of gaining and keeping the user's attention may be minimal.

Virtual objects may also be displayed in a virtual conference call setting. In part because virtual conference calling has become easier and more common through a variety of online conferencing options, such as Zoom™, Google Meet™, and Microsoft Teams™, individuals are spending more time than ever before interacting with virtual objects displayed on their conference calling interfaces. The use of virtual objects in a conference call setting includes displaying conferencing tools and features, such as share screen, chat, closed-caption, zoom, voice-to-text processing and more.

An issue with the current use of virtual objects displayed in a conference call setting is that some of them may not be used or needed by the participants, but they may still be displayed, taking up display space and causing clutter. This may be because the virtual objects may have been displayed without an understanding of the participant needs and current utilization. The resultant clutter may make it hard for the participant to easily locate a virtual object that they do want to use.

Likewise, in yet another setting, such as a live broadcast, virtual objects may be used without proper understanding of the underlying context or without determining the user's interest. Again, this may result in not gaining the viewer's attention.

Thus, there is a need for better systems and methods for understanding surfaces, context, and the user/viewer/participant's interest and needs, including changing needs and utilization in real time. The disclosed systems and methods enable overlaying of virtual objects in a customized manner that is likely to get the user/viewer/participant's attention and retain it.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 10 is a block diagram of virtual objects (purses) overlayed in a virtual environment on a storefront, in accordance with some embodiments of the disclosure;

DETAILED DESCRIPTION

Figure 1:
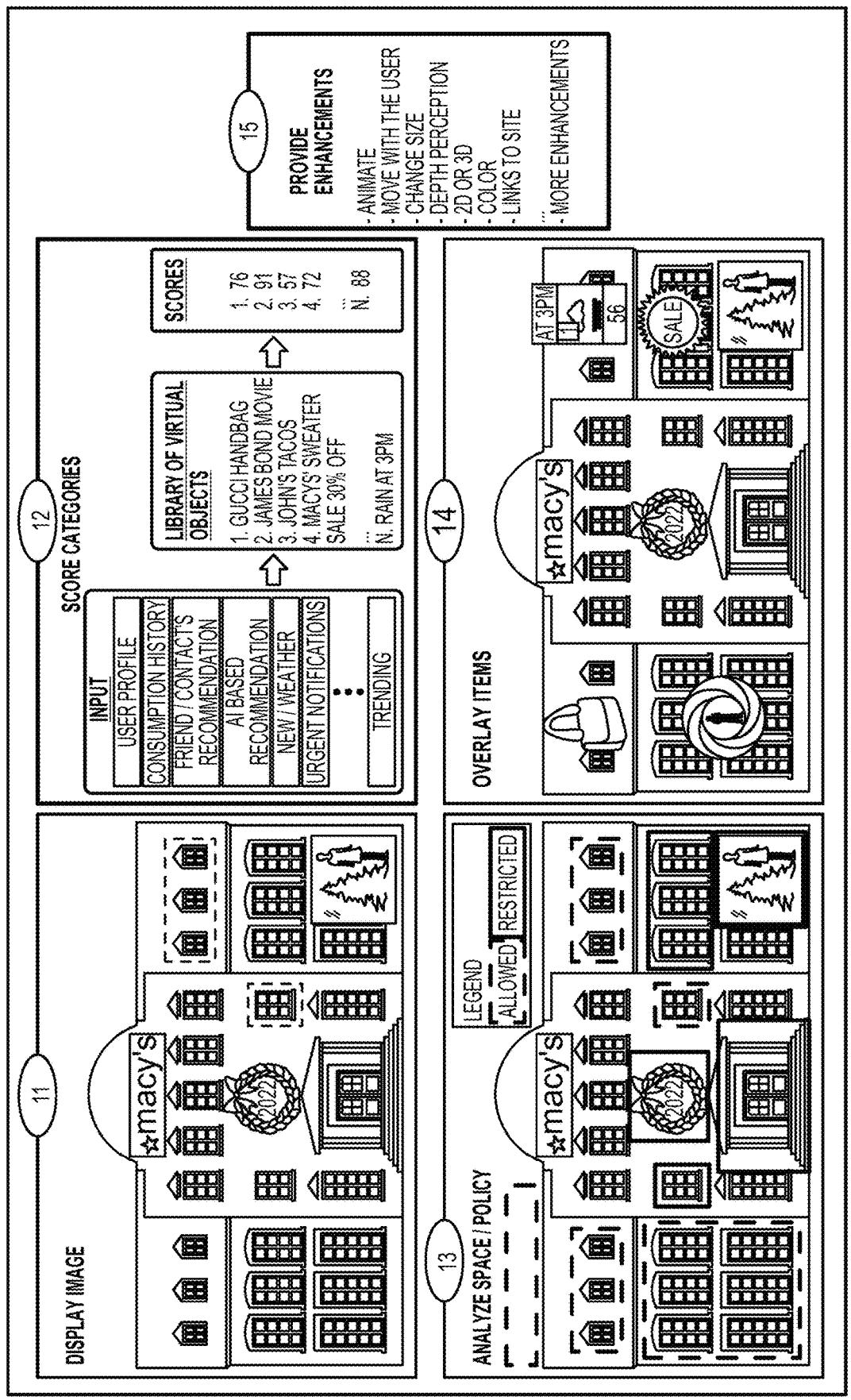
FIG. 1 is a block diagram of a process for overlaying and enhancing virtual objects on a surface in a virtual environment, in accordance with some embodiments of the disclosure.

In accordance with some embodiments disclosed herein, the above-mentioned limitations are overcome by overlaying virtual objects and adjusting or enhancing them to address the real-time contextual/environmental parameters that are being communicated, such as the user's current needs, utilization, and interactions with the virtual object; the aggregated interests of a group; and collected input from a viewing audience.

The embodiments disclosed also utilize systems and methods for analyzing and understanding underlying surfaces; scoring virtual objects; analyzing policies; overlaying virtual objects; providing virtual object enhancements; detecting live broadcast transmissions; identifying virtual objects in a live broadcast or in an on-demand media asset; obtaining comments posted by viewers; overlaying virtual objects in a frame of a live broadcast or in an on-demand media asset; identifying users of a conference call; identifying icons and all tools, functions, and functionalities displayed on an interface of a participant of a conference call; accessing components of electronic devices, such as cameras, gyroscopes, accelerometers, or heart rate monitors; enhancing or removing tools, functions, and functionalities displayed on an interface of a participant of a conference call; invoking an artificial intelligence (AI) or machine learning (ML) algorithm to perform an analysis on any of the above-mentioned data; accessing the user's consumption history; gauging the user's interest in a virtual object; accessing virtual, mixed, or augmented reality headsets and their displays; animating virtual objects; and other processes and functionalities discussed herein.

In one embodiment, a process for overlaying a virtual object on a surface and enhancing the virtual object based on interactive and dynamic content is disclosed. The process includes detecting a live image of a surface, determining surface policies, obtaining a plurality of virtual objects that align with user interests, scoring the virtual objects and selecting a certain number of virtual objects based on the score, displaying the selected virtual objects if they comply with the surface policies, and enhancing the virtual objects based on interactions, needs, and utilization of the user.

In one embodiment, a live image on a display, such as an image of a structure, for example a storefront, a monument, or a bridge; a moving object such as a car, train, ship, or plane; or an object such as a Christmas tree, a billboard, or a wall of a building, is detected, and the underlying surface is analyzed. The display may be on a display screen of the viewing device or may be viewed through see-through glass of the viewing device, such as smart glasses. Characteristics of the displayed surface, such as different portions or zones of the displayed surface, depth, and different shapes and contours of the surface, may be analyzed, and the resulting data may be used to make determinations of where to overlay or superimpose a virtual object on the surface in the virtual environment.

In an embodiment, the viewing device may include one or more modules, such as a scene analyzer, surface analyzer, AR engine, score calculator, rendering unit, and user analyzer for performing analysis and other functions to select, display, and enhance the virtual object.

In one embodiment, the scene analyzer, surface analyzer, and AR engine may be utilized to determine the surface policies, which may include locations on the surface where a virtual object can be overlayed and restrictions, rules, and guidelines that need to be followed for overlaying the virtual object. For example, these may include the type of virtual object allowed for overlay, the duration of display of the virtual object, and the size and dimensions of the virtual object.

In one embodiment, the virtual objects may be obtained from a database, a library of virtual objects, or a plurality of Internet and third-party sources. The virtual objects obtained may be based on user interest. Such interest may be determined based on the user profile. It may also be determined based on the user's consumption history, recommendations made to the user by other users, recommendations made based on analysis performed by an artificial intelligence algorithm, urgent notifications, weather notifications, or items that are trending and popular.

Based on user interest, a plurality of virtual objects that can potentially be overlayed may be identified and scored. The score calculation, in one embodiment, may be performed by a scoring engine. The calculation may involve analyzing each virtual object in the library and applying a variety of formulas, weighted averages, means, and other calculations to determine a score. For example, in one embodiment, a score may be calculated based on a predetermined value times a component of user interest, e.g., a*seconds of gaze+b*verbal comments+c*heart rate delta+d*seconds of interaction with object+e*timing of the gaze+f*order of gaze with respect to other virtual objects+g*number of repeating gazes+h*magnitude of body movement change. Score may also be calculated based on relevance and context, urgency, and other factors.

Once scored, one or more virtual objects from all the virtual objects identified may be selected. The selection may be based on the highest score, the most relevant score, or the virtual objects associated with the most current need. The selection may also be based on a promotion of the "virtual object" that may be displayed in higher priority by the system owner. The selected virtual objects may be overlayed on the surface based on restrictions, rules, and guidelines of the surface policies.

In one embodiment, the overlayed virtual object may be enhanced based on interactive and dynamic content received by the control circuitry from the user, group of users, or collective viewers. As referred to herein, enhance, enhancing, graphically emphasizing, are used interchangeably and mean the same. Likewise, not enhancing is also referred to herein as de-emphasizing. Such interactive and dynamic content may include user's gaze, user's continued or repeated gaze at the virtual object, user interaction with the displayed virtual object, and user comments or other actions that can be associated with user interest in the virtual object. Examples of such enhancement include animating the virtual object, moving or orienting the virtual object in accordance with the movement of the user associated with the viewing device, changing the size of the virtual object, changing the depth perception or displaying the virtual object either in a 2D or a 3D manner, changing the color of the virtual object, providing links to a website embedded in the virtual object, and other enhancements.

In another embodiment, the disclosed methods may overlay comments or virtual objects on a live or on-demand transmission on a media device. In this embodiment, a live stream or an on-demand stream of a media asset may be displayed on a media device, such as a television, laptop, or a mobile device, and a frame of the live broadcast may be analyzed to identify a plurality of virtual objects and their contexts.

For the virtual objects identified in the live transmission, the control circuitry may calculate a score for each virtual object where the score may be related to the number of comments posted about each virtual object by viewers currently watching the live transmission. The control circuitry may access such comments and related data based on crowdsourcing or access to platforms that provide such data. The control circuitry may also calculate a score for each of the virtual objects identified based on user interest, prior consumption history of the user in which transmissions relating to similar categories were displayed, recommendations made by other users associated with the user viewing the live transmission, or recommendations made by an AI engine based on execution of an AI algorithm. A variety of formulas and weighted averages may also be used to calculate the score, such as the formula described above. The score may also reflect a combination of user interests and input from other viewers.

The control circuitry may select one or more virtual objects from the plurality of virtual objects identified in the live transmission based on the calculated score. Comments relating to the selected virtual objects may be obtained and overlayed on the frame of the live transmission based on comments that score the highest or are the most relevant. The control circuitry may execute an artificial intelligence algorithm to aggregate and group comments of similar nature.

In another embodiment, a process for enhancing or removing virtual objects from a conference session based on interactive and dynamic content received is disclosed. In this embodiment, users of a conferencing session may be identified, and an inward-facing or front-facing camera may be accessed to determine their gaze at a user interface populated with virtual objects. In some embodiments, the user may be using a conferencing user interface such as Zoom™, Microsoft Teams™, Google Meet™, Slack™, or some other conferencing interface that displays virtual objects, such as conferencing tools (e.g., calendar, video, contacts, chat, notepad) and virtual objects, such as Microsoft™ Word and PowerPoint documents.

In one embodiment, the control circuitry may access the inward-facing camera to determine the gaze of each user by tracking their eyeball movement to determine if they are looking at any one or more displayed virtual objects. In another embodiment, engagement with the virtual object, such as selecting of the virtual object with a mouse, hovering over the virtual object, or recent use of the application that is associated with the virtual object may also be assessed. In response to the analysis, i.e., whether the user has gazed at the virtual object or engaged/interacted with it, the control circuitry may determine which objects are important and being utilized, or likely to be utilized, in the conferencing session and which virtual objects are not of interest or are underutilized. In addition to gaze, the features described can be also controlled via configuration parameter to turn it on/off or other granular options in between.

In one embodiment, based upon the engagement and utilization of the virtual objects, which were determined based on gaze, interaction, and/or recent use of the virtual object and its underlying application, and similar means, the control circuitry may enhance or remove a displayed virtual object from the user interface of either a specific user or of all users of the conferencing session. In one embodiment, if a user is engaged with only one specific virtual object, then that virtual object may be enhanced and other virtual objects on the user's screen may be removed or minimized to reduce clutter. The virtual object may also be removed or minimized on the user interfaces of other users of the conference that are not engaged with the virtual object. The enhancements may include enlarging the virtual object, highlighting it, changing the opacity, or making other enhancements to display it more prominently than another virtual object with which the user is not engaged. In one embodiment, if a majority of users are engaged with the virtual object, then the system may view the virtual object as important to the conferencing session and still enhance the virtual object despite not all the users of the conference engaging with it.

Although video conferencing is used as an example, the methods also apply to other content delivery and two-way interactive systems, such as to any (one way or interactive) video streaming application such as Twitch™, YouTube™, (MMPOG—Massively Multi Player Online Game) Cloud Gaming etc.

FIG. 1 is a block diagram of an example of a process for overlaying a virtual object on a surface and enhancing the virtual object based on interactive and dynamic content, in accordance with some embodiments of the disclosure.

In one embodiment, at block 11, a live image of a surface is displayed. The surface may be a structure such as a storefront, a monument, or a bridge; a moving object such as a car, train, ship, or plane; an object such as a Christmas tree, a billboard, or a wall of a building, or any other physical surface. In another embodiment, in a virtual reality, augmented reality, and mixed reality context, the surfaces/planes that the virtual objects are placed can be virtual surface. An example is a virtual digital twin of CGR (Computer Generated Reality) rendered Macy's. Moreover, physical surfaces can be indoors. In that case, a tabletop, piece of furniture or a wall are examples of indoor physical surfaces that are also contemplated in the embodiments.

In one embodiment, the live image is viewed through a portable electronic device. In one embodiment, the portable electronic device may be a mixed reality, augmented reality, or virtual reality device that includes a camera and a display to obtain and display the live image of the physical surface. In another embodiment, the portable electronic device may be a wearable device, such as smart glasses with control circuitry, that allows the user to see through a transparent glass to view the surface. In yet another embodiment, the portable electronic device may be a mobile phone having a camera and a display to intake the live feed input and display it on a display screen of the mobile device. The devices mentioned may, in some embodiments, include both a front-facing or inward-facing camera and an outward-facing camera. The front-facing or inward-facing camera may be directed at the user of the device while the outward-facing camera may capture the live images in its field of view. The devices mentioned above, such as smart glasses, mobile phone, virtual reality headset, and the like, for sake of simplification, are herein referred to as viewing devices or portable electronic devices.

In a scenario where the mobile phone or other electronic device's front-facing camera is not turned on, reading/measurements from front sensors such as ultrasound, radar, proximity and ambient sensors can be used alternatively to determine user interest in the virtual object.

As depicted in block 11, in one embodiment, a front facade of a store or building, such as Macy's store, is either displayed on the display screen of the viewing device or viewed through a see-through eyeglass of the viewing device, such as smart glasses. The viewing device includes control circuitry that can analyze the displayed space and determine characteristics of the displayed space. Characteristics of the displayed surface, such as different portions or zones of the displayed surface, depth, and content, and items within each portion of the displayed space, such as windows or a window display, and different shapes and contours of the surface, may be analyzed, and the resulting data may be used to determine where to overlay or superimpose a virtual object on the displayed/viewed physical surface.

At block 12, the viewing device may receive an input from one or more databases for a virtual object that can be displayed in the virtual environment as an overlay on the surface of the physical image. The overlay or superimposition of the virtual object may be displayed only on the display of the viewing device, such as the display of a mobile phone or the transparent glass of a smart glass or wearable device, such that it provides a feeling as if the virtual object is actually displayed on the physical surface.

In one embodiment, one of the inputs for selecting a virtual object may be based on the profile of the user associated with the viewing device. In this embodiment, the viewing device may access a profile of the user from a database to gauge the user's interest(s) and select a virtual object that aligns with the user interest to display on the surface of the physical image in the virtual environment.

In another embodiment, inputs for selecting a virtual object may be based on the user's consumption history, recommendations made to the user by other users, recommendations made based on analysis performed by an artificial intelligence algorithm, urgent notifications, weather notifications, or items that are trending and popular.

Figure 26:
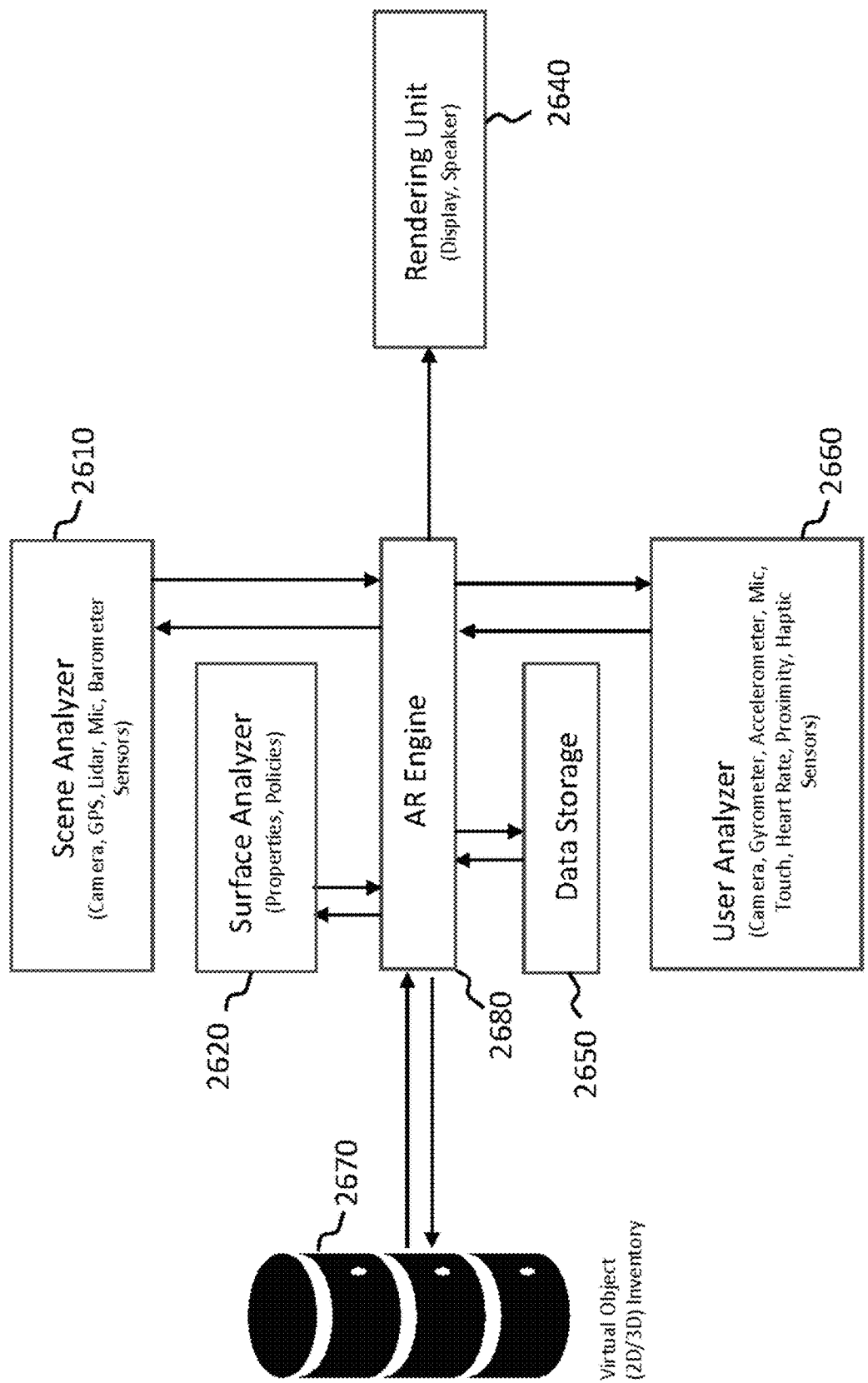
FIG. 26 is a block diagram of various modules of a system for rendering a virtual object on a surface, in accordance with some embodiments of the disclosure.

In one embodiment, the viewing device may include one or more modules, such as a scene analyzer, surface analyzer, AR engine, score calculator, rendering unit, and user analyzer, such as those displayed in FIG. 26, for performing analysis and other functions to select, display, and enhance a virtual object. The modules may be connected and operated through control circuitry, such as control circuitry 3420 of FIG. 34. In another embodiment, the viewing device may be communicatively connected to a server and/or other distributed devices that collectively include such modules and perform the analysis and other functions that can be accessed by the viewing device to make virtual object selection, display, and enhancement decisions. The modules, whether on the server or distributed devices, may be connected and operated through control circuitry, such as control circuitry 3420 of FIG. 34.

In one embodiment, at block 12, once one or more virtual objects from a plurality of inputs have been accessed and identified, the list of identified virtual objects may be stored in a library. A scoring engine may be used to analyze each virtual object in the library and calculate a score based on context and user interest. A variety of formulas, weighted averages, means, and other calculations may be performed to determine a score for each virtual object. For example, in one embodiment, a score may be calculated based on a predetermined value times a component of user interest, e.g., a\*seconds of gaze+b\*verbal comment+c\*heart rate delta+ d\*seconds of interaction with object+e\*timing of the gaze+ f\*order of gaze with respect to other virtual objects+ g\*number of repeating gazes+h\*magnitude of body movement change. Scores may also be calculated based on relevance and context, urgency, and other factors.

As depicted in block 12, in one example, the scoring engine may calculate a score of 76 for a Gucci handbag. The scoring engine may also calculate a score of 91 for a James Bond movie that is playing at a theater within a threshold distance of the physical surface. The distance can be measured via the local sensors (GPS, Cell ID) of a physical device. Or if the surface is a virtual distance, distance can be calculated by analyzing the 3D model of the virtual world and how the virtual object and other virtual locations/ contextual objects are positioned with respect to each other.

The scoring engine may also calculate a score of 57 for John's Tacos which is located within a threshold distance from the physical surface, a score of 72 for a Macy's sweater sale that is 30% off and contextually related to the physical image of Macy's displayed or seen through the viewing device, and a score of 88 for a weather forecast of rain at 3:00 PM. The control circuitry 3420 of the viewing device, server, or distributed devices may be utilized to rank and order the virtual objects in terms of the calculated score. For example, the James Bond movie receiving the highest score of 91 may be ranked at the top of the list, with the rain forecast with a score of 88 as second on the list. The ranking and order may be used by the control circuitry in determining which virtual object to overlay on the surface: virtual objects with the highest rank and order may be given priority.

Figure 34:
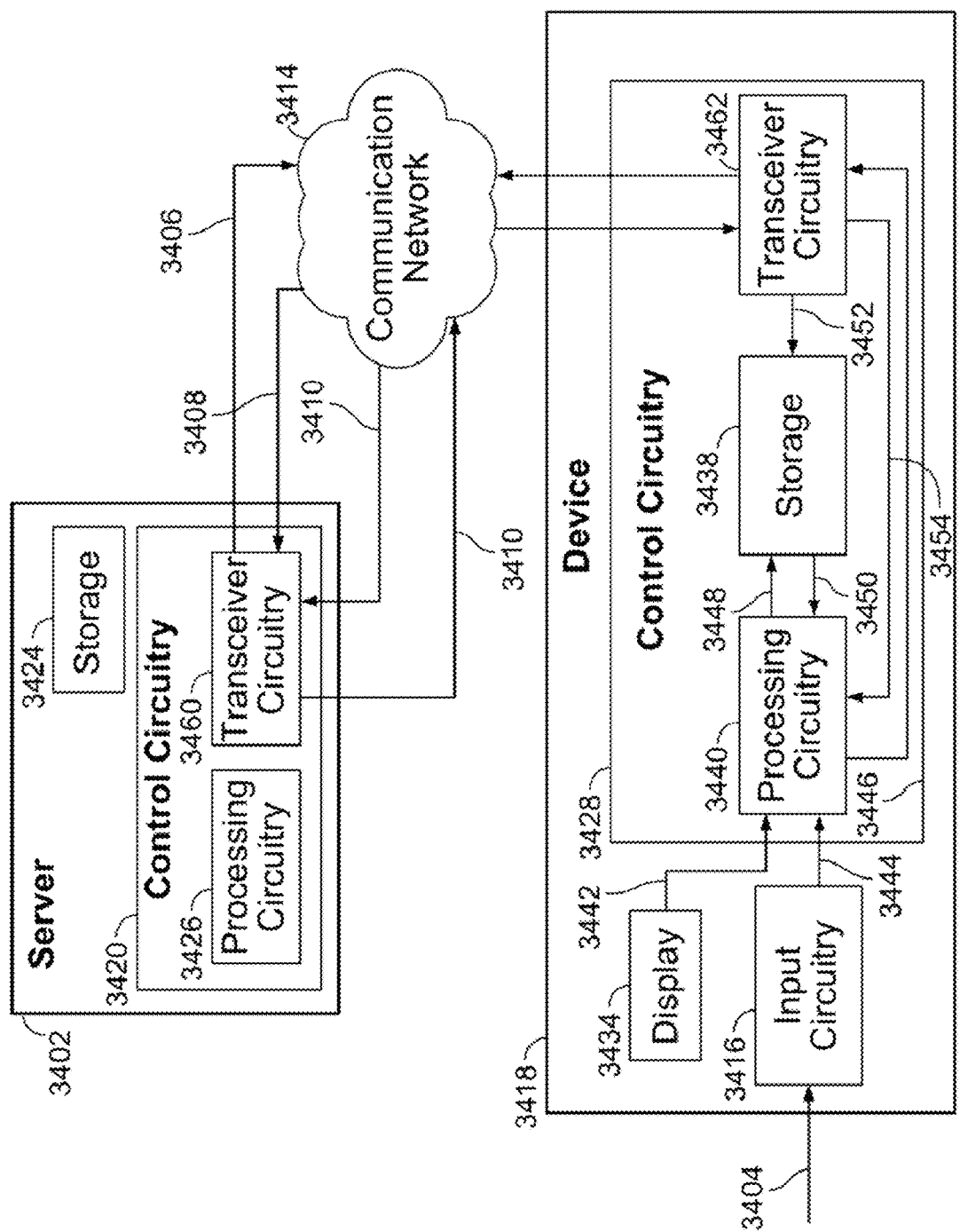
FIG. 34 is a block diagram of an exemplary system for providing interactivity tools for engagement with a media asset, in accordance with some embodiments of the disclosure.

At block 13, the control circuitry, such as control circuitry 3420 of FIG. 34, may analyze a policy associated with the displayed physical image. The policy may include a plurality of sections or sub-policies that relate to different requirements. For example, the policy may have a section or sub-policy that relates to space restrictions where virtual objects can be overlayed, type restrictions on what type of virtual object is allowed to be overlayed, contextual guidelines, timing and duration permissions and restrictions on what times and how long a virtual object can be posted, paid advertising rules and regulations, and other requirements and permissions. In some instances, when a policy is not desirable to the user or a group of users, they may send a request to the surface owner to change the policy. When the number of users is a large quantity, the may demand to change surface policy. For example, if a large number of users want to see the virtual object even bigger, more space than regularly allotted by the surface policy, they may request for allotment of larger space and change in the policy to allow them to post the bigger virtual object.

For example, as shown in the example of block 13, the control circuitry 3420 may access a space and dimensions section or sub-policy of "Macy's" store policy for overlaying the virtual object. The space and dimensions section may lay out portions and zones of the physical surface where a virtual object can be overlayed in the virtual environment. As depicted in block 13, the space and dimension section may outline areas in blue color where a virtual object is allowed to be overlayed and red color areas where Macy's restricts a third party from overlaying a virtual object. The space and dimension policy may either identify the allowed and restricted areas by color, or it may use some other form of notification such as highlighting, shading, or just providing coordinates and dimensions of areas where a virtual object can be overlayed and where it is restricted. The policy may also include certain zones or portions of the physical image where a virtual object is allowed to be posted as long as it meets certain conditions, such as overlaying a virtual object that relates contextually to Macy's. For example, Macy's may define contextual relationships to be location, weather, product, or other active news going on currently within a threshold distance.

Figure 14:
FIG. 14 depicts a virtual object enhanced in size, in accordance with some embodiments of the disclosure.

At block 14, once a virtual object meets the requirements set forth in the policy, such as the Macy's policy in block 13 or the policy posted by the owner of the physical surface, the control circuitry may overlay the virtual object in a manner and at a location on the physical surface, in the virtual environment, that is allowed by the policy. In one embodiment, since the James Bond movie, Gucci handbag, Macy's sweater sale of 30% off, and weather forecast scored the highest in the list of virtual objects, the control circuitry 3420 may decide to overlay one or more of these virtual objects over the allowed areas of the surface as depicted in block 14. The control circuitry may determine whether to overlay one or more virtual objects at the same time. The overlayed virtual objects may be of the same type or of different types. For example, in one embodiment, the control circuitry may overlay a few types of Gucci purses. It may also overlay another brand of bags that may be an alternative to a Gucci™ purse, such as Michael Kors™ purses, over the allowed areas of the surface, as depicted in FIG. 14. In another embodiment, the virtual object overlayed may be of different types and based on the score. As depicted in block 14, a variety of virtual objects are overlayed in the allowed blue-colored sections on the physical image.

At block 15, the displayed virtual object may be enhanced based on interactive and dynamic content received by the control circuitry. Examples of such enhancement include animating the virtual object, moving or orienting the virtual object in accordance with the movement of the user associated with the viewing device, changing the size of the virtual object, changing the depth perception or displaying the virtual object either in a 2D or a 3D manner, changing the color of the virtual object, providing links to a website embedded in the virtual object, and other enhancements as listed in FIG. 13.

In one embodiment, the enhancements may be based on interactive content received by the control circuitry. For example, if a user continues to gaze at the displayed virtual object, or interacts with the displayed virtual object, the control circuitry 3420 may enlarge the virtual object or enhance its appearance by making it more pronounced. The control circuitry may also bring the virtual object closer to the eyes of the user by changing its depth perception in the virtual environment. Based on the engagement and interaction with the virtual object, which may be indicative of the user's interest in the virtual object, the enhancements may be more pronounced such that the virtual object is easier for the user of the viewing device to see and interact with it. In another embodiment, the virtual object overlayed on the surface in the virtual environment may be of a person or an animal or an object that is capable of being in motion, such as a car, train, or a bicycle. If the control circuitry determines that the user associated with the viewing device is in motion, such as walking or jogging, then the control circuitry 3420 may animate the virtual object in a similar manner and with a similar motion as that of the user. For example, if the user is running, then a virtual object that is a depiction of James Bond may also be animated to show him running in a manner similar to the user.

Enhancements to the virtual object may also be based on the number of users engaging with the virtual object. For example, if a plurality of users are in the vicinity of the Macy's building and are viewing the same virtual object overlayed on the surface of the Macy's building through their respective viewing devices, then, based on an increased interest level from a plurality of users, the control circuitry may enhance the virtual object.

Figure 2:
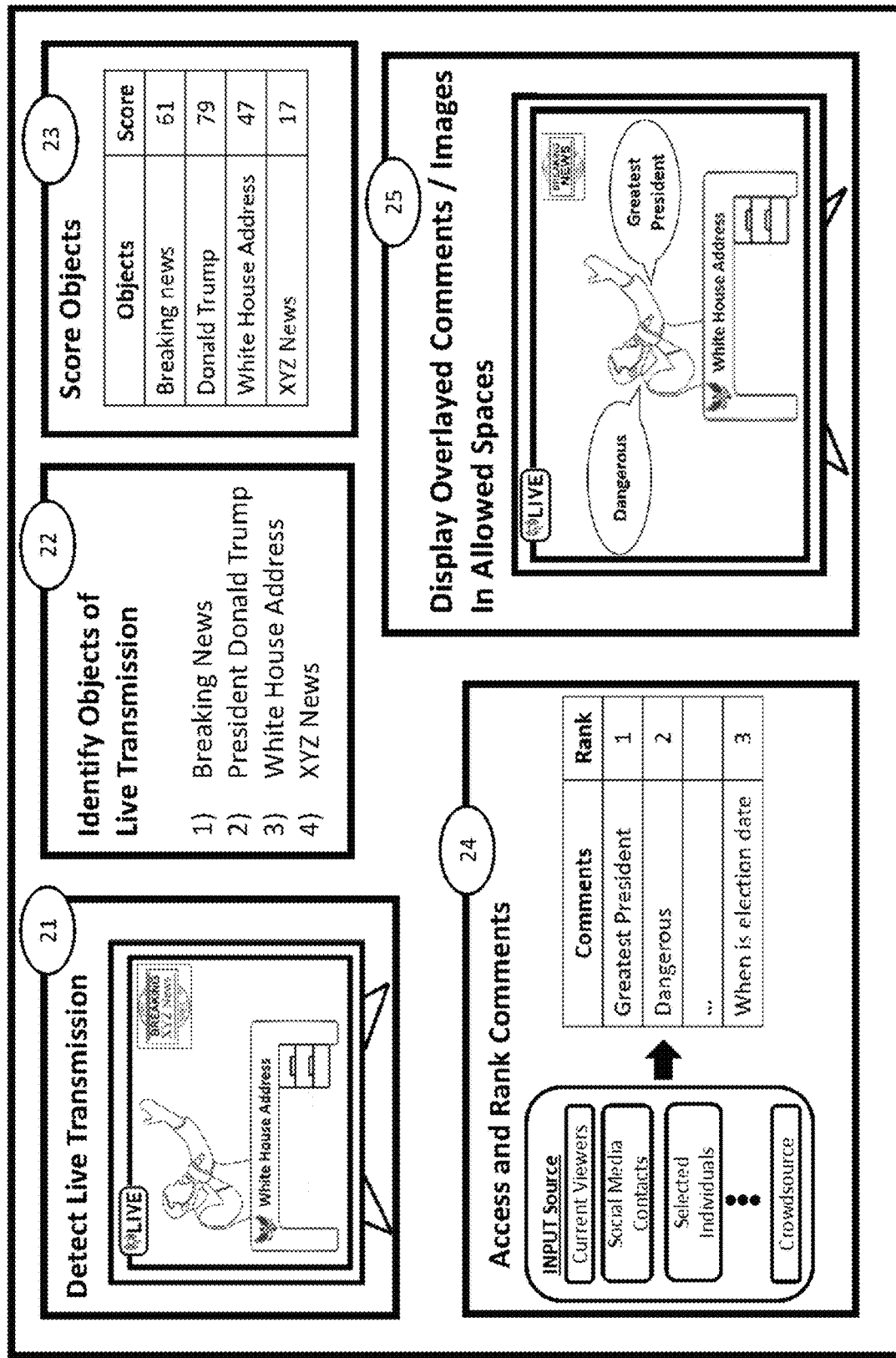
FIG. 2 is a block diagram of a process for overlaying comments and virtual objects on a media asset, in accordance with some embodiments of the disclosure.

FIG. 2 is a block diagram of an example of a process for overlaying comments or virtual objects on a live or on-demand transmission on a media device, in accordance with some embodiments of the disclosure.

In one embodiment, at block 21, a live stream or an on-demand stream of a media asset may be displayed on a media device, such as a television, laptop, or a video player. For example, as depicted in block 21, a live broadcast for a presidential address is being displayed on a channel showing XYZ News. In the live broadcast, President Donald Trump is depicted behind the White House desk giving an address. The broadcast is titled as "Breaking News" by XYZ News.

In one embodiment, as depicted in block 22, the media device may include control circuitry, such as control circuitry 3420 of FIG. 34, that can analyze the live transmission and identify a plurality of contexts and categories of the live transmission. In this example, the control circuitry 3420 identified the categories as 1) Breaking news, 2) President Donald Trump, 3) White House address, and 4) XYZ News. The control circuitry may also identify other categories from the broadcast, such as live transmission, channel name, or any topics of the presidential address.

At block 23, the control circuitry may calculate a score for each of the categories identified in block 22. The calculations may be based on user interest, prior consumption history of the user in which transmissions relating to similar categories were displayed, recommendations made by other users associated with the user viewing the live transmission, or recommendations made by an AI engine based on execution of an AI algorithm. A variety of formulas and weighted averages may also be used to calculate the score. In one example, the control circuitry calculated a score of 61 for the category "Breaking news," a score of 79 for the category "Donald Trump," a score of 47 for the category "White House address," and a score of 17 for the category "XYZ news."

In one embodiment, the control circuitry 3420 may select a category with the highest score as the target category for which comments and virtual objects can be accessed, analyzed, and displayed. As depicted, since "Donald Trump" received the highest score, the control circuitry may select "Donald Trump" as the target category. Alternatively, any one or more of the other categories may also be selected as the target category.

In one embodiment, as depicted in block 24, the control circuitry may communicate with a plurality of devices, servers, and databases to obtain interactive and dynamic content related to the target category. The control circuitry may extract data relating to the target category of the live transmission from any one or more sources. These sources may include social media posts, comments posted on the media asset, texts to the user associated with the media asset, twitter feeds, or other mediums used by the user.

The control circuitry 3420 may obtain comments posted by other users that are also viewing the live presidential address and rank the comments. The control circuitry may obtain comments from a variety of social media feeds, texts, and other posts from people that are connected to the user. The ranking of the comments may be based on relevance, number of people that have made similar comments, types of comments that were previously liked by the user, the person making the comment such as a famous figure or a celebrity, or comments made by an individual that the user is following on social media. Other preferences listed in the user's profile may also be used in ranking the categories.

As depicted in block 24, the comments ranked the highest by the control circuitry were 1) Greatest President and 2) Dangerous. In one embodiment, the control circuitry may overlay the highest ranked comments on the display of the media asset, as depicted in block 25. The control circuitry may access a space and dimensions policy of XYZ News or the channel displaying the broadcast to determine the locations on the display where overlaying comments are allowed. The space and dimensions policy may lay out portions and zones of the displayed image or provide details such as coordinates or areas of pixels where the overlay is allowed. The policy may also have restricted zones, such as face of the president or the logo of the news channel, where an overlay is not allowed. The policy may also provide other guidelines, rules, and regulations for the type of comments or virtual objects that can be overlayed on the broadcasted image. Based on the space and dimensions policy rules and regulations, the control circuitry may overlay the two comments, 1) Greatest President and 2) Dangerous, alongside the image of the president during the broadcast.

In one embodiment, the process outlined in blocks 21 through 25 may be performed in real time on a live broadcast. In another embodiment, the process may also be applied to an on-demand playback of a media asset. When a user is viewing an on-demand playback, the control circuitry, such as control circuitry 3420 of FIG. 34, may utilize a close caption file of the media asset or and image analyzer to determine which image and category to select as a target category for which comments may be posted. In the on-demand embodiment, comments may be collected and stored prior to reaching the play position. The control circuitry 3420 may also determine the image and the playback position when the comments are to be overlayed. By analyzing the caption file, the exact play position may be determined, and the comments may be overlayed.

Figure 3:
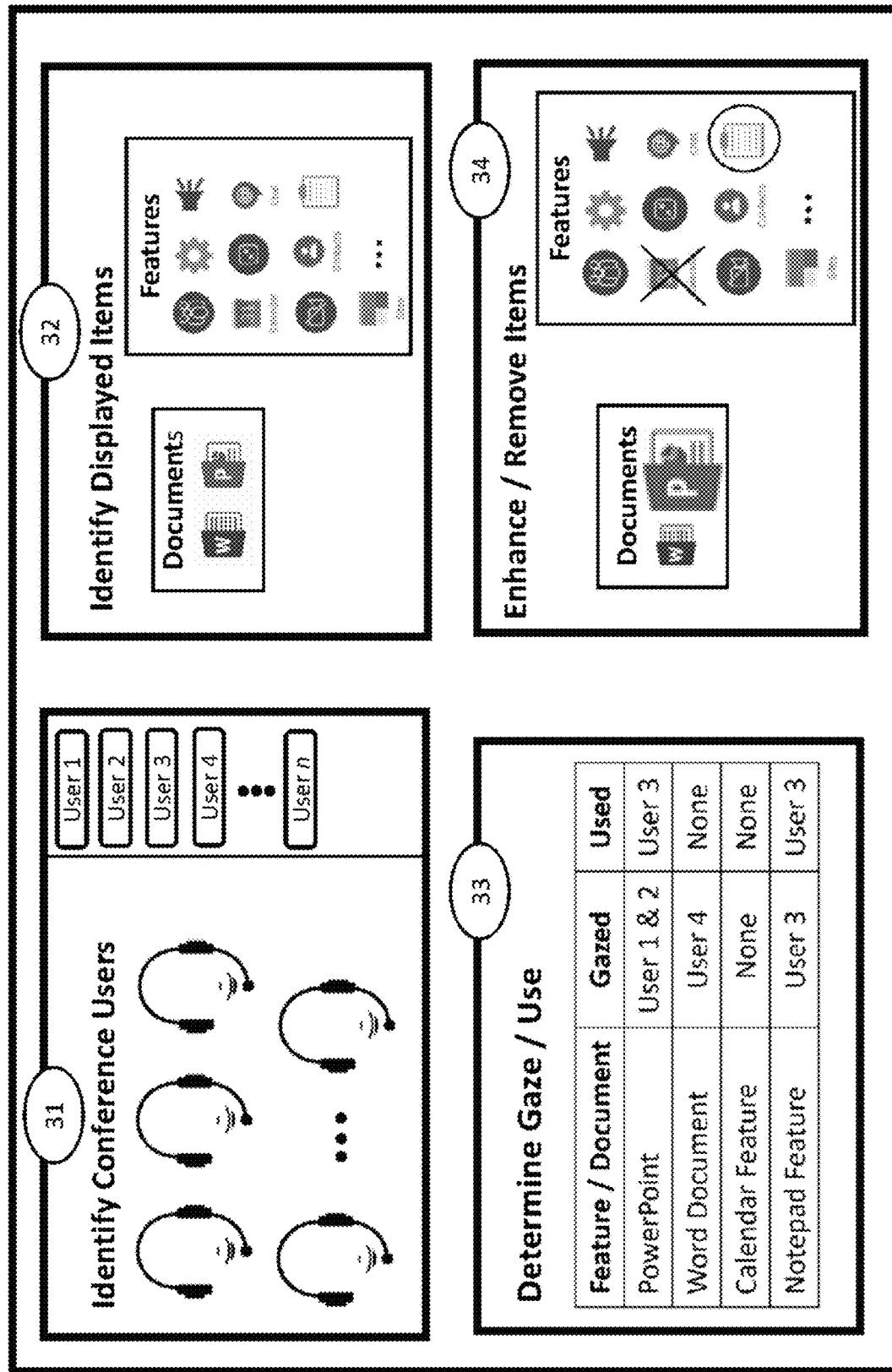
FIG. 3 is a block diagram of a process for enhancing and removing conferencing tools and other virtual features and objects displayed in a virtual conference environment, in accordance with some embodiments of the disclosure.

FIG. 3 is a block diagram of an example of a process for enhancing or removing virtual objects from a conference session based on interactive and dynamic content received by the control circuitry 3420.

In one embodiment, the control circuitry associated with a conferencing device may identify the users in a conference session. The identification may be made based on the IP address that is used by a user to join into a main conference session. As depicted, at block 31, in one embodiment, the control circuitry may have identified users 1-4 that are currently attending the main conference session. A user interface associated with the conferencing session may also indicate the number and names of users that are currently attending the conferencing session.

At block 32, a digital interface of a user of the conference may display a plurality of virtual objects. For example, the user may be using a conferencing user interface such as Zoom™, Microsoft Teams™, Google Meet™, Slack™, or some other conferencing interface. The control circuitry may identify the virtual objects displayed on the conferencing interface of each user of the conference session. For example, the control circuitry 3420 may identify virtual objects such as documents and applications, e.g., Microsoft™ Word and PowerPoint, and conferencing tools, e.g., calendar, video, contacts, chat, notepad, and other tools, as depicted in block 32.

At block 33, the control circuitry, such as control circuitry 3420 of FIG. 34, may determine the gaze of each user by tracking their eyeball movement to determine if the user is looking at any one or more displayed virtual objects. In one embodiment, the electronic device used by a user of the conference may include a camera and other means of input, such as a keyboard, touchpad, or mouse. For example, the user may be using a mobile phone, a tablet computer, a laptop, or some other form of media or conferencing device. The control circuitry may access the camera and monitor the user's eyeball movement during the conference to determine if the user looks briefly at, or stares at, any one or more virtual objects, and if so, may also determine the duration of their gaze.

The control circuitry 3420 may also monitor engagement by the user with any one or more virtual objects. For example, if a user selects or opens a document or any displayed virtual object or hovers their mouse over any displayed virtual object, the circuitry may also monitor such engagement and regard it as a virtual object being of interest to the user.

In yet another embodiment, if the user discusses use of a virtual object and uses keywords that mention the virtual object, such as, "We should share the link in the chat box," or "Can you use the notepad or PowerPoint to show action items?" where virtual objects of a chat box, PowerPoint, and notepad are mentioned, then such keywords may be captured by the control circuitry, and it may regard such virtual objects to be of interest to the user. The control circuitry may use the microphone of the media or conferencing device used by the user to access the keywords and use an artificial intelligence (AI) algorithm to associate the keywords to digital items displayed.

In one embodiment, as shown in the table in block 33, PowerPoint was gazed upon by Users 1 and 2 and used by User 3. Likewise, a Word document was gazed upon only by User 4. The calendar tool was not gazed upon or used by anyone, and the notepad feature was gazed upon and used only by User 3.

At block 34, based upon the engagement of the virtual objects, which was determined by the control circuitry at block 33 based on gaze and use of the virtual objects, the control circuitry 3420 may enhance or remove a displayed virtual object for either a specific user or for all users of the conferencing session. In one embodiment, since the notepad feature was used only by User 3, the digital circuitry may enhance the notepad feature only for User 3 and remove the notepad feature from the user interface of all other users of the conference.

In another embodiment, since the PowerPoint document was gazed upon by User 1 and 2 and used by User 3, the control circuitry may determine that a majority of users in the conference session may have an interest in the PowerPoint document. As such, the control circuitry may enhance the PowerPoint icon, such as by enlarging it, on the user interface of all the conference users. That determination of whether to remove or enhance a virtual object either specifically for only one user or for all users may depend upon the amount of interest and use by a majority or at least a threshold number of users in the conference session. For example, if only one user is interested in a specific virtual object, and others are not, then the control circuitry may enhance that virtual object for the interested user and remove it for all other users.

Figure 4:
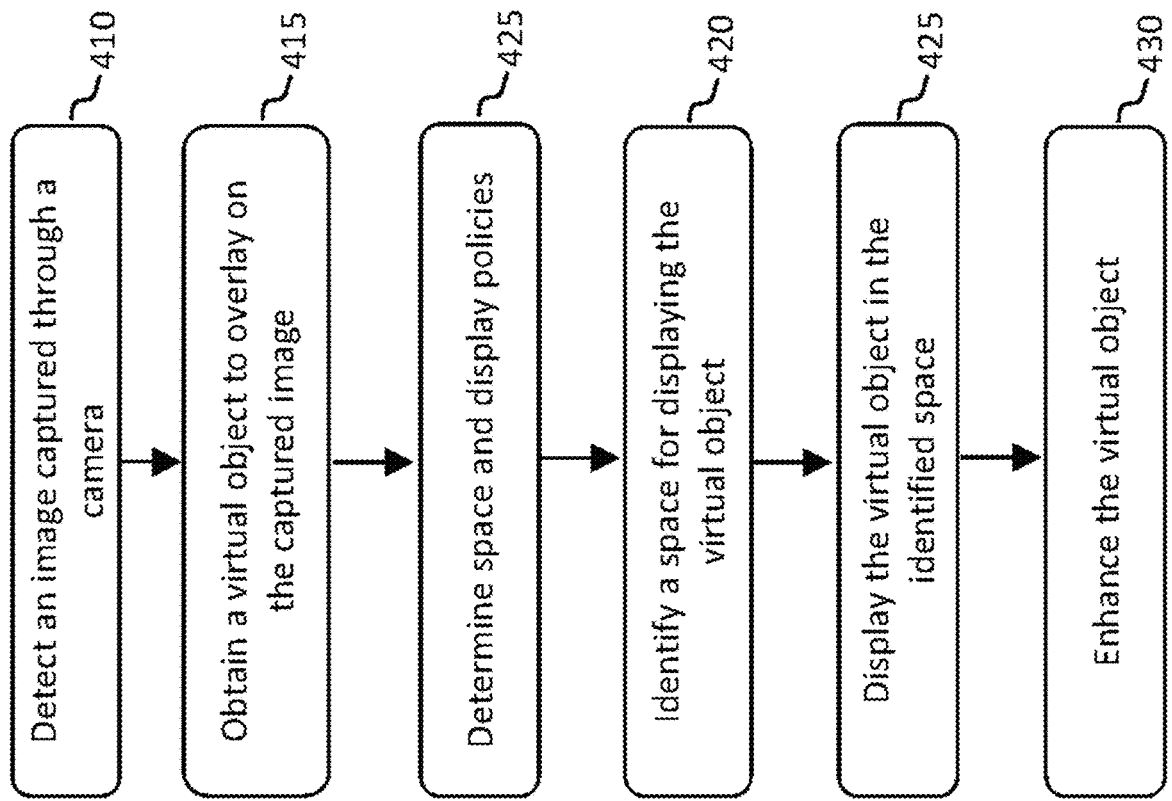
FIG. 4 is flowchart of a process for displaying and enhancing virtual objects on a surface in a virtual environment, in accordance with some embodiments of the disclosure.

FIGS. 5-27 are described in reference to the process of FIG. 1. FIG. 4 is a flowchart of a process for displaying and enhancing virtual objects on a surface in a virtual environment, in accordance with some embodiments of the disclosure. The displaying and enhancing, in one embodiment, are performed based on interactive and dynamic content received from one or more users associated with the system to customize and enhance their engagement with the virtual objects.

In one embodiment, at block 410, control circuitry 3420 of a system, such as the system displayed in FIG. 34, detects an image rendered on a display. In another embodiment, the image is viewed through a transparent material, such as glass or plastic, or through a live view of a camera lens, and captured by the control circuitry. The image may be a live image obtained through the camera of a viewing device while the person wearing or handling the viewing device is in motion. In one embodiment, the person associated with the viewing device may be wearing the viewing device, such as a pair of smart eyeglasses or virtual reality headset, and in another embodiment, the person associated with the viewing device may be holding the viewing device, such as a mobile phone, tablet, video display device, or another electronic device that allows the person to view live images through a camera lens. The cameras of both the wearable and the handheld viewing devices may capture all objects and surfaces that are in their field of view, and the captured objects and surfaces may be analyzed and processed by the control circuitry 3420 for performing actions described in FIG. 4. For example, if a person is walking around Time Square in New York, the camera may capture images of all objects, people, and surfaces around Times Square as viewable through the field of view of the camera lens.

At block 415, the control circuitry obtains a virtual object to overlay on the image captured at block 410. The virtual object may be a multi-modal object and can contain text, image, audio, or video. The virtual object can be either a 2D object or a 3D scanned object. It may be a .usd file, be imported, or be generated. The virtual object may have flexible properties and include 3D Mesh data. It may also vary in its attributes, such as in size, geometric properties, color, texture, pose, background, depth, types of animation, border, shading, and view from different angles.

In one embodiment, the virtual object may be obtained from a virtual library stored in a database or a virtual store accessible through the Internet. In another embodiment, the virtual object may be obtained from a multitude of sources and databases, such as the news and weather channels, platforms, or services. Virtual objects may also be obtained or posted by marketers and advertisers, either free or paid. They may also be obtained from recommendations made by friends, family, influencers, or people the user of the viewing device is following on social media and other platforms. They may be also obtained based on recommendations made by an artificial intelligence engine. Virtual objects may also be obtained or generated based on the user's consumption history, such as based on the user's prior engagement with the same or similar type of virtual objects. They may also be obtained based on virtual objects or news that is currently popular or trending. Yet another source of virtual objects may be based on location and notifications and emergency situations that arise in close vicinity to the user's location, such as a closed road, a fire event, a police event, or any other emergency or breaking news. Virtual objects may also be obtained based on the user's profile, which may be populated by the user or automatically by the system based on analysis performed by machine learning or artificial intelligence algorithms. The sources from which virtual objects can be obtained are further discussed in the description of FIG. 5.

In one embodiment, the virtual objects may be contextually related to the surface on which they are to be overlayed, and, in another embodiment, the virtual objects may not be contextually related. For example, when a virtual object is contextually related, if the surface on which it is to be overlayed in the virtual environment is a Macy's store, then the virtual object may be contextually related to Macy's or a product that is sold or endorsed by Macy's. If the Macy's policy allows it, then a non-contextual virtual object, i.e., a virtual object that does not relate to Macy's or any product of Macy's may be overlayed on the Macy's surface in a virtual environment.

At block 425, the control circuitry may analyze one or more policies, sections of the policies, and any sub-policies of the owner of the surface on which a virtual object will be overlayed in the virtual environment. The policies define the types of virtual objects that can be overlayed and the types of virtual objects that are restricted. The policies also define allowed and restricted locations and zones within the surface area where a virtual object may be overlayed. The policies may further define allowances and restrictions with respect to time of display of the virtual object, space and location of display, content of display, timing and duration of display and several other attributes of the virtual objects that are permitted and restricted. For example, policies may define what size, geometric properties, color, texture, pose, background, depth, types of animation, border, shading, and view from different angles of virtual objects are permitted and restricted.

In one embodiment, the control circuitry 3420 may access and analyze the space and location policy of the surface owner, such as the surface owner of Macy's when the virtual object is to be overlayed in a virtual environment on a surface of a Macy's store. The space and location policy may identify area, sections, coordinates, dimensions, and other space- and location-related information that allows overlaying of the virtual display with no restrictions, allows overlaying of the virtual display with restrictions as stated in the policy, reserves certain locations and areas on the surface for only those virtual objects that are either contextually related to Macy's and its products, or only allow Macy's to post on such locations, and block out sections, areas, or zones where a virtual object cannot be overlayed. One such example is depicted in FIG. 1 where allowed areas and zones are depicted in blue and restricted areas and zones are depicted in red color. Other means of graphically displaying the allowed and restricted areas and zones beyond colors are also contemplated. For example, shading, highlighting, using other types of colors, hashing, etc., can also be used.

When a virtual object is allowed to be overlayed in a particular section, area, or zone, of the surface, the space and location policy may also identify timing, schedule, and duration of such a posting. For example, in one embodiment, Macy's may desire to allocate the busiest time of the day when viewability is high to its own advertisements and virtual objects that are contextually related to Macy's and not allow others to overlay virtual objects during such times. In another embodiment, Macy's may provide a time slot during a busy time to an advertiser for a payment.

Timing and duration may also be regulated by the surface owner such that a virtual object may be be overlayed only for a certain amount of time. For example, the surface owner, such as Macy's, may allow a virtual object to be overlayed only between the hours of 5:00 PM and 8:00 PM. In another embodiment, Macy's may allow a virtual object to be posted on a particular day, such as a Wednesday. In yet another embodiment, Macy's may allow a virtual object to be posted within a threshold time of an occurrence of an event, such as, if a James Bond movie is playing at 5:00 PM in a theater within a threshold distance of where the Macy's store is located, then Macy's may allow a virtual object relating to the James Bond movie that directs people to the theater to be overlayed only within the two hours before the movie starts. In yet another embodiment, Macy's may replace a virtual object being overlayed by another virtual object that relates to an urgent event, such as an emergency, an immediate forecast, or any other imminent event. A variety of other timing, schedule, and duration options may be used by the surface owner to allow a virtual object to be overlayed and then removed. In some embodiments, after the virtual object has been overlayed, if user interest in the virtual object diminishes over time, the control circuitry may stop rendering it all together.

At block 430, the control circuitry, such as control circuitry 3420 of FIG. 34, may enhance the displayed virtual object. Enhancements, also referred to as graphically emphasizing, may include increasing the size of the virtual object, changing the color or texture of the virtual object, changing the depth perception of the virtual object by making it appear closer to or farther from the viewer, and highlighting or adding a border around the virtual object.

Enhancements may also include animating the virtual object. For example, in some instances, the virtual object may be a depiction of a person, an animal, or some animation character. The control circuitry 3420 may animate such person, animal, or animation character by making them perform an action similar to that of the user viewing the virtual object, such as walking, jogging, jumping, or running. The animation may also include performing some movement of the displayed virtual object. In the instances where the virtual object is not a person, animal, or animation character that in its natural state would perform such an action, such as a virtual object that is a purse, it would not be displayed walking, or running. But the control circuitry may still animate the virtual object by rotating the virtual object, increasing and decreasing the depth perception, or applying other animated effects that are suitable for the virtual object. Additional enhancements are described further in the description of FIG. 13.

The level and type of enhancement may also depend upon the type of engagement between the user and the virtual object. For example, a higher level of engagement with a virtual object may result in a higher level of enhancement than a lower level of engagement with another virtual object displayed at the same time. As displayed in block 14 of FIG. 1, if a user's engagement with a purse displayed on the upper left-hand corner of Macy's surface is higher than the user's engagement with the James Bond symbol that is displayed on the lower left-hand side of the Macy's surface, then the control circuitry may provide enhancements to the purse and not to the James Bond symbol, or a higher level of enhancements to the purse than the James Bond symbol, based on the user's engagement. Such engagement may be measured by the user's gaze, interaction, or any movement towards the displayed virtual object. Additional details relating to enhancements and how they are applied are described further in the description of FIG. 13.

Referring back to block 415 of FIG. 4, as mentioned above, the control circuitry obtains the virtual object that is to be overlayed or superimposed on the image captured at block 410. The sources used, in one embodiment, to obtain the virtual object are further described in FIG. 5, which is a block diagram of categories of sources that may be used for accessing, selecting, and obtaining a virtual object, in accordance with some embodiments of the disclosure.

Figure 5:
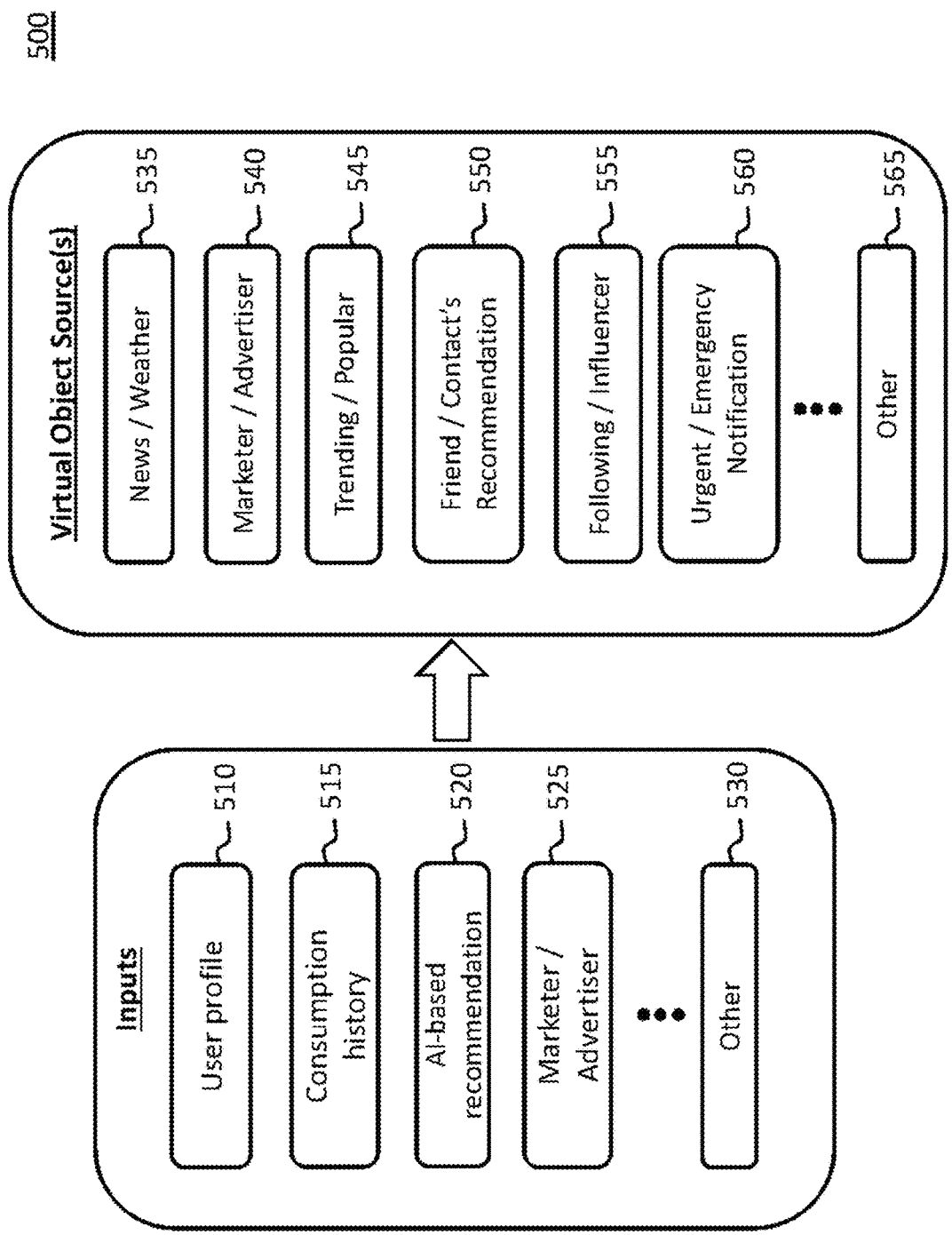
FIG. 5 is a block diagram of categories of sources that may be used for accessing, selecting, and obtaining a virtual object, in accordance with some embodiments of the disclosure.

In FIG. 5, the virtual objects obtained through the sources 535-565 may be based on inputs 510-530. The virtual objects may be contextually related to the surface or they may be contextually unrelated. For example, as depicted in FIG. 1, the virtual objects such as the handbags depicted in block 14 may be contextually related to Macy's, which may be the owner of the surface, since Macy's also sells handbags. Alternatively, the virtual objects such as James Bond movie or the weather forecast depicted in block 14 may be contextually unrelated to Macy's, since Macy's is not a movie theater or a weather channel.

In one embodiment, the input for the type of virtual object to obtain may be based on the user's profile, as depicted in block 510. In this embodiment, a profile associated with the user who is viewing the surface, such as the surface in block 11 of FIG. 1, may be created. The profile may be associated with a specific electronic device used by the user to view the surface or it may be associated with all the devices owned by the user. In other embodiments, the profile may be different for each device used by the user and may have some overlaps. The profile may include the user's preferences and data inputted by the user relating to the type of virtual objects liked and preferred by the user.

In another embodiment, the input for the type of virtual object to obtain may be based on the user's consumption history, as depicted in block 515. The system may monitor the user's prior interactions with virtual objects and the user's consumption history to determine the user's likes and dislikes in reference to virtual objects. The data from the consumption history may be stored in the user's profile or fed into a machine learning algorithm and used to select virtual objects that are likely to be preferred by the user from sources 535-565.

In yet another embodiment, the input for the type of virtual object to obtain may be based on the recommendation of an artificial intelligence algorithm, as depicted in block 520. Machine learning and artificial intelligence algorithms may be used in generating a model that can be trained to understand user preferences based on user consumption patterns and other user communications and online interactions. The trained and periodically updated model can be used to determine the user's likes and dislikes of virtual objects, and such data may be used to select virtual objects from sources 535-565. A user interface may also be generated and presented to the user of the AI- or ML-recommended virtual objects that the user may either approve or reject. The user's approvals and rejections may be used as feedback by the ML and AI algorithms to continuously, or at periodic intervals, update the model to enhance the algorithms and improve predictions of virtual objects that may be preferred by the user with a higher probability. The server, depicted in FIG. 34, may store and execute the various artificial intelligence and machine learning algorithms.

In another embodiment, the input for the type of virtual object to obtain may be based on a marketer or advertiser looking to display their products, as depicted in block 525. In this embodiment, a marketer or advertiser may desire to sell a product to the user or gauge the user's response to a product being tested in the market. The marketer or advertiser may also display a product or service or post an item to gauge the user's response in order to collect survey data. For example, the marketer or advertiser may post an image of a new movie, restaurant, or a political candidate for office to gather survey data based on the user's interaction with the posted virtual object. The marketer or advertiser may display the virtual object or provide input, which may then be used to select a virtual object from sources 535-565.

In addition to input 510-525, other inputs may also be used in determining virtual object selection and the sources from which to obtain the virtual object. For example, the surface owner may have its own inputs on the types of virtual objects allowed or preferred and sources authorized by the surface owner from which the virtual objects may be obtained.

Blocks 535-565, in one embodiment, represent the sources from which the virtual objects may be obtained. In one embodiment, the virtual objects may relate to news or weather and may be obtained from one or more news or weather sources, as depicted in block 535. For example, if a user is at a location where the weather is about to change in the near future, then the control circuitry 3420 may access a weather source to obtain a virtual object that relates to the upcoming forecast. The control circuitry may then display the weather-related virtual object on the surface following the processes described in FIGS. 1 and 4.

Similarly, if a news event occurs in the vicinity of the user's location, is a news event that concerns the user, is a news event that relates to data inputted in the user's profile, or is a news event that the ML or AI algorithms determine would be of interest to the user, then the control circuitry may obtain a virtual object associated with the news event from a new source and display the news-related virtual object on the surface following the processes described in FIGS. 1 and 4.

In another embodiment, the virtual objects may relate to marketing and advertising, as depicted in block 540, and may be obtained from one or more related sources that store such marketing and advertising virtual objects. Such objects may be contextually related or unrelated to the surface on which they are to be overlayed. In one embodiment, a marketer or advertiser may overlay a virtual object to determine if the user may interact or engage with the virtual object. The marketer or advertiser may display such a virtual object either to specifically determine the user's likes and dislikes or as part of a survey being conducted. The marketer or advertiser may use such data to promote their products and sell them to the user and others.

As represented by block 545, the virtual object may be obtained from sources, such as social media sources, that monitor and display trending and popular topics and display associated virtual objects. The trending and popular virtual objects may be based on what is trending and popular on social media sites to which the user is subscribed or specifically based on virtual objects that relate to the user's social media interactions. In this example, the user may authorize the system to access all its online accounts. Once authorized, the user's interactions on the social media, recommendations from the user's connections, or topics that are trending and popular and associated virtual objects may be used for displaying on the surface following the processes described in FIGS. 1 and 4.

In one embodiment, when a user posts to an online account, comments on an online post, or performs other online textual or graphical social media interactions, a machine learning (ML) algorithm captures the data and uses it to develop a model. The model represents user social media history and determines the virtual objects liked/disliked by the user or virtual objects with whom the user has interacted, such as selected with their mouse or browsed through. The ML algorithm may be used to enhance the model and train it over time to predict with a higher probability the virtual objects that may be of interest to the user. The machine learning algorithm may also be configured to periodically monitor all user communications to determine the user's engagement with virtual objects on social media and other platforms, and data relating to such engagement may be used in selecting a virtual object from a social media platform or another source.

In yet another embodiment, the virtual objects may be obtained based on recommendations from the user's connections, such as friends, family, and colleagues or based on an influencer on a social media platform that the user follows, as depicted in blocks 550 and 555.

In another embodiment, the virtual objects may be obtained from emergency notification sources, such as the police or fire department, or the weather channel when an emergency occurs within a threshold distance of the user's location, where the threshold may be set by the user or the system.

Although some sources, categories of virtual objects, and inputs used to determine the type of virtual objects are described in FIG. 5, the possible sources, categories of virtual objects, and inputs are not limited to just those; as represented by blocks 530 and 565, other sources, categories of virtual objects, and inputs not described here may also be used.

Referring back to block 415 in FIG. 4, as mentioned above, the control circuitry, such as control circuitry 3420 of FIG. 34, obtains the virtual object that is to be overlayed or superimposed on the image captured at block 410. Using such inputs and sources as those described in FIG. 5, multiple virtual objects may be identified that can be overlayed on the surface following the processes described in FIGS. 1 and 4. In one embodiment, the selection of which virtual objects to overlay may be based on scoring and ranking of the virtual objects. It may also depend on the rendering device display capabilities. For instance, if the rendering device does not have adequate GPU resources, certain graphical properties of the virtual object (such as glow) may be skipped/ignored. Other details of the selection of which virtual objects to overlay is described further in FIG. 6.

Figure 6:
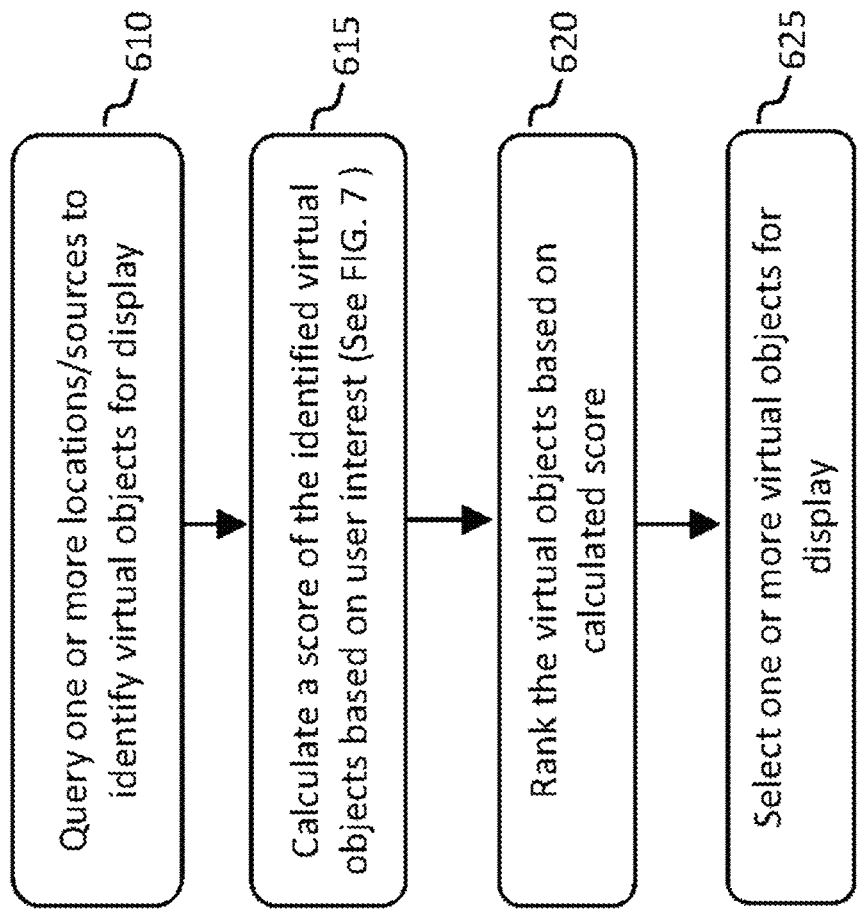
FIG. 6 is flowchart of a process for scoring virtual objects and identifying virtual objects based on their score/rank to overlay on a surface in a virtual environment, in accordance with some embodiments of the disclosure.

FIG. 6 is flowchart of a process for scoring virtual objects and identifying virtual objects based on their score/rank to overlay on a surface in a virtual environment, in accordance with some embodiments of the disclosure.

At block 610, the control circuitry as depicted in FIG. 34 queries one or more locations and sources to identify virtual objects for display. The sources queried may be one or more of the sources 535-565 of FIG. 5. The querying may be based on any one or more inputs 510-530 of FIG. 5 to identify a source and a virtual object from the source to obtain for overlaying.

At block 615, the control circuitry may calculate a score for an identified virtual object. The calculations may be based on the user's interest. Some of the categories evaluated to gauge users' interest are depicted in FIG. 7, which is a block diagram of categories used in calculating a user interest score relating to a virtual object.

Figure 7:
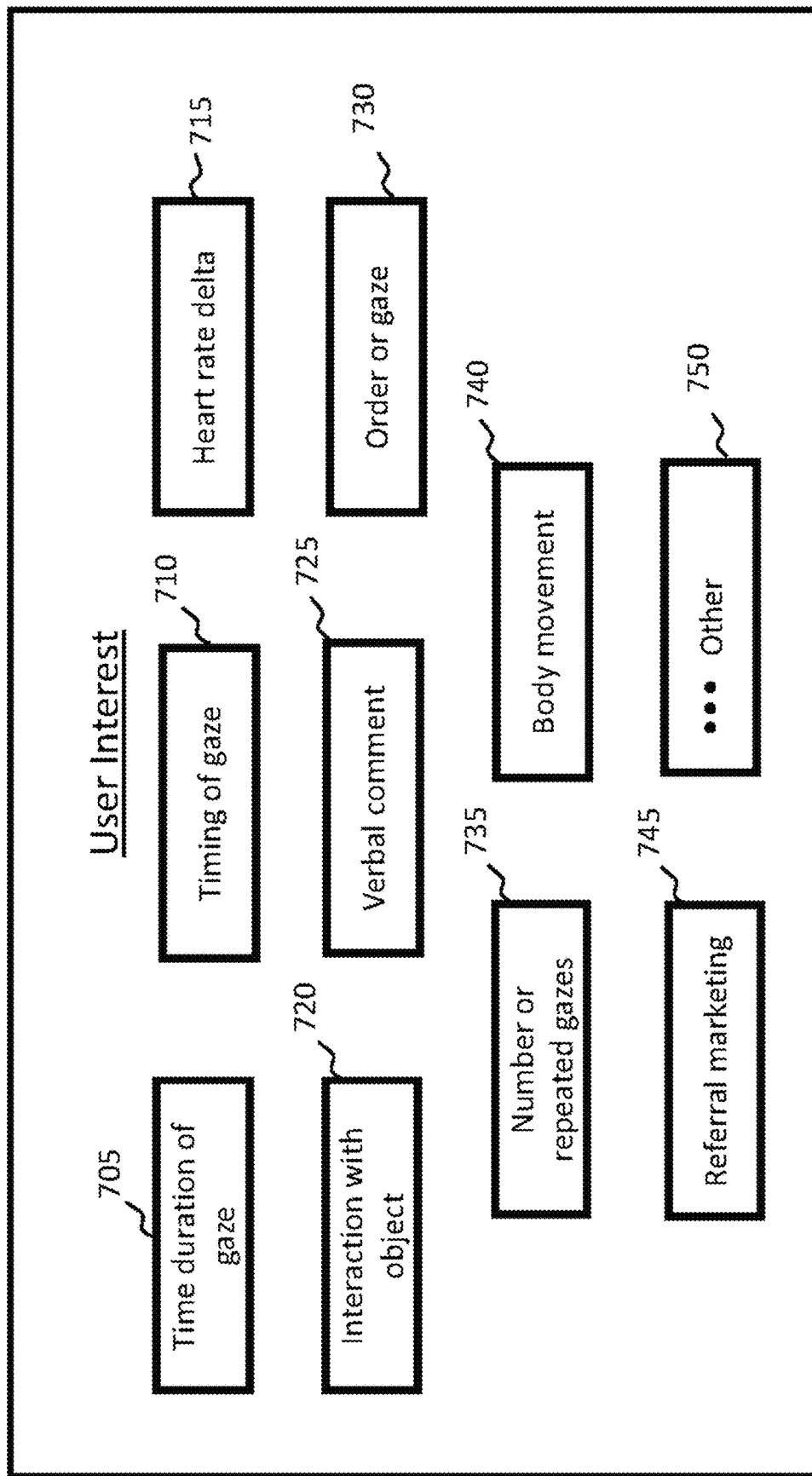
FIG. 7 is a block diagram of categories used in calculating a user interest score relating to a virtual object, in accordance with some embodiments of the disclosure.

In one embodiment, as depicted in block 705 of FIG. 7, a category evaluated for scoring user interest is duration of the gaze. In this embodiment, a camera associated with an electronic device is accessed. The electronic device may have multiple cameras which include an inward-facing camera that detects the eyeball movement of the user. The control circuitry may access such an inward-facing camera to determine the gaze of the user and evaluate the duration of gaze when it is directed towards a virtual object to determine user interest. For example, a longer gaze may be associated with high level of user interest, and a shorter gaze, a quick glance, or no gaze at all at the virtual object may be associated with a lesser level of interest.

In another embodiment, as depicted in block 710, a category evaluated for scoring user interest is the timing of the gaze. In this embodiment, the front-facing or inward-facing camera, or eye tracking cameras embedded in a smart glasses, may detect the user's gaze directed at the virtual object, and the control circuitry may evaluate the gaze based on the occurrence, timing, or vergence of the gaze, such as during morning, afternoon, evening, certain days or hours of the week, etc. The timing of the gaze may be used to determine the user's interest level in the virtual object at different times of the day and days of the week. For example, a user may be interested in a certain virtual object in the morning hours but not in the evening hours, such as a breakfast-related item. Likewise, a user may be interested in virtual objects that represent movies or entertainment during evening or weekend hours and not during working hours. The control circuitry 3420 may monitor the user's gaze with respect to each virtual object and store data related to the gaze and the timing of the gaze in a database. The stored data may be used by an artificial intelligence (AI) algorithm to determine what types of virtual objects would be of user interest at different times of the day and days of the week.

In another embodiment, as depicted in block 715, a category evaluated for scoring based on user interest is the user's heart rate and the delta between heart rates before and after engagement with the virtual object. In this embodiment, in one example, the user may be wearing a smart watch that can monitor the user's heart rate or carrying a mobile device that can measure the user's heart rate. The control circuitry may access such devices and monitor the user's heart rate before and after the user's engagement with the virtual object, where the engagement may be based on the gaze of the user directed towards the virtual object or the user selecting the virtual object using a tool such as a computer mouse or trackpad. The control circuitry may then determine the delta between the heart rate before, during, and after the engagement with the virtual object. If the heart rate has changed and exceeds a threshold delta, then the control circuitry may determine that the user is interested in the virtual object. For example, typically when an individual comes across an object that is of interest to them, the excitement level based on the interaction with the object causes the heartbeat of the individual to go up. Such increases in heartbeat can be associated with the user liking the displayed object.

In yet another embodiment, as depicted in block 720, a category evaluated for scoring based on user interest is the interaction of the user with the virtual object. The interaction may be the user selecting the object using a computer tool, such as a mouse or trackpad, which may be an indicator of the user's interest in the virtual object.

In another embodiment, as depicted in block 725, a category evaluated for scoring user interest is the verbal comments of the user related to the virtual object. In this embodiment, the device used by the user may include a microphone for capturing users' speech. The control circuitry may capture the words uttered by the user in determining the user's interest relating to the virtual object. In one embodiment, the spoken words of the user may be fed into an artificial intelligence (AI) algorithm for analysis and to determine whether the words can be associated with user interest in the virtual object.

In another embodiment, as depicted in block 730, a category evaluated for scoring based on user interest is the order of the gaze with the virtual object. In this embodiment, the inward-facing camera of the device used by the user may detect the user's gaze directed at one or more virtual objects. The control circuitry 3420 may evaluate the order of the gaze based on which virtual objects were viewed by the user first and which were viewed thereafter. For example, in a scenario where three virtual objects have been presented to the user, where the virtual objects are distinct objects, such as a purse, a movie poster, and a breakfast item, the user may gaze at the purse prior to gazing at the movie poster, and gaze at the breakfast item as the last item. As such, the control circuitry may rank the order of gaze as purse, movie poster, and lastly breakfast item, such that the order may reflect the user's interest. In another embodiment, the virtual objects may be contextually related, for example, three different purses that look very similar carrying different brand names may be displayed to the user. The control circuitry may determine which brand of purse was gazed upon prior to other brands such that it may rank the purses in the order of gaze, reflecting the user's interest. Likewise, a number of repeated gazes at the same virtual object, such as displayed in block 735, may also be an indicator of the user's interest in the virtual object.

In yet another embodiment, as depicted in block 740, a category evaluated for scoring based on user interest is the user's body movements. In this embodiment, a gyroscope, motion sensor, or accelerometer associated with an electronic device is accessed. The control circuitry may access such gyroscope, motion sensor, or accelerometer to determine the user's body movements before, during, and after engagement with the virtual object. Such body movement may be analyzed by the control circuitry, such as by using an AI algorithm, to determine if the movements can be associated with user interest. For example, an individual viewing a virtual object and reacting by jumping with joy or putting up their hands in excitement may be captured by the gyroscope or motion sensor and associated with the user's interest in the virtual object.

In another embodiment, as depicted in blocks 745 and 750, a category evaluated for scoring based on user interest may be recommendations made by referral marketing sources, input data provided in the user's profile, comments posted by the user on a social media platform, or other means of determining user interest.

Referring back to block 615 of FIG. 6, the control circuitry 3420 may use one or more of the user interest categories, such as categories of blocks 705-750 of FIG. 7, in calculating the score based on user interest.

In one embodiment, the calculation may be performed as follows: User Interest=a*seconds of gaze+b*verbal comment+c*heart rate delta+d*seconds of interaction with object+e*timing of the gaze+f*order of gaze with respect to other virtual objects+g*number of repeating gazes+ h*magnitude of body movement change. A variety of other formulas, weighted averages, means, and other calculations may also be performed to determine a score for each virtual object based on user interest.

At block 620 of FIG. 6, the plurality of scored virtual objects may be ranked in order of their scores. For example, the scoring engine may calculate a score of 76 for a Gucci handbag, a score of 91 for a James Bond movie that is playing at a theater within a threshold distance from the physical surface, a score of 57 for John's Tacos which is located within a threshold distance of the physical surface, a score of 72 for a Macy's sweater sale that is 30% off and contextually related to the physical image of Macy's displayed or seen through the viewing device, and a score of 88 for a weather forecast of rain at 3:00 PM. The control circuitry, such as control circuitry 3420 of FIG. 34, may rank such virtual objects in order based on the score; for example, the James Bond movie, receiving the highest score of 91, may be ranked on top of the list with the rain forecast, with a score of 88, as the second on the list, and so on. The ranking and order may be used by the control circuitry in determining which virtual object to overlay on the surface. The virtual objects with the highest rank and order are given priority. In instances where the policy associated with the surface allows only one or two virtual objects, then control circuitry may select from the list of virtual objects identified based on their scores the one or two virtual objects with the highest scores, as depicted at block 625.

Referring back to block 425 of FIG. 4, as mentioned above, the control circuitry 3420 may analyze one or more policies, sections of the policies, and any sub-policies of the owner of the surface on which a virtual object will be overlayed in the virtual environment. This step may be performed before or after obtaining the virtual objects from a source and selecting a virtual object that is to be overlayed on the surface area, as described in FIGS. 5-7. The process involved in analysis of the policy and placement of the virtual object is described in further detail in FIG. 8.

Figure 8:
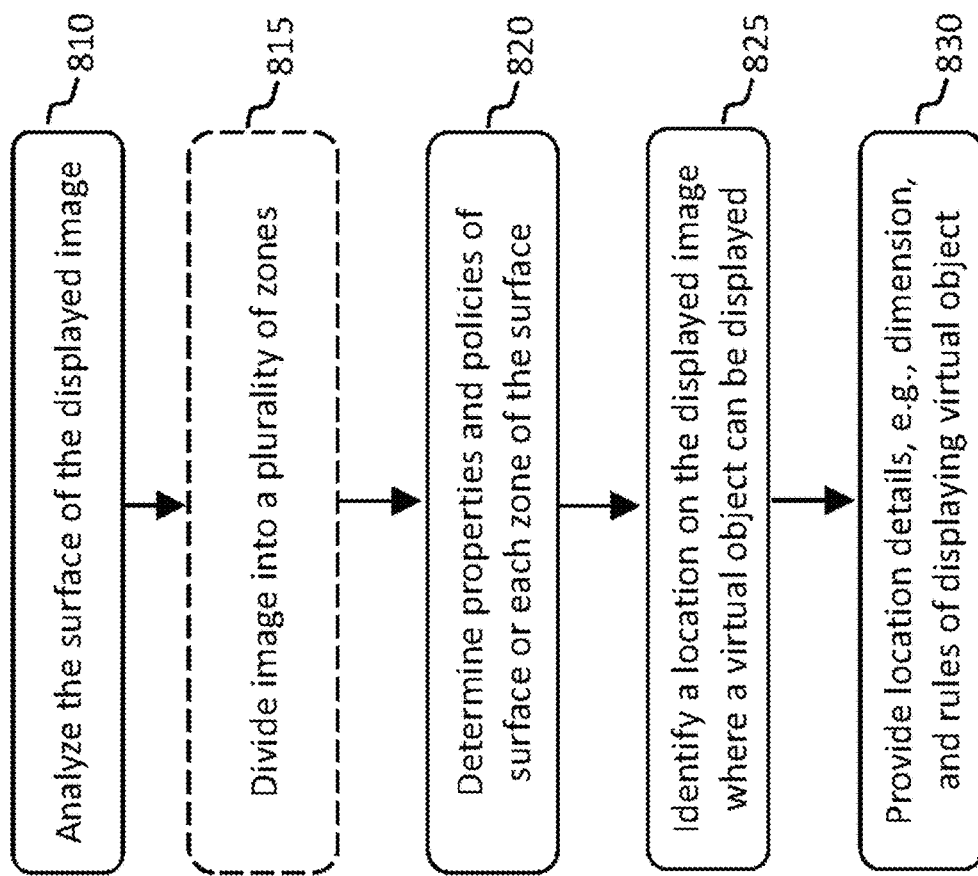
FIG. 8 is flowchart of a process for determining policies of the surface area and locations for overlaying the virtual object based on the policies, in accordance with some embodiments of the disclosure.

FIG. 8 is flowchart of a process for determining policies of the surface area and locations for overlaying the virtual object based on the policies, in accordance with some embodiments of the disclosure. Since the surface owner may have certain rules, policies, and restrictions on what types of virtual objects can be overlayed, areas of the surface over which such overlaying is allowed, and other rules, policies, and restrictions concerning the overlaying of the virtual object, the control circuitry, such as control circuitry 3420 of FIG. 34, analyzes each virtual object in such regard to ensure that only those virtual objects that meet such policies of the surface owner are selected for overlaying.

In one embodiment, the process for determining policies of the surface area and permitted locations for overlaying the virtual object based on the policies may begin at block 810. where the surface of the displayed image is analyzed. The analysis may include determining the type of surface, the different regions of the surface, such as a wall or a storefront window, size and curvature of the surface and other details that define the dimensions and features of the surface. The analysis may be performed based on a live image of the surface captured by a camera associated with the device. For example, the device may be a mixed reality, augmented reality, or virtual reality device that includes a camera that has a display for displaying the surface, such as a mobile phone or a tablet that captures the live surface through an outward-facing camera and displays it on the screen of the tablet or the mobile device. In another embodiment, the device may be transparent eyeglasses or a wearable device, such as smart glasses with control circuitry, that allows the user to see through a transparent glass to view the surface.

In one embodiment, the surface may be that of a structure such as a storefront, a monument, a bridge; a moving object such as a car, train, ship, or plane; an object such as a Christmas tree or a billboard, a wall of a building, or any other physical surface. It may also be, as depicted in block 11 of FIG. 1, a front facade of a Macy's store. The control circuitry may analyze the surface, including using an AI algorithm, to determine all features of the surface, such as different regions of the surface, shapes and contours of the surface, size and curvature, dimensions, color of the background wall, etc.

In one embodiment, the control circuitry 3420 may divide the surface into a plurality of zones, as depicted at block 815. The dividing of the surface into the plurality of zones may be optional and may be determined on a case-by-case basis where the control circuitry may divide only certain surfaces into a plurality of zones as needed.

At block 820, the control circuitry may determine the properties and policies of the surface. If the surface is divided into a plurality of zones, as mentioned at block 815, then the control circuitry may determine the properties and policies of each zone of the surface as they may be similar or different for each zone. For example, a virtual object that can be overlayed in one zone may not be allowed to be overlayed in another zone. In another example, If allowed by the policy, a single virtual object may span multiple surfaces when rendered on the display as instructed by the AR Engine.

The policy associated with the surface or sub-policies associated with each zone of the surface may provide requirements and restrictions of overlaying a virtual object. The policies may also relate to space restrictions where virtual objects can be overlayed, type restrictions on what type of virtual object is allowed to be overlayed, contextual guidelines, timing and duration permissions and restrictions on what days/times and the duration that a virtual object can be posted, paid advertising rules and regulations, and other requirements and permissions. The policies may also identify, such as by highlighting, glowing, or drawing a border around areas that are permitted for overlaying a virtual object. The policy may also identify dimensions and exact location and coordinates where a virtual object can be overlayed on the surface.

Figure 9:
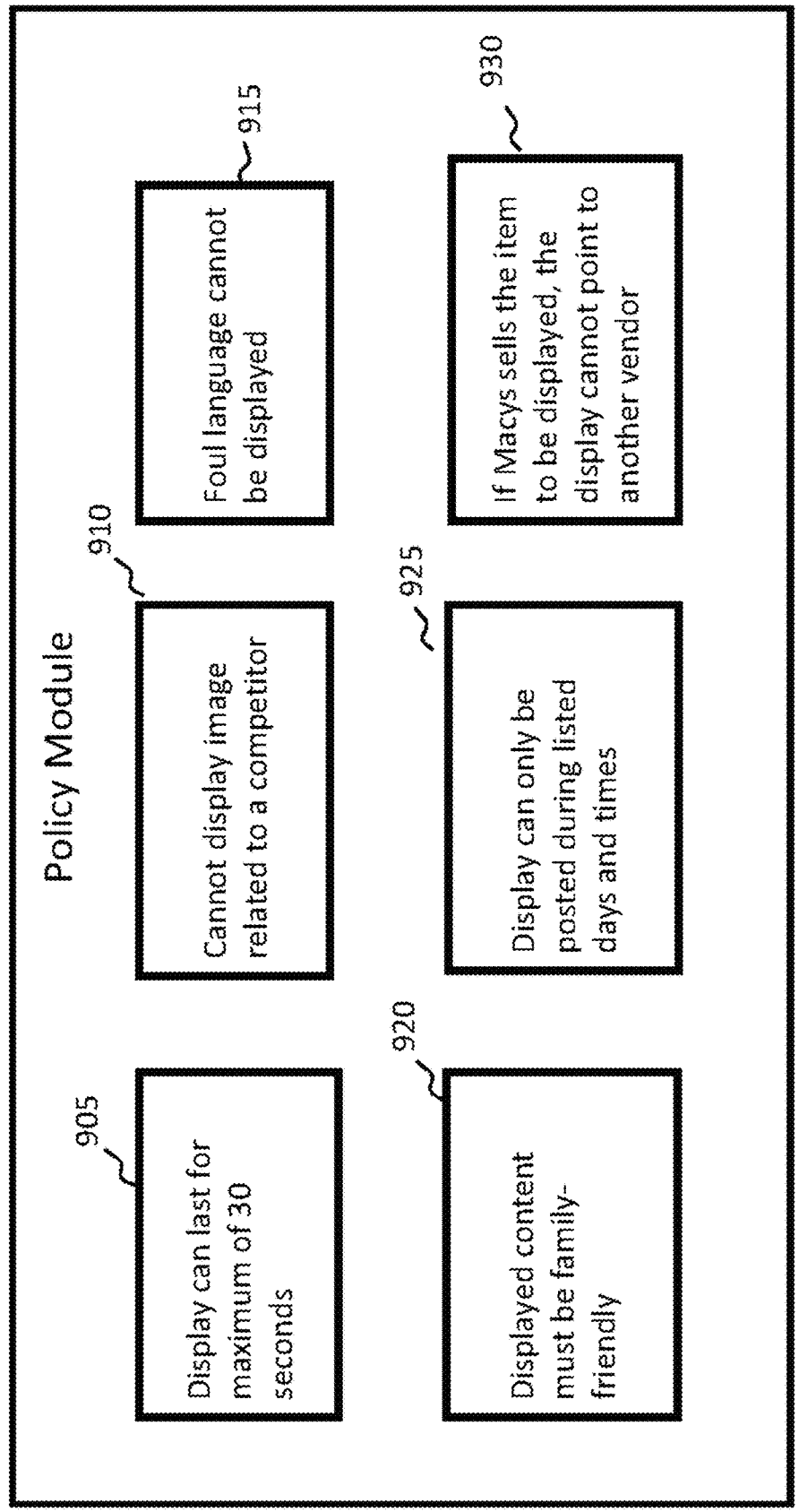
FIG. 9 is a table of locations and their dimension on a surface where virtual objects may be overlayed according to the policy, in accordance with some embodiments of the disclosure.

In one embodiment, a policy module 900 from FIG. 9 may be invoked by the control circuitry to determine the polices of the surface, different zones of the surface, and determine how the policies apply to the virtual object to be posted. As depicted, various polices 905-930 may be analyzed to determine a fit with the virtual object to be overlayed.

In one embodiment, at block 905, the policy may allow overlaying a virtual object as long as the virtual object is not overlayed for more than 30 seconds. Although 30 seconds is used as an example, any other duration predetermined by the system may also be used, and any virtual object overlayed may only be displayed for the allotted duration. For example, in some instances, the surface owner may use their surface or zones within their surface as an advertisement board that may be rented out to a plurality of users, marketers, and advertisers. Such rented space may be based on the amount of display time purchased, and as such the policy may regulate the overlaying of the virtual object based on such rented time.

In one embodiment, at block 910, the policy may restrict where objects that relate to a competitor may be overlayed. For example, Macy's may restrict products sold by their competitors to be overlayed on a surface owned by Macy's.

In one embodiment, at block 915, the policy may restrict foul language and any other inappropriate language or images to be overlayed on their surface.

In one embodiment, at block 920, the policy may require the virtual objects to be family-friendly and use a rating system, such as PG, PG13, or some other rating system to determine whether the virtual object is family-friendly.

In one embodiment, at block 925, the policy may restrict the display of virtual objects to only during listed days and times. For example, Macy's may restrict virtual objects from being overlayed during their rush hours or their busiest times, such that the surface may be reserved for Macy's to promote their own products. The days, times, and durations may also be applicable based on the type of virtual object to be overlayed. For example, items relating to breakfast may be restricted to morning hours, and items relating to a movie playing on a weekend may be restricted to be overlayed only during weekend hours.

In one embodiment, at block 930, the policy may also be more specific to a particular item or product. For example, a Macy's policy may restrict a virtual object that is directly related to a product sold by Macy's from being displayed if it is on sale elsewhere.

Referring back to FIG. 8, once a virtual object meets the requirements set forth in the policy, as determined in block 820, at block 825, the control circuitry 3420 may identify a location on the displayed image, i.e., a location on the surface area, where a selected virtual object can be overlayed in the virtual environment.

In one embodiment, the location may be determined based on the type of virtual object being overlayed. For example, the control circuitry may display the virtual objects that rank higher in user interest at a location that is likely to be more visible to the user than virtual objects that rank lower. If a James Bond movie is of higher interest to the user, then it may be overlayed in a location that allows a larger-sized display or a location that is in the center or closer to the center of the surface rather than in a corner location.

In one embodiment, the location may be determined based on the number of virtual objects to be overlayed. The control circuitry may determine whether to overlay one or more virtual objects at the same time. The overlayed virtual objects may be of the same type or of different types. If a decision is made to overlay multiple virtual objects, then the location on the surface that can accommodate overlaying of multiple virtual objects may be selected.

An AI algorithm may also be used to determine the most optimal location, among all the locations on the surface that are allowed for overlaying. The optimal location may be used for overlaying a virtual object of the highest interest to increase the probability of the user's gaze being directed towards the virtual object.

At block 830, once the location has been determined for overlaying the virtual object, the control circuitry may obtain details and dimensions of the location and overlay the virtual object according to the allowed policies. For example, as depicted in FIG. 10, each space, such as spaces 1-5, may have different allowances and restrictions for the types of virtual objects that can be overlayed and the dimensions in which an overlay is allowed. As depicted, Space 1 may only allow virtual objects that are 12"×18" in size and conform to the policy to be overlayed. Spaces 2 and 5 may be restricted and may not allow any overlays of virtual objects. Space 3 may allow virtual objects to be overlayed, however may restrict to only those virtual objects that contextually relate to the owner of the surface or products sold by the owner of the surface, such as relate only to Macy's or product sold by Macy's. Space 4 may only allow overlaying of movie titles from a local movie theater. The control circuitry may generate a table 1000 such as that of FIG. 10, or such a table may be provided in the policy by the service owner. The process of block 830 is interchangeable with and may be performed before the process of block 825.

Figure 11:
FIG. 11 is a block diagram of multiple virtual objects, a runway model and an umbrella, overlayed in a virtual environment on a storefront, in accordance with some embodiments of the disclosure.
Figure 12:
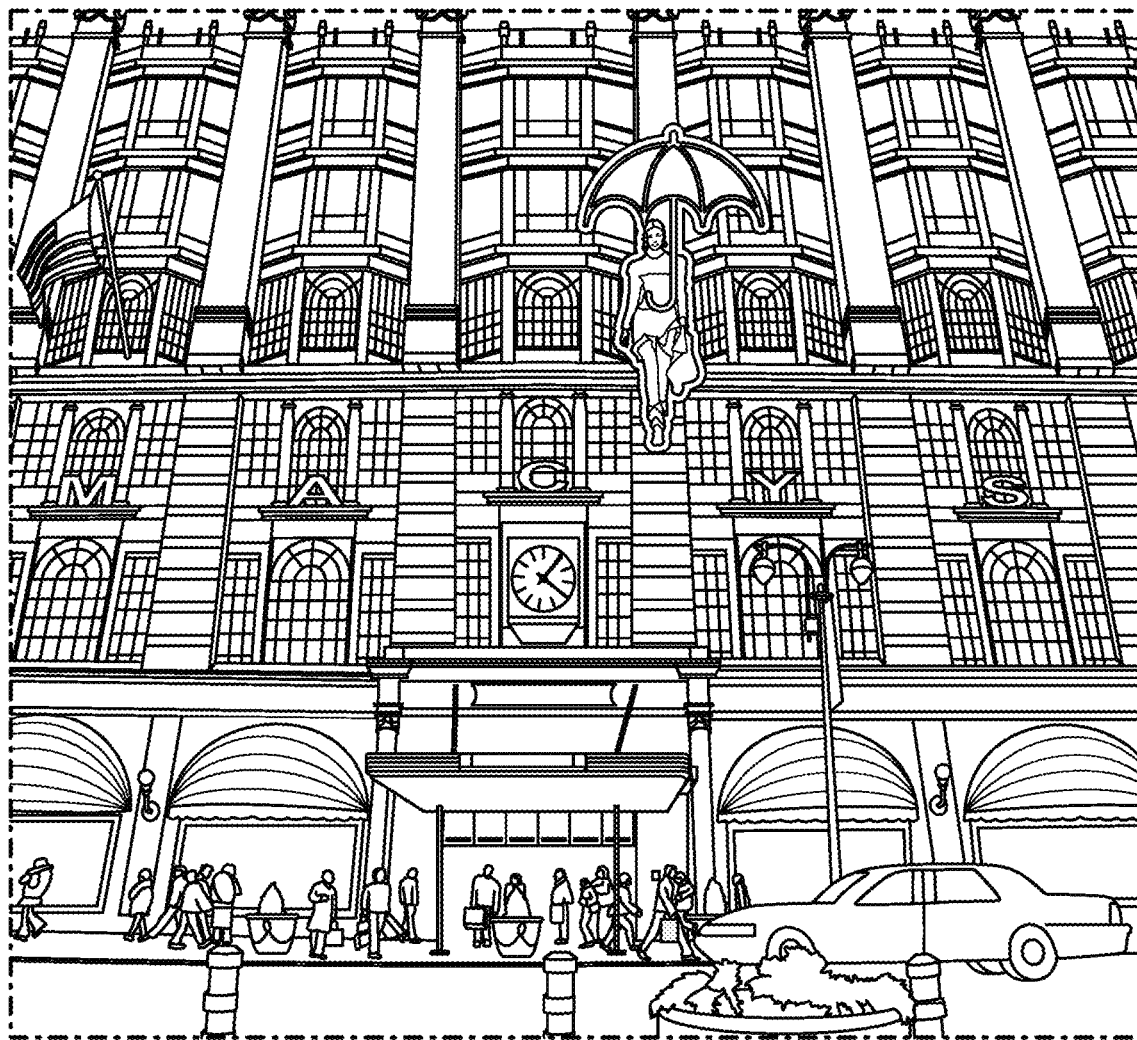
FIG. 12 depicts multiple virtual objects overlayed on top of one another in a virtual environment on a storefront, in accordance with some embodiments of the disclosure.

FIGS. 11 and 12 are examples of virtual objects displayed on a surface. FIG. 11 is a block diagram of virtual objects (purses) overlayed in a virtual environment on a storefront, in accordance with some embodiments of the disclosure. As depicted, in one embodiment, the purses may be overlayed next to each other in a horizontal manner. Other configurations such as a vertical placement, a diagonal placement or a random placement of the purses are also contemplated.

FIG. 12 is a block diagram of multiple virtual objects, a runway model and an umbrella, overlayed in a virtual environment on a storefront, in accordance with some embodiments of the disclosure. As depicted, one virtual object may be combined with another virtual object and the two overlayed together. In another embodiment, a first virtual object may be overlayed, and based on an immediate need, a second virtual object may be overlayed on top of the first virtual object. For example, a runway model is shown as a virtual object overlayed above the Macy's logo. The control circuitry, such as control circuitry 3420 of FIG. 34, may determine that the user is at a location where it is about to rain in the next few minutes. The control circuitry may make such a determination based on accessing local weather reporting sites. Based on such a determination, the control circuitry may overlay an umbrella on top of the model to indicate to the user that it is about to rain and that they should take appropriate action, such as obtaining an umbrella or moving to a covered space to seek cover from the rain.

Referring back to block 430 of FIG. 4, upon overlaying the virtual object at a desired location on the surface and in accordance with the policy, the virtual object may be enhanced. In another embodiment, the virtual object may be enhanced prior to overlaying it at a desired location on the surface.

The level and type of enhancement may also depend upon the type of engagement between the user and the virtual object. For example, a higher level of engagement with a virtual object may result in a higher level of enhancement than would a lower level of engagement with another virtual object displayed at the same time. What feature of the virtual object to enhance may also be determined, such as by an AI algorithm, by which part of the virtual object the user finds more interesting that other parts. For example, a user may find the logo of a brand or the handle of a purse more attractive than other portions of the purse, so such areas will be the subject of enhancement. Such determination of which feature of the object to enhance may be determined by the AI algorithm based on the gaze of the user directed towards a particular feature or some other engagement by the user, such as the user zooming in to a specific area of the virtual object.

Enhancements may include increasing the size of the virtual object, changing the color or texture of the virtual object, changing the depth perception of the virtual object by making it appear closer or farther to the viewer, and highlighting or adding a border around the virtual object. Enhancements may also include animating the virtual object. Some examples of the enhancements are provided in FIG. 13.

Figure 13:
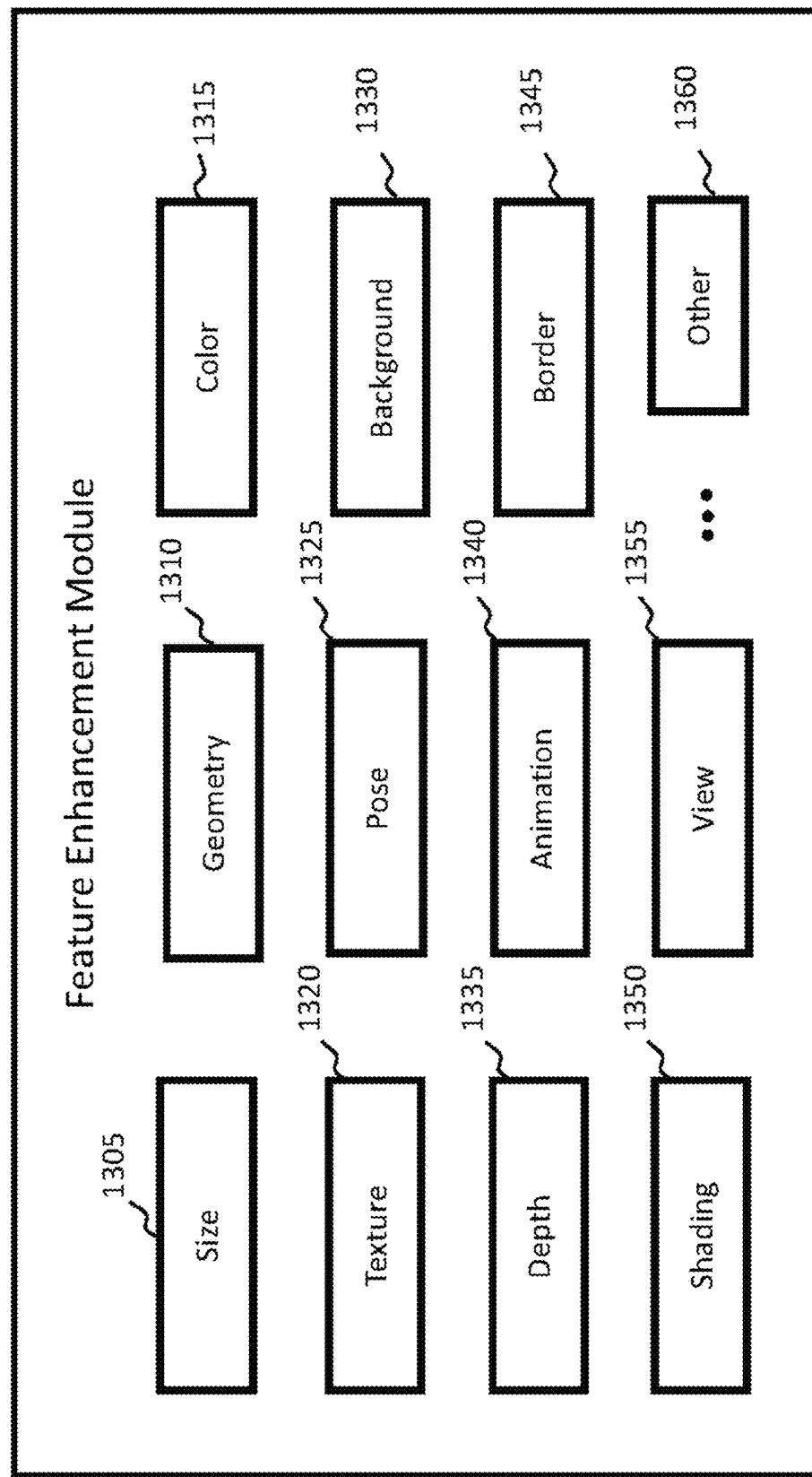
FIG. 13 is a block diagram of enhancements that may be made to a virtual object, in accordance with some embodiments of the disclosure.

As depicted in FIG. 13, enhancements may include any one or more of the enhancements listed in blocks 1305-1360. A feature enhancement module 1300 may be activated to determine the type of enhancements to be made.

At block 1305, in one embodiment, the size of the virtual object may be enhanced. The control circuitry, such as control circuitry 3420 of FIG. 34, may determine a size that is within the confines of the allotted space by the policy to enhance the virtual object. For example, as depicted in FIG. 14, one of the virtual objects, i.e., a red purse, is enhanced by increasing its size such that it is more apparent to the viewer then the other purses also displayed at the same time. Likewise, the pink purse may be enhanced by reducing its size such that the viewer's focus is first directed towards the red purse. The control circuitry may determine which of the multiple virtual objects displayed to enhance by increasing its size based on that user interest score calculated, referred to earlier in FIGS. 6 and 7. As such, when multiple virtual objects are displayed, a virtual object receiving the highest score may be increased to a larger size than other virtual objects receiving a lower score.

At block 1310, in one embodiment, the geometry of the virtual object may be enhanced. The control circuitry 3420 may determine to enhance the geometry of the virtual object. For example, the control circuitry may stretch the object to make it more rectangular or present it in a circular fashion. The control circuitry may also apply other geometric changes to the displayed virtual object.

At block 1315, in one embodiment, the color of the virtual object may be enhanced. The control circuitry may change the color of the virtual object to make it more appealing to the user such that it may attract the user's attention. For example, the control circuitry 3420 may change the color to a brighter color or a color that stands out in contrast to the background.

At block 1320, in one embodiment, the texture of the virtual object may be enhanced. The control circuitry may change the texture of the virtual object. For example, the control circuitry may make a certain part of the virtual object smoother in texture or apply grid lines in certain areas. For example, the control circuitry may apply texture effects to a face of an individual and display it as a virtual object to make the face more appealing.

At block 1325, in one embodiment, the pose of the virtual object may be enhanced. The control circuitry 3420 may change the pose of the virtual object, such as from facing right to facing left or sitting down to standing up or it may make other pose changes. The control circuitry may also change a pose such that the virtual object appears different from other virtual objects that may be displayed along with it.

At block 1330, in one embodiment, the background of the virtual object may be enhanced. The control circuitry may change the background such that the virtual object is displayed more prominently. For example, the control circuitry may change the background color such that a better contrast is achieved between the virtual object and the background and the virtual object stands out more, such as with a different colored background. The control circuitry, through use of the AI algorithm, may determine colors, brightness, and contrast for the background, such that the virtual object that is bright may show up vibrantly on a particular background color, such as blue on black. Since strong contrast plays an important role in attracting attention to a space, the control circuitry may change the background either once or continuously or periodically over a period of time. It may also ensure that the contract is not so stark that it is eye-straining to the user. The control circuitry 3420 may also utilize design tools that fix the color combination between foreground and background such that virtual objects are displayed in their true natural colors, such as clouds in white, etc.

At block 1335, in one embodiment, the depth of the virtual object may be enhanced. The control circuitry may change the depth perception of the virtual object from a 2D to a 3D or move it closer or farther in appearance from the user to vary the virtual object's depth perception. For example, a purse displayed on a Macy's surface may be embossed or shown as closer to the user's eye to attract the user's attention.

At block 1340, in one embodiment, the virtual object may be enhanced by applying animations it. In one embodiment, the control circuitry may animate the virtual object to reflect or copy a motion performed by the user. For example, in some instances, the virtual object may be a depiction of a person, an animal, or some animation character. The control circuitry may animate such person, animal, or animation character by making them perform an action similar to that of the user viewing the virtual object, such as walking, jogging, jumping, or running. The animations may also include performing some other movement of the displayed virtual object.

In another embodiment, the control circuitry may animate the virtual object in another manner when the virtual object is not a person, animal, or an animation character and in its natural state it would not be in motion, such as purse or a chair. It may also be the case that the user is not in motion, and as such there is no user motion to copy for animation. In such instances, the control circuitry may animate the virtual object by rotating the virtual object, increasing and decreasing the depth perception, or applying other animated effects that are suitable for the virtual object, such as fade in, swivel, or bounce.

At block 1345, in one embodiment, the border of the virtual object may be enhanced. The control circuitry may change the border around the virtual object such that the virtual object or the border draws the attention of the user. For example, the control circuitry 3420 may create a thick border around the virtual object or create a border of a distinct color, such as pink or red, that stands out.

At block 1350, in one embodiment, the shading of the virtual object may be enhanced. The control circuitry may shade the virtual object or its surroundings. For example, the shading may be a different color, a grid pattern, or a texture that is different from the virtual object or its surroundings that draws the attention of the user.

At block 1355, in one embodiment, the view of the virtual object may be enhanced. The control circuitry may change the view of the virtual object from an isometric view to a side view, rotate it a certain angle such as 90 or 180 degrees, provide a different perspective view, or constantly or periodically keep orienting the object at different angles in an attempt to draw the user's attention to the virtual object.

Although some embodiments of enhancements were described in FIG. 13, the types and combinations of enhancements are not so limited. For example, the control circuitry may combine any one or more of blocks 1305-1355 to enhance a virtual object. It may also allow the user to create their own enhancements or store enhancement preferences in their profile that can be used when enhancing a virtual object. A user who likes certain colors or a user who has prescription glasses or other eyesight problems may also customize the enhancements to their needs.

Some examples of enhancements mentioned in FIG. 13 are depicted in FIGS. 14-17. In one embodiment, as depicted in FIG. 14, the control circuitry may enlarge a red purse that scores higher for the user as compared to a black or a pink purse. Enlarging the red purse makes it more prominent than other virtual objects that are also posted on the surface, such that the red purse grabs the user's attention.

Figure 15:
FIG. 15 depicts multiple objects arranged in a vertical order and the top virtual object enhanced in size, in accordance with some embodiments of the disclosure.

In another embodiment, as depicted in FIG. 15, the control circuitry, such as control circuitry 3420 of FIG. 34, may rearrange the order of the purses, such as a vertical order, and enlarge the red purse that scores higher for the user as compared to a black or a pink purse in an attempt to gain the user's attention to the red purse. The height of the vertical order or the arranging of the red purse at the top, middle, or the bottom of the vertical order may also be determined based on the user's gaze. The height and order of the price placement within the vertical order, or any other order selected, may also depend on AI recommendations. For example, if the AI algorithm determines the likelihood of the user's gaze being in a particular direction, then the purse that scores the highest may be placed at such a location in an attempt to attract the user's gaze.

Figure 16:
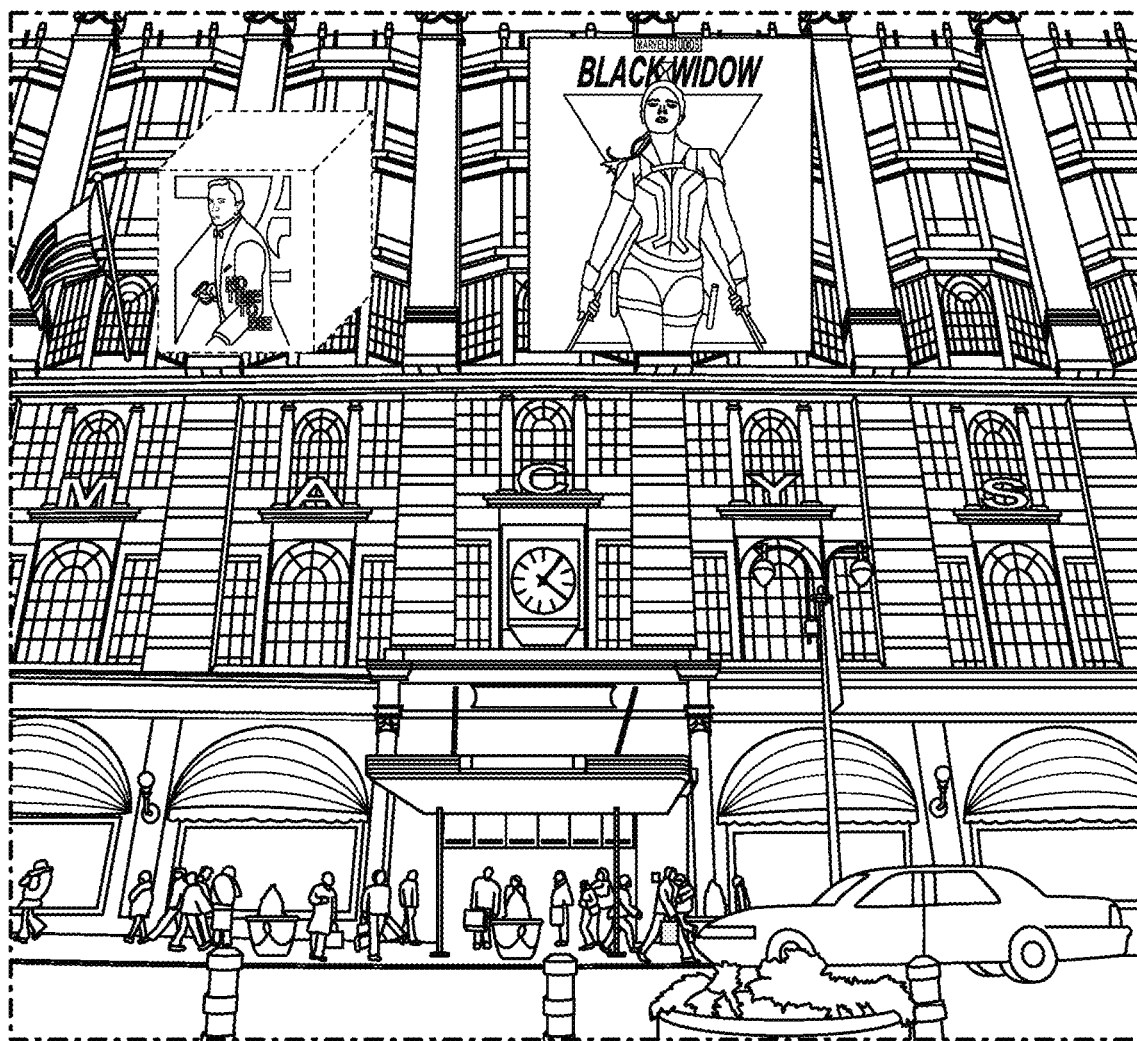
FIG. 16 depicts multiple objects overlayed on a surface where the depth perception of one of the virtual objects has been enhanced, in accordance with some embodiments of the disclosure.

In yet another embodiment, as depicted in FIG. 16, the control circuitry 3420 may place two virtual objects side by side and change the depth perception of one of the virtual objects. As depicted, the James Bond virtual object that relates to a James Bond movie, "No Time to Die," may have been changed from a 2D to a 3D image, and the depth perception may have been changed such that it appears closer to the user's eye than the other virtual object, the movie poster of "Black Widow."

Figure 17:
FIG. 17 depicts multiple virtual objects overlayed on top of one another in a virtual environment on a storefront, in accordance with some embodiments of the disclosure.

As depicted in FIG. 17, which is another example of an enhancement, two virtual objects may be placed on top of each other such that both virtual objects are visible to the user. As depicted, the logo of the New York Yankees is placed on top of a guitar such that when a user looks at one virtual object, they see both virtual objects at the same time for that particular gaze. When overlaying one virtual image on top of another virtual image, the control circuitry 3420 may determine an overlay location for the virtual images that allows both virtual images to be visible at once.

Figure 18B:
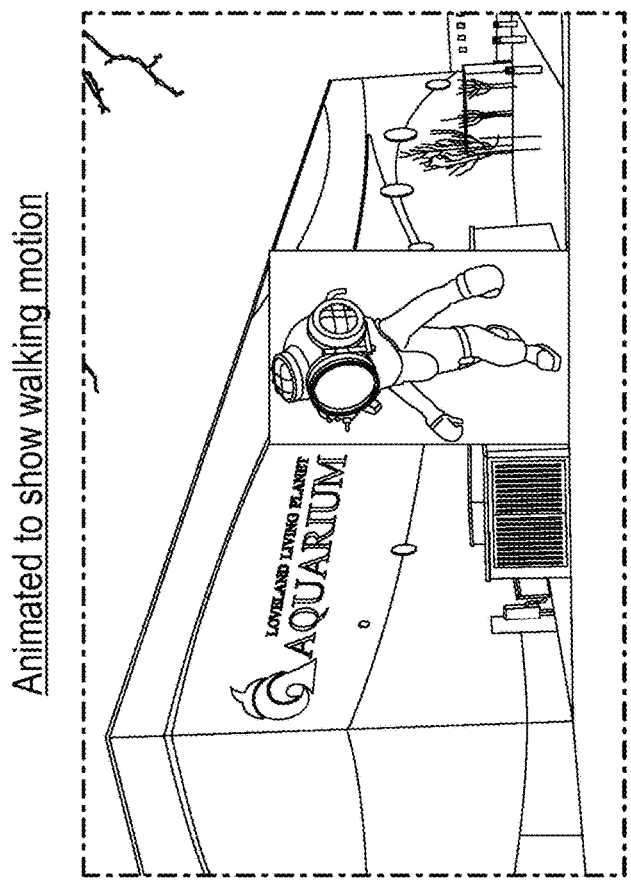
FIG. 18B depicts a virtual object of the deep-sea diver shown animated as walking, in accordance with some embodiments of the disclosure.
Figure 18A:
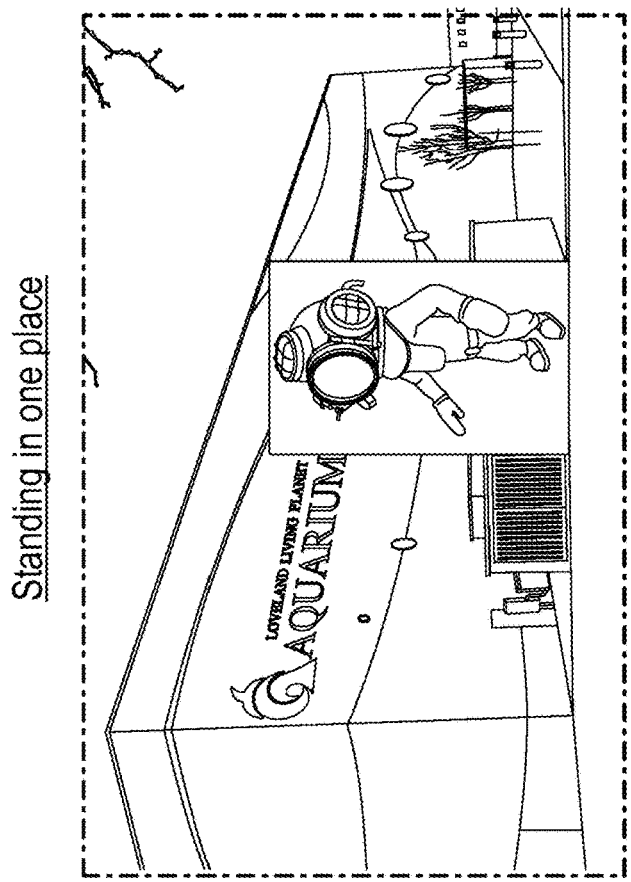
FIG. 18A depicts a deep-sea diver as a virtual object overlayed on the surface of an aquarium building, in accordance with some embodiments of the disclosure.

In yet another embodiment, as depicted in FIGS. 18A and 18B, the control circuitry, such as control circuitry 3420 of FIG. 34, may animate the virtual object. As described above in block 1340 of FIG. 13, the animation may reflect or copy a motion performed by the user, and even when the virtual object is not a person, animal, or animation character, such as a toy that has arms and legs and could reasonably be animated as walking, the animations may still include performing some movement of the displayed virtual object. As depicted in FIG. 18A, a character wearing deep-sea diving head gear is shown outside the surface of an aquarium where the character is standing still in one place. As shown in FIG. 18B, the character wearing the deep-sea diving head gear is enhanced by the control circuitry applying animations to show the character as walking. In one embodiment, the walking pace, style, and motion may resemble that of the user. The control circuitry 3420 may obtain such user walking style, pace, or motion data through the device camera, gyroscope, accelerometer, heart rate monitor, and pictures and videos of the user that may have been stored by the user showing the user performing a walking motion. The control circuitry may determine whether to animate the character in a manner similar to the motion of the user or to apply other animations. Such determinations are further described in discussion of FIG. 19 below.

Figure 19:
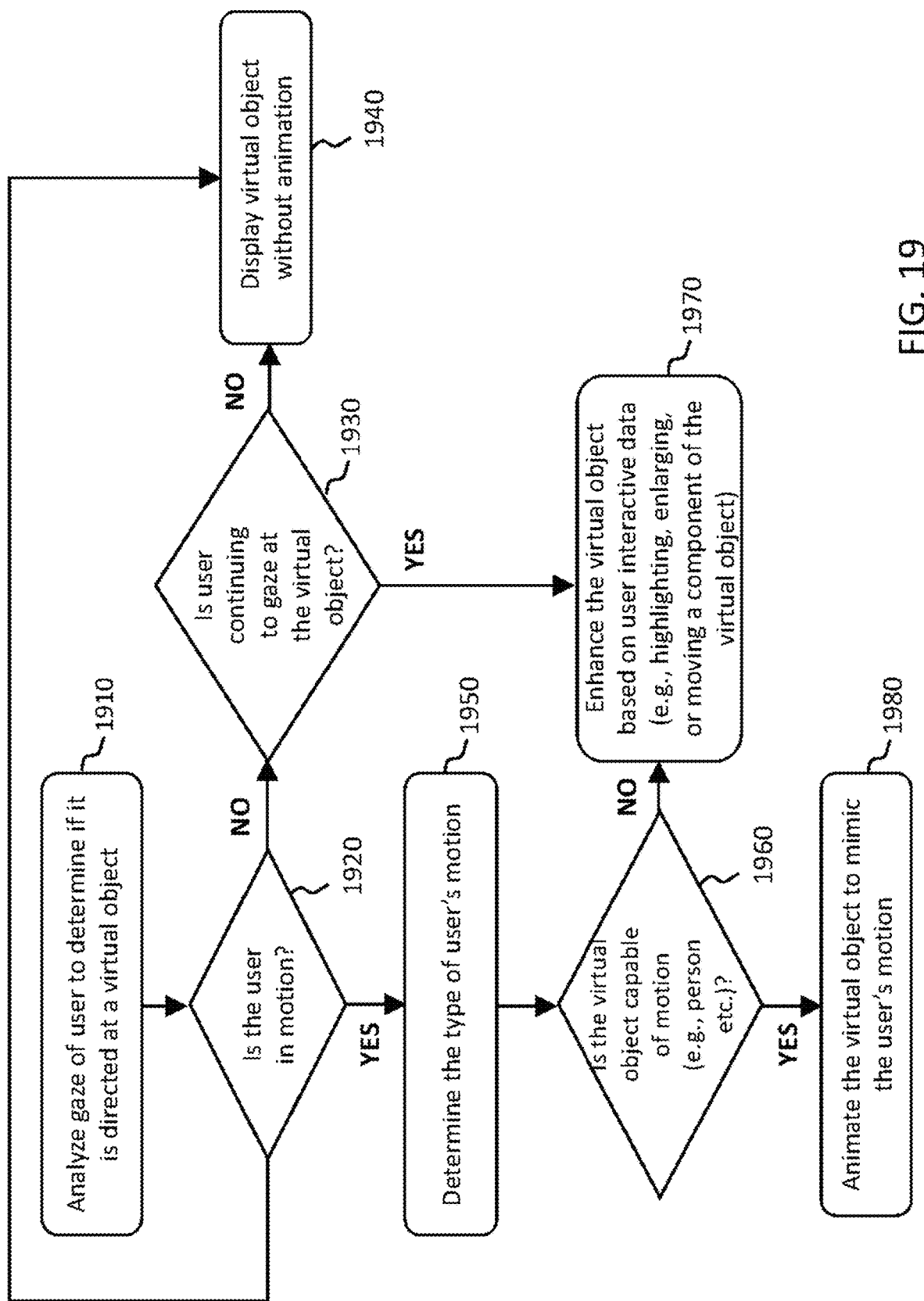
FIG. 19 is flowchart of a process for determining the type of animation to apply to a virtual object, in accordance with some embodiments of the disclosure.

FIG. 19 is flowchart of a process for determining the type of animation to apply to a virtual object, in accordance with some embodiments of the disclosure.

In one embodiment, at block 1910, the control circuitry, such as control circuitry 3420 of FIG. 34, may analyze the gaze of the user to determine if it is directed at a virtual object. In response to determining that the gaze is directed to a virtual object, the control circuitry may then determine to enhance the virtual object (not shown in figure).

At block 1920, the control circuitry 3420 may determine if the user is in motion. For example, the control circuitry may access a user device associated with the user and specifically certain components of the device, such as heartbeat monitor, accelerometer, gyroscope, camera and other features, to determine whether the user is in motion. If a determination is made that the user is not in motion, then, in one embodiment, the control circuitry may move the process to block 1940 and display the virtual object without any animation.

In another embodiment, if a determination is made at block 1920 that the user is not in motion, then the control circuitry at block 1930 may determine if the user is continuing to gaze at the virtual object. If the user is continuing to gaze at the virtual object, the control circuitry may determine that regardless of the user being in motion, because of the higher user interest determined through the continued gaze, or repeated gazes, the control circuitry 3420, at block 1970, may still enhance the virtual object, such as by animating it. In this embodiment, the type of enhancements or animations at block 1970 may be different from what the control circuitry would have applied if the user was in motion. For example, the control circuitry may obtain interactive data from the user and apply enhancements such as highlighting, enlarging or moving a component of the virtual object.

If a determination is made by the control circuitry at block 1920 that the user is in motion, then, at block 1950, the control circuitry may determine the type of user motion. As mentioned above, the control circuitry 3420 may access a devices such as a camera, gyroscope, accelerometer, heart rate monitor, and other sensors and features to determine the type of the user's motion.

At block 1960, the control circuitry may determine whether the virtual object is a person or an animal or something else capable of motion. The control circuitry may also determine the type of virtual object, i.e., if it can be associated with the real-life living thing, such as a human, animal, fish, tree, or other organism or is a non-living object. It may also determine if the virtual object in its natural course would typically move from one location to another location without any human intervention, such as water or clouds. It may also determine if the nonliving virtual object, such as a toy, includes features such as hands, legs, fins, wheels on a car or other features that can be associated with motion. In one embodiment, distinguishing between a living and a nonliving thing may guide the control circuitry in determining what type of animation to apply.

In response to determining that the virtual object is capable of motion, then the control circuitry at block 1980 may animate the virtual object to mimic the user's motion. Alternatively, the control circuitry may animate the virtual object by showing it in motion, such as walking, running, jogging, rolling, flying, moving from one location to another, or in some other manner that is not necessarily reflective of the user's motion.

In response to determining at block 1960 that the virtual object is not capable of motion, then the control circuitry 3420 at block 1970 may obtain interactive data from the user and apply enhancements such as highlighting, enlarging, or moving a component of the virtual object or animating such enhancements.

Figure 20:
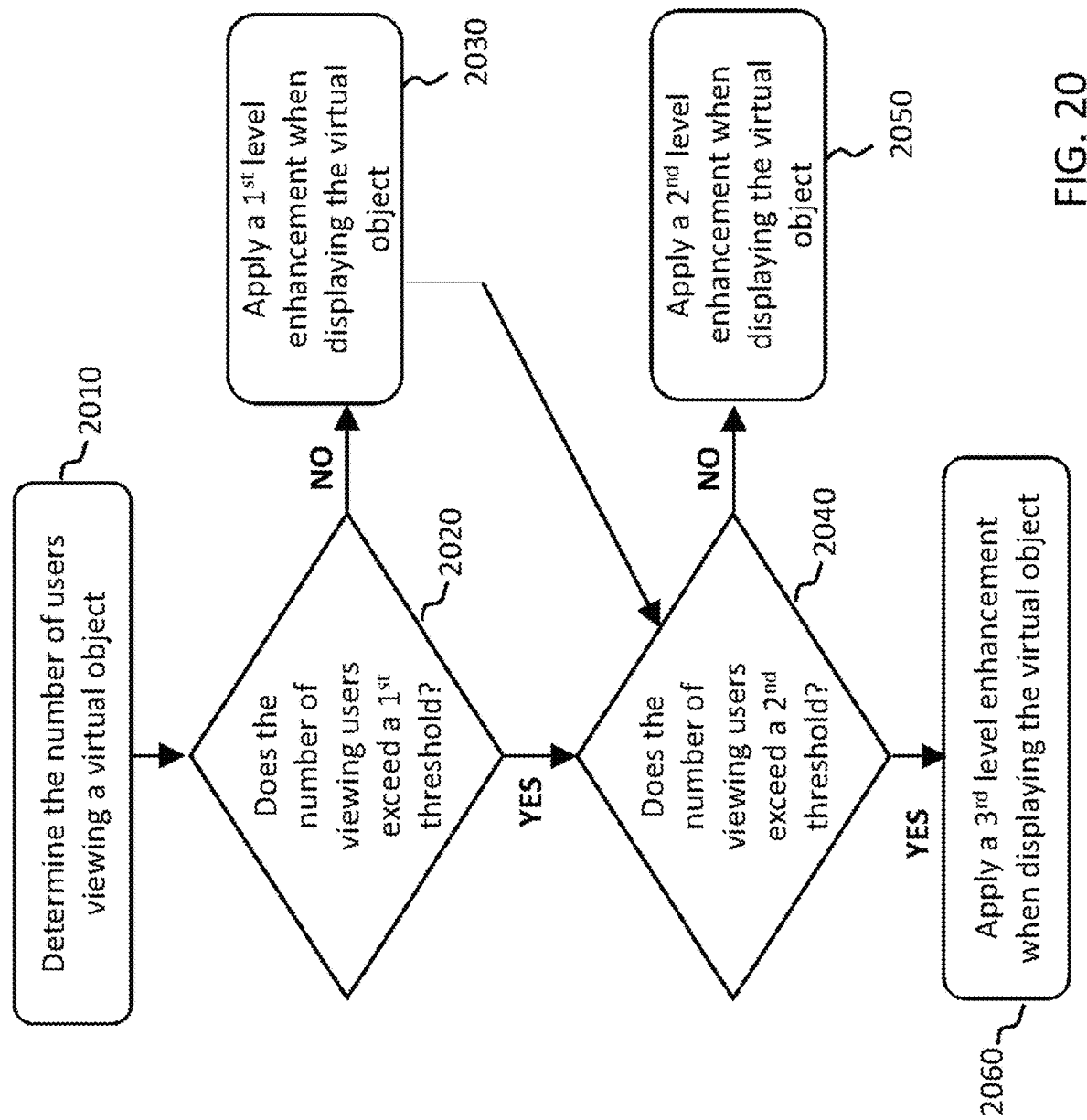
FIG. 20 is flowchart of a process for determining the type of animation to apply to a virtual object, in accordance with some embodiments of the disclosure.

FIG. 20 is flowchart of a process for determining the type of enhancement to apply to a virtual object, in accordance with some embodiments of the disclosure. In some embodiments, an enhancement to the virtual object may be made based on the user's gaze or interest in the virtual object. In another embodiment, enhancements to the virtual object may be made if a plurality of users are interested in the same virtual object or the category of the same virtual object. If more users are viewing the same virtual object, the control circuitry, such as control circuitry 3420 of FIG. 34, may determine that as indicative of a popular virtual object or a virtual object that may likely interest the user. Enhancements may also depend on the number of people viewing the same virtual object, and different categories of enhancements may be applied based on that number.

The process of determining enhancements based on determining the number of users interested in the virtual object may begin at block 2010 where the control circuitry may determine the number of users viewing a same virtual object or a category of the same virtual object. In one embodiment, the control circuitry may make such a determination based on crowd sourcing data from a plurality of devices within a certain location. For example, as depicted and FIG. 21, five people are checking out a restaurant that serves tacos while 12 are checking out a restaurant that serves Pho/noodles in Times Square in New York.

The control circuitry may present virtual objects such as the taco restaurant and the pho/noodles restaurant to the user in their virtual environment, such as on the screen of their transparent glasses or on a display of a mobile device. In one embodiment, display of such virtual objects may be in response to determining that the user is looking for a place to eat in Times Square. In another embodiment, the user may have searched for a place to eat or mentioned that they are hungry, and the device may have picked that comment up in its microphone and analyzed it to determine that choices of restaurants displayed as virtual objects may be timely and of interest to the user. The control circuitry 3420 may also enhance the pho/noodles place to a higher level of enhancements than the taco restaurant because the number of people looking at the pho/noodles place is higher than the number of people looking at the taco restaurant, as described in blocks 2020-2060.

Referring back to block 2010, once the number of users viewing a virtual object, or a category of virtual objects, such as restaurants or food places, has been determined, the control circuitry make compare the number of viewing users to a first threshold at block 2020. The threshold may be a predetermined number that is set by the user or by the system.

At block 2020, in response to determining that the number of viewers has not exceeded a first threshold, the control circuitry may apply a first level of enhancement to the displayed virtual object, as described in block 2030.

At block 2040, in response to determining that the number of viewers exceeds the first threshold, the control circuitry may determine whether the number of viewers exceeds a second threshold. In response to determining that the number of viewers does not exceed a second threshold, the control circuitry may apply a second level of enhancement to the displayed virtual object, as described in block 2050.

At block 2040, in response to determining that the number of viewers does exceed a second threshold, at block 2060 the control circuitry 3420 may apply a third level of enhancement to the displayed virtual object. The number of enhancement levels may vary on a case-by-case basis, and in certain cases there may be only one or two enhancement levels, while in other embodiments there may be several layers of enhancement levels.

Figure 21:
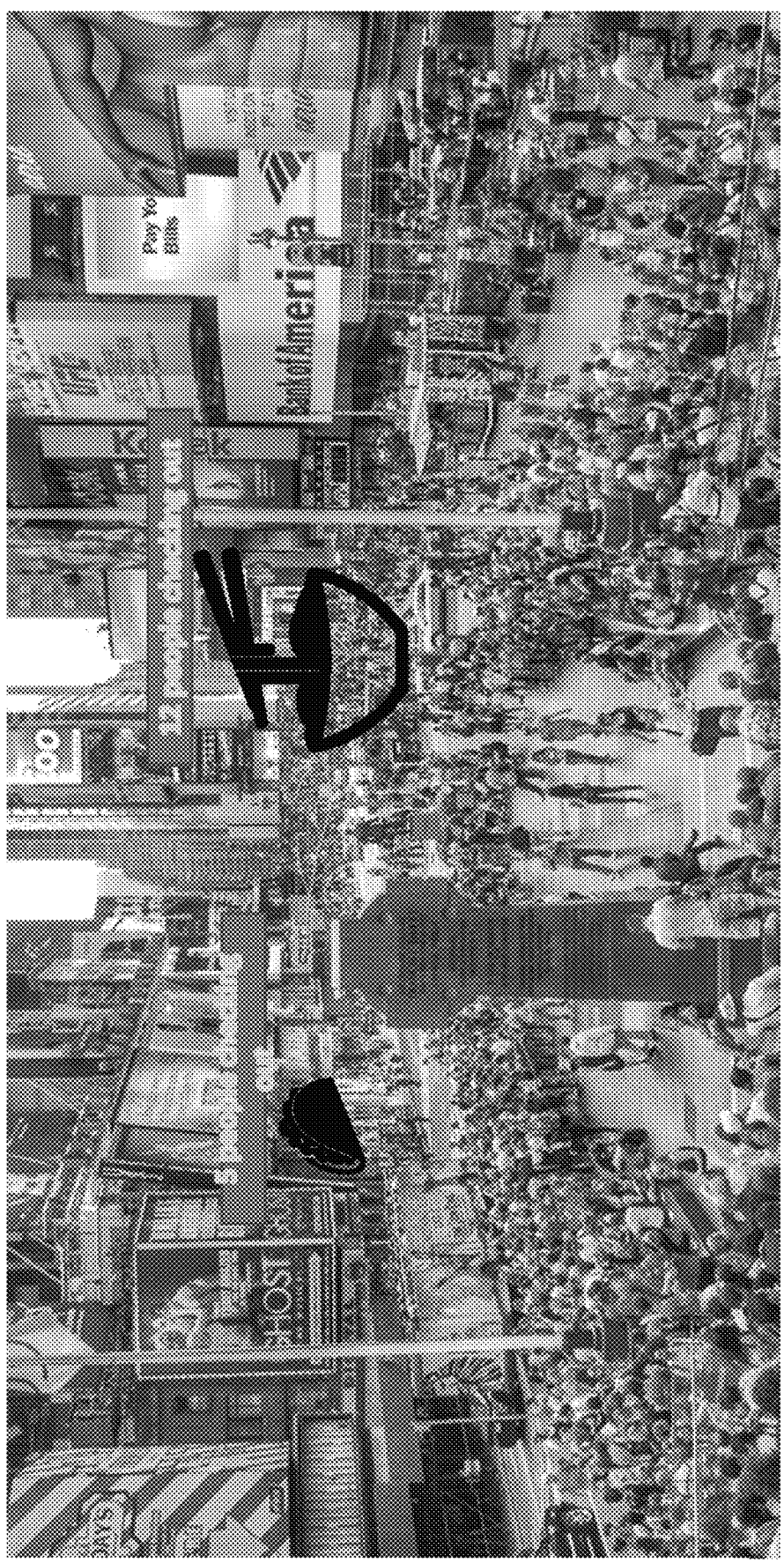
FIG. 21 depicts a virtual object of multiple icons representing food choices/restaurants overlayed on an areas shown as crowded with people, in accordance with some embodiments of the disclosure.

In one example, as depicted in FIG. 21, if a first threshold is set at 10, the control circuitry may determine that the number of viewers for the taco restaurant, which has five viewers, does not exceed the first threshold of 10, while the number of viewers for the pho/noodles restaurant, which has 12 viewers, exceeds the first threshold. As such, if the type of enhancement to be applied is to increase the size of the virtual object, then the taco restaurant would receive a first level of enhancement, as it does not exceed the first threshold, which is smaller size display of a taco, while the pho/noodles restaurant, which exceeds the first threshold, would be displayed as a larger-size pho/noodles icon that is larger than the taco icon.

Figure 22:
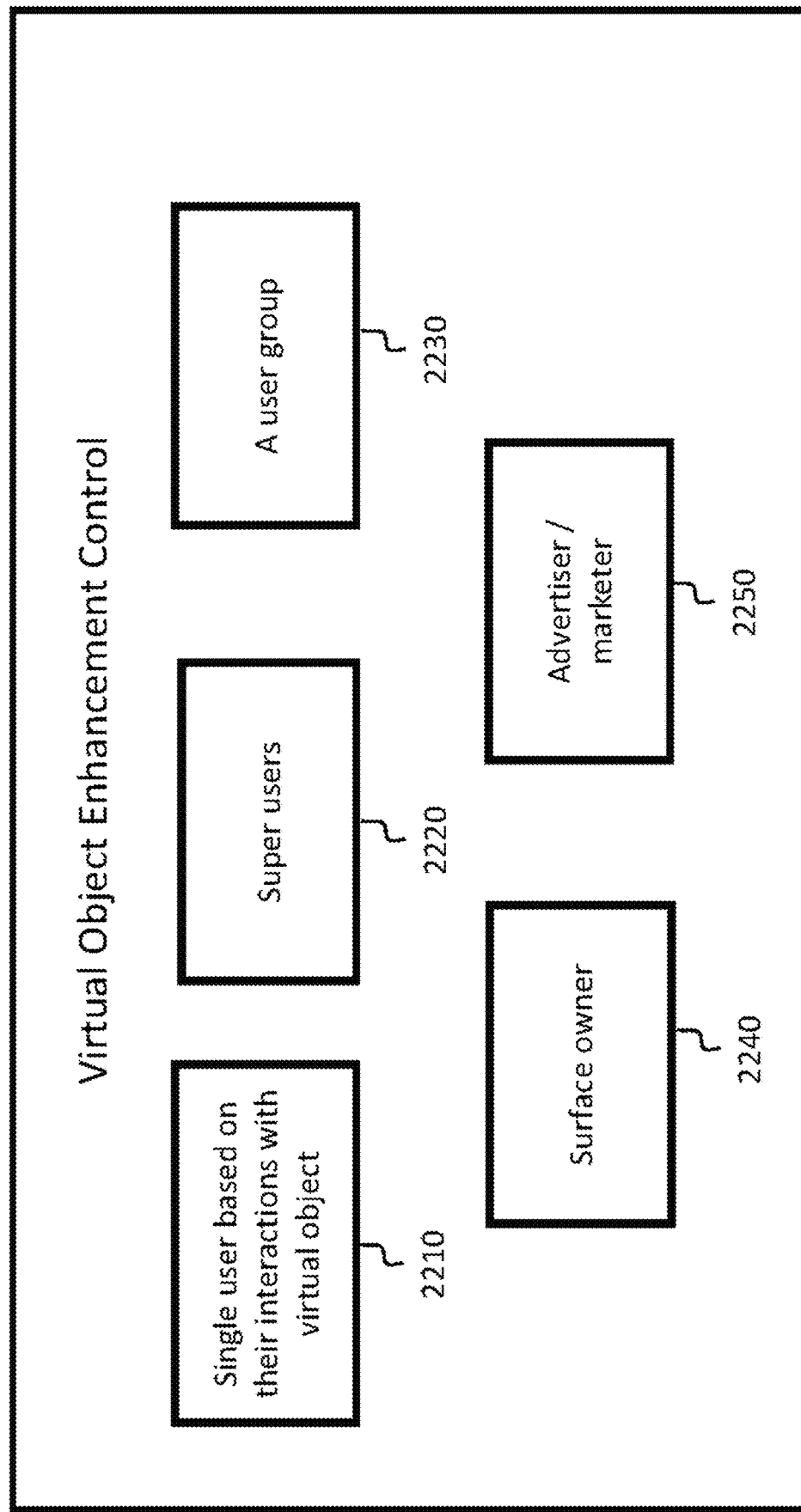
FIG. 22 is a block diagram depicting ownership and control of a virtual object, in accordance with some embodiments of the disclosure.

FIG. 22 is a block diagram depicting ownership and control of a virtual object, in accordance with some embodiments of the disclosure. In one embodiment, control of the virtual object may be retained by the surface owner, the creator or owner of the virtual object, or a third party. The control of the virtual object may also be transferred from one entity to another entity. Whoever controls the virtual object may have the ability to display or enhance the virtual object as desired as long as it complies with the policies of the surface on which it is to be overlayed.

In one embodiment, as depicted at block 2210, a single user that has interacted with the virtual object may be provided ownership and control of the virtual object. Once control is obtained, the user may display or enhance the virtual object as desired as long as it complies with the policies of the surface on which it is to be overlayed.

In another embodiment, as depicted at block 2220, a super user may be granted ownership and control of the virtual object. Once control is obtained, the super user may display or enhance the virtual object as desired as long as it complies with the policies of the surface on which it is to be overlayed. In one embodiment, a super user may be a user that has attained a certain level of interactions with virtual objects. In another embodiment, a super user may be a user who has received a certain number of recommendations by other users.

In yet another embodiment, as depicted at block 2230, a user group may be provided ownership and control of the virtual object. The user group may be defined as a certain type of users that are associated with each other, such as family, colleagues, students of a same institution, employees, etc. A user group may also be defined as desired. Once control is obtained, any user from the user group may display or enhance the virtual object as desired as long as it complies with the policies of the surface on which it is to be overlayed.

In another embodiment, as depicted at block 2240, the owner of the surface may retain control of the virtual object. For example, as depicted and FIG. 1, Macy's may retain the control of the virtual object and, as such, display or enhance the virtual object as desired.

Control of the virtual object may also be provided to an advertiser or marketer, as depicted in block 2250. If the advertiser or marketer is provided such control, then they may display or enhance the virtual object as desired as long as it complies with the policies of the surface on which it is to be overlayed.

Figure 23:
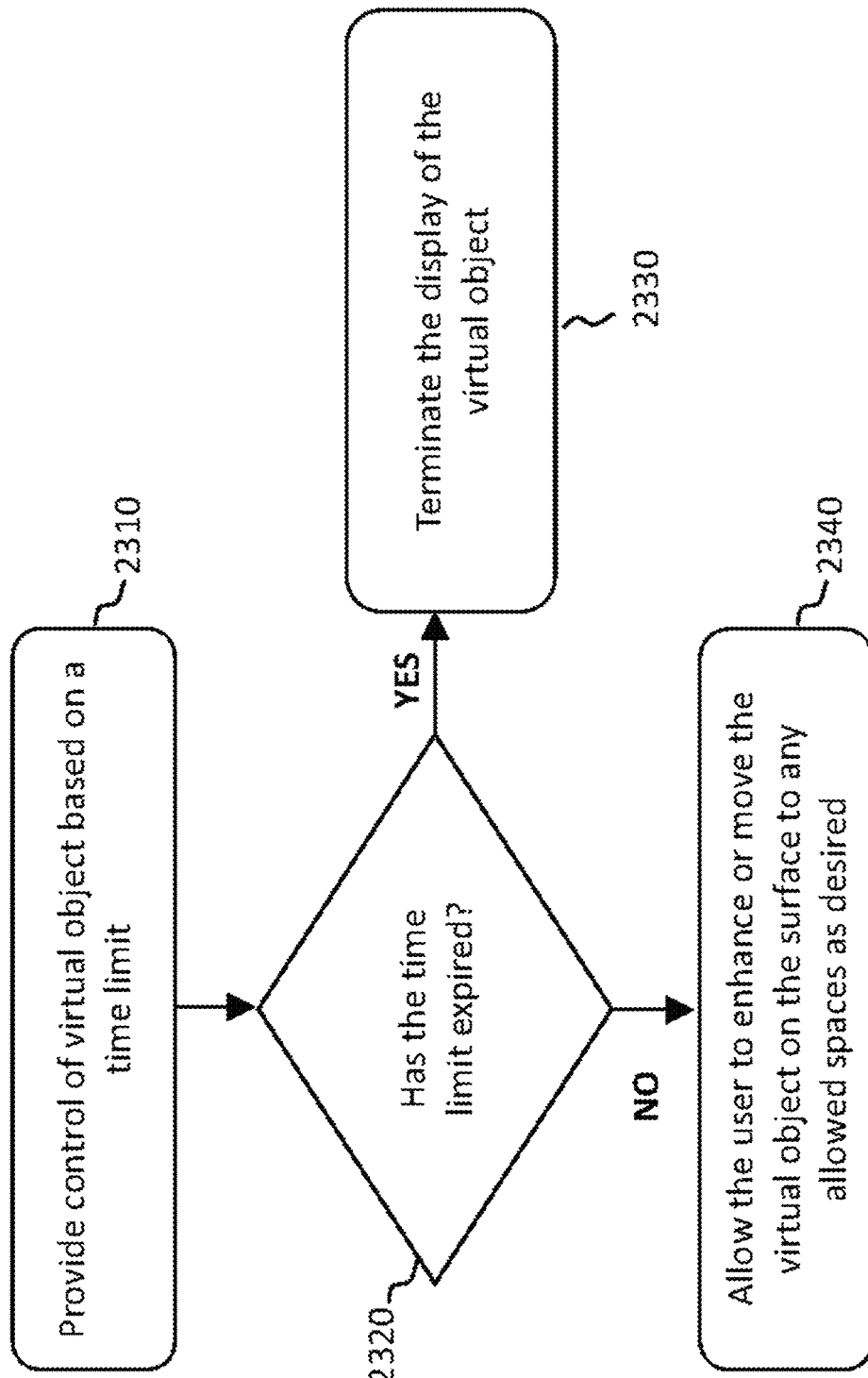
FIG. 23 is flowchart of a process for providing control of the virtual object based on time, in accordance with some embodiments of the disclosure.

FIG. 23 is flowchart of a process for providing control of the virtual object based on time, in accordance with some embodiments of the disclosure. In some embodiments, the control circuitry, such as control circuitry 3420 of FIG. 34, at block 2310, may provide control of the virtual object to a user based on a time limit. The control circuitry 3420 may determine at block 2320 if the time limit has expired. In response to determining that the time limit for which control was provided has expired, in one embodiment, at block 2330, the control circuitry may terminate the display of the virtual object from the surface on which it was overlayed. In another embodiment, instead of terminating the display of the virtual object after the time limit has expired, the control circuitry may transfer the control of the virtual object back to its original owner such that they may decide whether to display, enhance, or terminate the displayed virtual object.

In another embodiment, in response to determining that the time limit for the control provided has not expired, the control circuitry at block 2340 may allow the user to display, move, or enhance the virtual object as desired as long as it complies with the policies of the surface on which it is to be overlayed.

Figure 24:
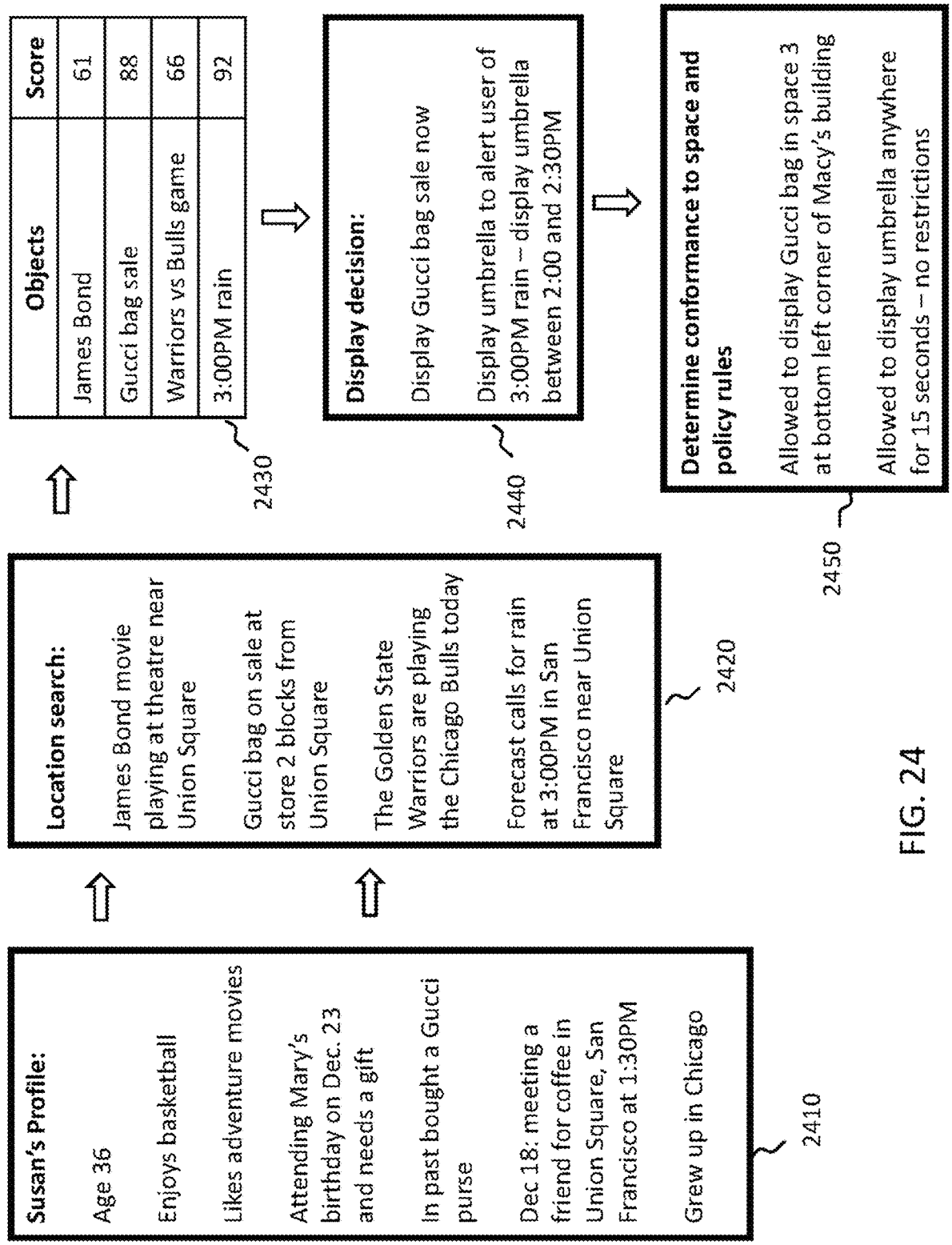
FIG. 24 is an example of one cycle of operation for analyzing a user profile and displaying a suitable virtual object, in accordance with some embodiments of the disclosure.

FIG. 24 is an example of one cycle of operation for analyzing a user profile and displaying a suitable virtual object, in accordance with some embodiments of the disclosure.

In one embodiment, at block 2410, the control circuitry 3420 may analyze the profile of a user, such as Susan, to determine what type of virtual object to overlay over a surface being viewed by Susan. Susan's profile may have been created through a variety of sources including Susan's own input, data based on Susan's consumption history, AI-based recommendations, and other input as described in blocks 510-530 of FIG. 5.

As depicted, Susan's profile contains certain details about Susan, her likes, activities, items she has bought in the past, her calendar, locations she plans to visit today and, in the future, her background, such as where she grew up, etc. These details were populated in Susan's profile as "Age 36, enjoys basketball, likes adventure movies, attending Mary's birthday on Dec. 23 and needs a gift, in past bought a Gucci purse, Dec. 18: meeting a friend for coffee in Union Square, San Francisco at 1:30 PM, and grew up in Chicago."

At block 2420, the control circuitry may perform a location search to determine if any of Susan's interests, likes, activities and other items listed in her profile match any offerings within a threshold distance of her current location. To perform such a search, the control circuitry may obtain the GPS coordinates of a device associated with Susan and determine what activities within a predetermined distance of the current GPS location provide offerings that match her profile.

Based on the search conducted, the control circuitry at block 2420 may list a plurality of items that may be of interest to Susan. Assuming that Susan is currently at Union Square in San Francisco, based on her current geo location, the control circuitry may, as depicted, list the following items as potentially of interest to Susan that are within a predetermined threshold distance of Union Square: James Bond movie playing at theater near Union Square, Gucci bag on sale at store two blocks from Union Square, the Golden State Warriors game with the Chicago Bulls being played today at Chase Center, which is within a few miles of Union Square, and the weather forecast, which calls for rain at 3:00 PM in San Francisco near Union Square.

In one environment, the control circuitry 3420 may utilize an AI algorithm to match Susan's profile with potential offerings that may be of interest to her. For example, since Susan grew up in Chicago and enjoys basketball, the AI algorithm may provide a recommendation that Susan would likely be interested in an NBA game of the Warriors versus the Chicago Bulls, her childhood home team, that is in the vicinity of Union Square. The AI algorithm may also recognize that Susan has previously bought a Gucci purse and, since she will be attending Mary's birthday on December 23rd and needs a gift, the sale of a Gucci bag close to her current location may likely be of interest to Susan. Similarly, because Susan enjoys adventure movies, the AI algorithm may also determine that a James Bond movie playing in a theater near Union Square would be of interest to Susan.

At block 2430, the potential items listed in block 2420, which are likely of interest to Susan, are scored. The scoring may be based on Susan's profile and other interactive actions taken by Susan that relate to the items listed in block 2420. For example, Susan may have commented about the James Bond movie in her social media feed, or she may have exchanged a phone call with a friend asking where to buy a Gucci bag for a great price. Since the control circuitry may have been provided access to all of Susan's accounts and devices, the control circuitry may access such data and use it to determine the scores. Other criteria used for determining a score for each of the items listed in block 2420 include categories listed in blocks 705-750 of FIG. 7

At block 2440, based on the scores computed in block 2430, the control circuitry made determined to display virtual objects relating to the top two scores, i.e., the Gucci bag, and an umbrella to alert Susan that it is about to rain in her current location.

Figure 25:
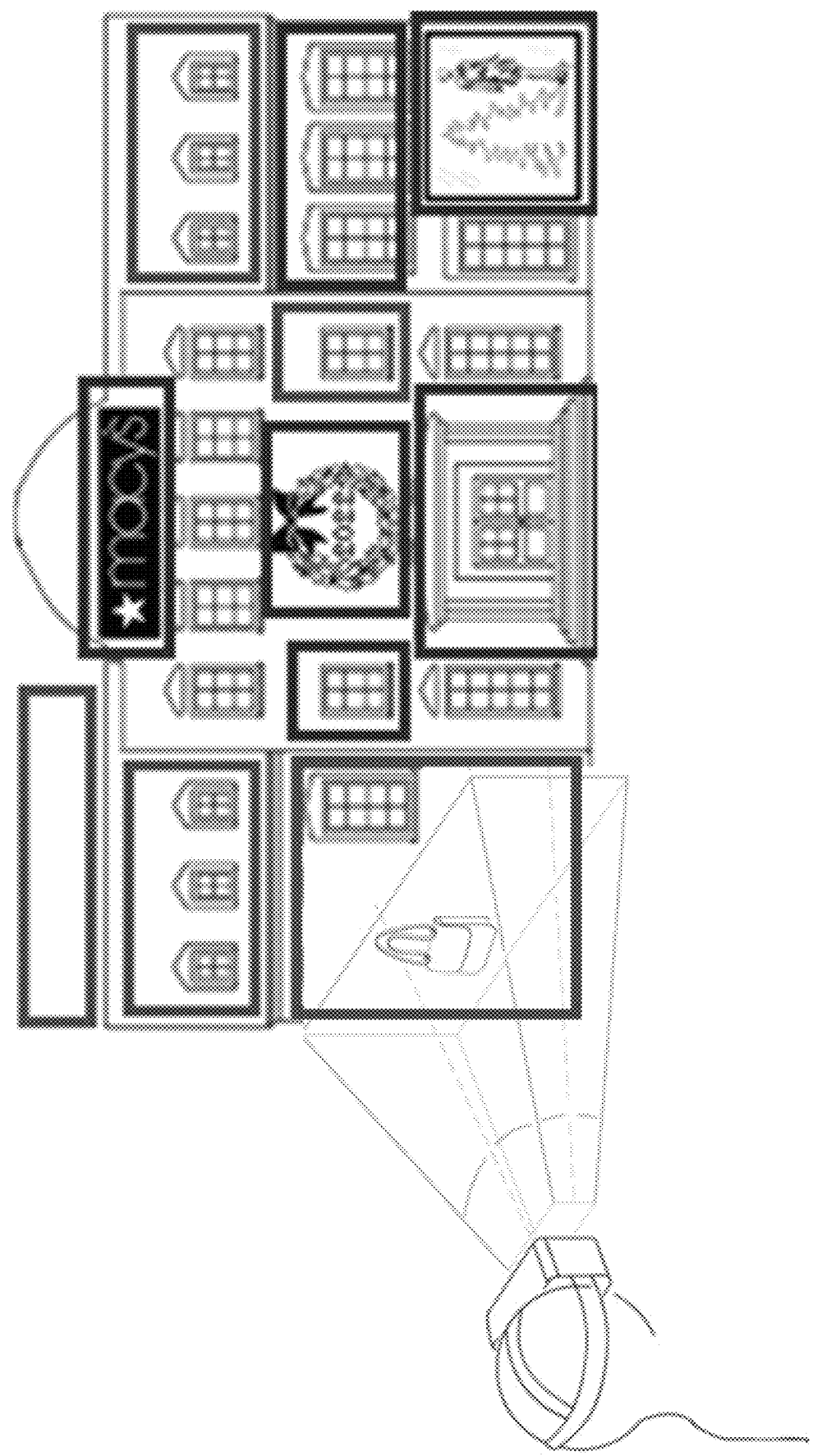
FIG. 25 depicts a user viewing a virtual image of a virtual object (purse) in the virtual environment of a virtual/augmented/mixed reality headset, in accordance with some embodiments of the disclosure.

At block 2450, the control circuitry may access the policy of the surface where the Gucci bag and the umbrella will be overlayed. It may analyze the policy to ensure that the virtual objects, Gucci bag and umbrella, conform to the rules and regulations listed in the policy. The control circuitry may also obtain from the policy the location and the amount of time allotted for displaying each virtual object. In one embodiment, based on the policy, as depicted in block 2450, the control circuitry 3420 may overlay a Gucci bag in space 3, i.e., at the bottom left corner of the Macy's building, such as the Macy's building depicted in block 11 of FIG. 1. The overlayed Gucci bag may then appear in the virtual environment of the device being used by the user, such as transparent glasses, mobile phone display, or a virtual or augmented reality headset, i.e., overlayed only in the virtual environment and not actually on the physical Macy's building that is being viewed by the user, as depicted in FIG. 25.

Likewise, at block 2450, the control circuitry may display an umbrella at any of the locations allowed by the policy, for a period of time allowed. In one embodiment, if the policy allows weather related data to be overlayed for a maximum period of 15 seconds, then the control circuitry will accordingly display an icon of an umbrella, or a particular type of umbrella, in the virtual environment for a maximum of 15 seconds.

FIG. 26 is a block diagram of various modules of a system for rendering a virtual object, in accordance with some embodiments of the disclosure. The system includes a scene analyzer 2610, a surface analyzer 2620, a data store 2650, a user analyzer 2660, a rendering unit 2640, a virtual object inventory database 2670, and an AR engine 2680.

In one embodiment, the scene analyzer 2610 accesses any one or more cameras, GPS, lidars, microphones, barometers or other sensors and components of the electronic device being used by the user to view a surface. The scene analyzer determines the details of a surface such as its dimensions, contours, curvature, size, geometric properties, color, texture, background, depth, and other details that provide a full picture of the surface. In some embodiments, the scene analyzer may determine such details by executing image recognition software.

The surface analyzer 2620, in one embodiment, analyzes the properties and policies associated with the surface including any areas and zones of the surface. The surface analyzer 2620 accesses the policy or policies and determines what virtual objects are allowed and restricted. It also determines locations and zones within the surface area where a virtual object may be overlayed. The surface analyzer 2620 also determines any rules and restrictions with respect to time of display of the virtual object, such as the amount of time that a certain type of virtual object may be overlayed in a location on the surface. It also determines what size, geometric properties, color, texture, pose, background, depth, types of animation, border, shading, and view from different angles of virtual objects are permitted and restricted.

The data storage 2650 may be used by the control circuitry, such as control circuitry 3420 of FIG. 34, to store data analyzed by the scene analyzer, surface analyzer, and user analyzer, including items such as user profile, AI algorithm recommendations, ML algorithm recommendations, consumption history, and other data that may be relevant in determining which virtual object to overlay, and which overlayed virtual object to enhance.

The user analyzer 2660 may analyze user behavior, user profile, user consumption history, and any other data that may aid in determining which virtual object to display and which virtual object to enhance. For example, the user analyzer may also access a plurality of platforms and databases to determine user activity as it relates to user preferences and likes and dislikes. This may include monitoring the user's interactions on social media, the user's texts with their contacts using the user's mobile phone, and emails and documents exchanged by the user with others. The data that may result from the analysis conducted by the user analyzer may be used by an AI algorithm to determine what virtual objects may likely be of interest to the user.

The rendering unit 2640 may be used to render the virtual object on a display screen of a device used by the user. For example, the rendering unit may overlay a virtual object on the screen of a mobile phone such that the user may see the overlayed virtual object in the mobile phone's virtual environment. The rendering unit may also overlay a virtual object on a transparent screen, such as a screen of transparent eyeglasses.

The virtual object 2D/3D inventory database 2670 may be used to store all virtual objects that can be used for overlaying on surfaces. The database may be populated by the control circuitry based on virtual objects obtained from a plurality of sources, such as sources described in blocks 535-565 in FIG. 5.

Figure 27:
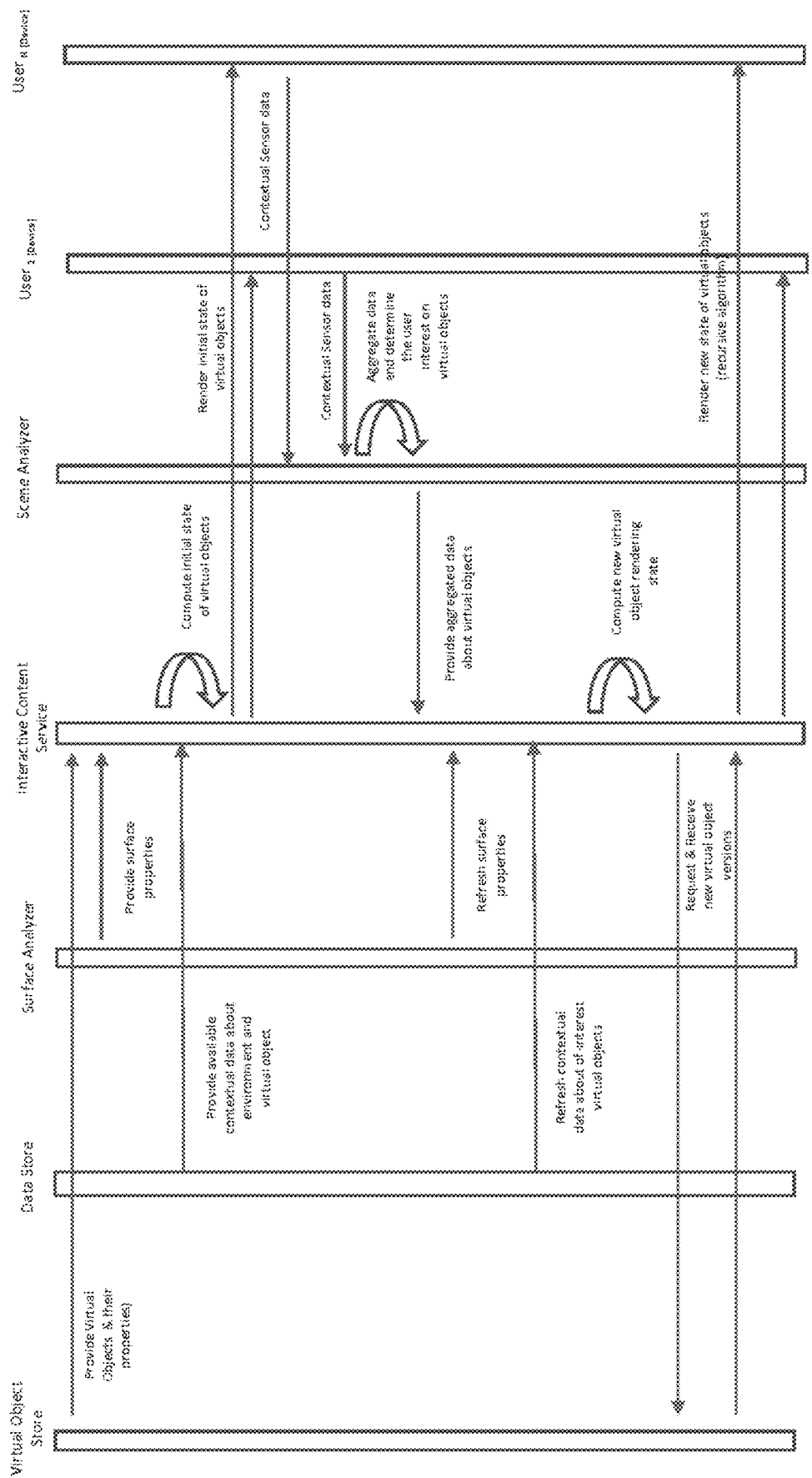
FIG. 27 depicts a flowchart of a process for rendering a virtual object on a surface, in accordance with some embodiments of the disclosure.

The AR engine 2680 may act as a central unit that communicates with all the modules 2610-2660. The AR engine may analyze data from any of the modules described and calculate an overall score that may be used to determine which virtual object to overlay and which virtual object to enhance. The AR engine may direct the rendering unit to overlay a virtual object based on the calculated scores. An end-to-end process, in one embodiment, for analyzing data from modules 2610-2670 is depicted in FIG. 27.

Figure 28:
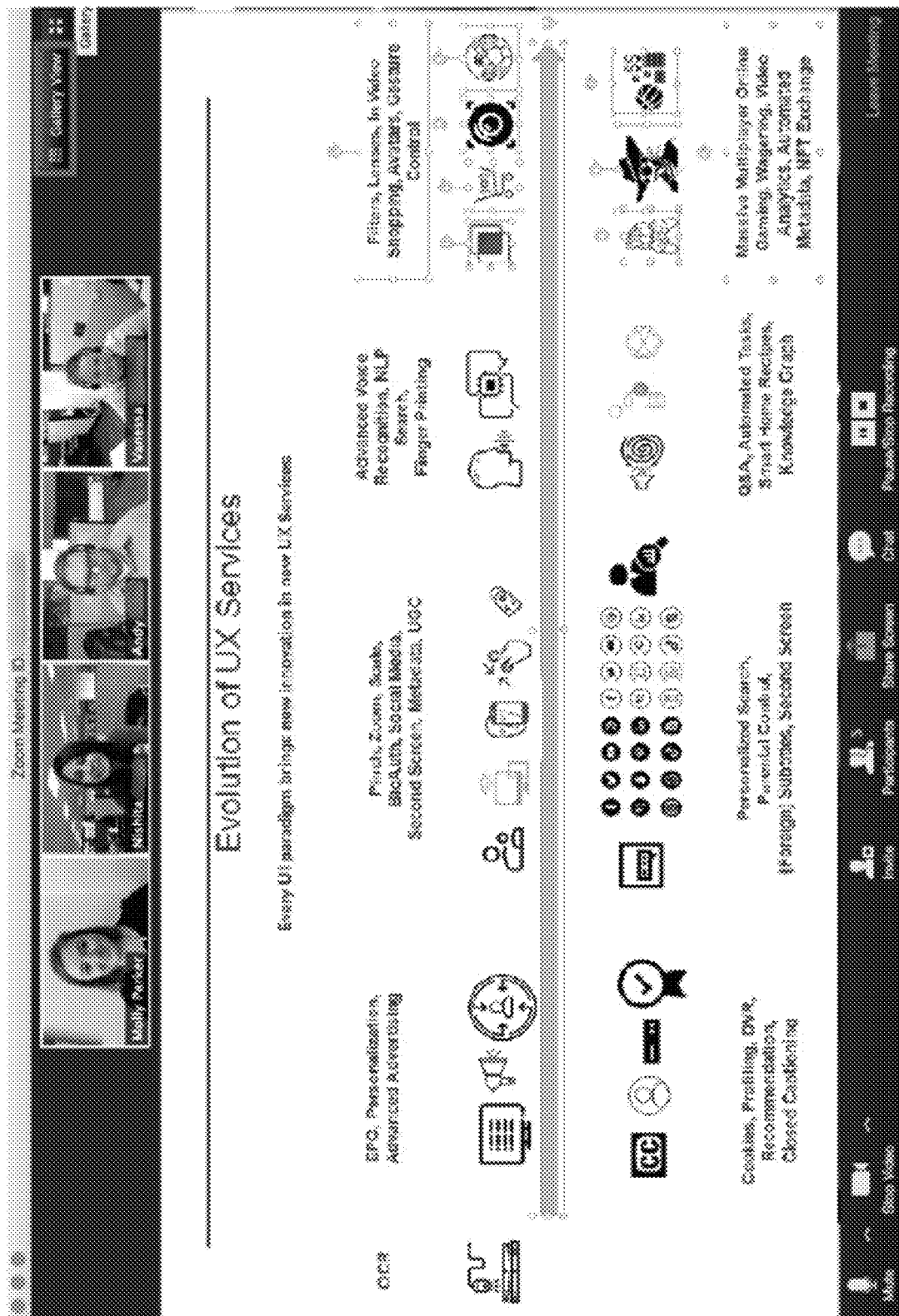
FIG. 28 is a screenshot of a virtual conference call, in accordance with some embodiments of the disclosure.

FIG. 28 is a screenshot of a virtual conference call, in accordance with some embodiments of the disclosure. The conference call includes four participants and shows a user interface displayed on the electronic device of each participant. The terms "user" and "participant" in the conference call setting are used interchangeably and shall mean the same thing herein. The user interface includes a plurality of icons, selection of which allows the user to invoke a functionality associated with each icon. These icons include conferencing tools, filters, search, gaming, personalization tools and more.

As depicted, in one embodiment, a menu of UX services displayed on the conferencing user interface may include an OCR icon for performing optical character recognition to recognize text from digital images posted during the conference call. In another embodiment, icons relating to personalization tools, advanced advertising, and display tools such as pinch, zoom, scale, second screen, or metadata search may also be displayed on the user interface. In yet another embodiment, icons relating to recognition tools such as advanced voice recognition, natural language processing (NLP), fingerprinting and other such tools may also be displayed on the user interface. Icons relating to filters, lenses, in-video shopping, avatars, and gesture control may also be displayed on the user interface. In still another embodiment, icons relating to management of cookies, profiling, DVR capability, recommendations, and closed captioning may also be displayed on the user interface. In another embodiment, personalized search, parental control, subtitling in foreign languages and second screen may also be displayed as icons on the user interface. In other embodiments, automated tasks, gaming features and more may also be displayed on the user interface. In some embodiments, at the bottom or top of the user interface screen, icons relating to muting, starting and stopping video, inviting other participants, listing the number of participants, sharing screen, chat, and recording features may also be displayed on the user interface.

Although icons, features and functionality, conferencing tools and other items may be depicted on a user interface for each of the participants of a conference call, it is likely that not all of the services displayed are actually being utilized by all the participants of the conference call. In another embodiment, some of the tools and features displayed on the user interface may be utilized by only one or a subset of the participants of the conference call and not by all the participants. As such, to reduce clutter of icons and features and functionalities displayed on the user interface, as depicted in FIG. 29, control circuitry determines which tools, features, and functionalities displayed are being utilized and takes appropriate actions.

Figure 29:
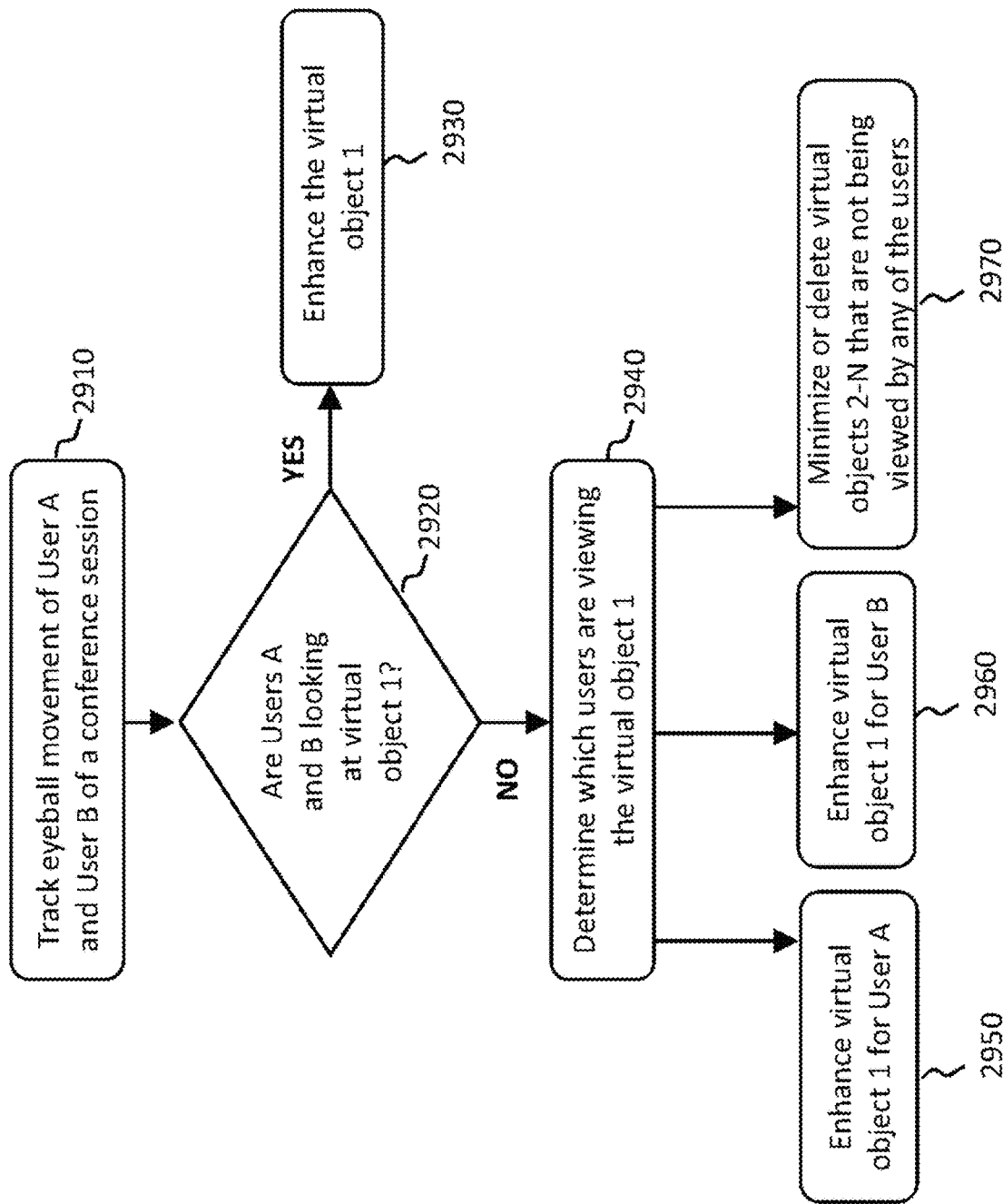
FIG. 29 is a flowchart of a process for determining utilization and engagement with virtual objects displayed on a conferencing interface based on user's gaze and taking appropriate actions, in accordance with some embodiments of the disclosure.

FIG. 29 is a flowchart of a process for determining utilization and engagement with virtual objects displayed on a conferencing interface based on user's gaze and taking appropriate actions, in accordance with some embodiments of the disclosure.

At block 2910, the control circuitry 3420 tracks eyeball movement of user A and user B of a conference call session. In this embodiment, the conference call session includes two users, user A and user B, and virtual objects 1-n. The control circuitry may access the camera associated with the electronic devices used by user A and user B to track such eyeball movement. For example, if the users are using a laptop or a mobile phone, then the control circuitry may access the inward-facing camera that is looking at the user to track the user's eyeball movement.

At block 2920, having tracked the eyeball movement of users A and B, the control circuitry determines whether users A and B are looking at the same virtual object, i.e., virtual object 1, on their conferencing user interface. The control circuitry may determine that the users are looking at virtual object 1 based on the direction of their gaze towards a virtual object 1, which can be tracked based on their eyeball movement.

In one embodiment, a user looking/gazing at a virtual object is associated with the user being engaged with or interested in the virtual object. In another embodiment, the user may need to be gazing at the virtual object for at least a threshold period of time to conclude that the user is engaged with or interested in the virtual object. Such threshold period of time may be used to distinguish between an accidental gaze and an intentional gaze, where the accidental gaze is typically shorter than the intentional gaze or sustained gaze upon seeing a virtual object of interest. In another embodiment, only if the gaze exceeds a threshold period of time will the user be determined to be engaged with or interested in the virtual object, and any gaze that does not exceed the threshold level, which may be a predetermined time, will not be associated with the user being engaged or interested in the virtual object.

At block 2930, in response to determining that both users A and B are looking/gazing at the same virtual object 1, the control circuitry 3420 may enhance virtual object 1 on the conferencing user interface displayed on both users A and B's electronic devices. Since all of the users of the virtual conferencing session are looking at virtual object 1, the control circuitry may interpret this as a tool or function that is important to the users of the conferencing session that is or will be utilized by them and as such decide to enhance the virtual object for better visibility and access. The enhancements may include changes in the size, geometric properties, color, texture, pose, background, depth, border, shading, and view from different angles of virtual object 1. The enhancements may also include animating virtual object 1. Other enhancements, such as those described in FIG. 13, may also be applied.

At block 2940, in response to determining that not all users of the conferencing session are looking at the same virtual object, the control circuitry may determine which users, from the total number of users in the conferencing session, are viewing virtual object 1.

At block 2950, the control circuitry may determine that user A is the only participant of the conferencing session that is looking at virtual object 1. As such, the control circuitry may enhance virtual object 1 only on the conferencing user interface displayed on the screen of user A's electronic device.

At block 2960, the control circuitry 3420 may determine that user B is the only participant of the conferencing session that is looking at virtual object 1. As such, the control circuitry may enhance virtual object 1 only on the conferencing user interface displayed on the screen of user B's electronic device.

In one embodiment where an "N" number of virtual objects are displayed, the same process would be repeated for all the virtual objects 2-N to determine if any one of the participants or all of the participants of the conferencing call session are gazing at any one or more of the displayed virtual objects 2-N.

At block 2970, in one embodiment, in response to determining that none of the participants of the conferencing call session is gazing at virtual objects 2-N the control circuitry may either minimize virtual objects 2-N or delete them from that conferencing user interface displayed on the screen of each participant's electronic device.

In some embodiments, the conferencing session may include several participants, such as the conferencing session depicted in FIG. 28. The process described in FIG. 29 may also be applied to such a conferencing session where several participants are involved. At block 2970, when several participants are involved, in one embodiment, the control circuitry may determine whether a majority of the participants have gazed on a particular virtual object, such as virtual object 2. In response to determining that a majority of the participants of the conference call session, but not all of the participants, have gazed at virtual object 2, the control circuitry may determine that virtual object 2 is important to this conferencing session and as such enhance virtual object 2 for all of the participants on the user interfaces displayed on their electronic devices. Such enhancement of virtual object 2 may be displayed even on the user interfaces of those participants that have not gazed on virtual object 2, since a majority may deem the tool as important to the conference call. Other factors, besides having a majority, may also be considered in determining whether to enhance a virtual object only on the user interfaces of the participants that have gazed at the virtual object or on all the user interfaces of all of the participants of the conferencing call, regardless of their gazes. For example, other factors may include key participants of the conferencing session gazing at the virtual object, managers or hosts of the conferencing session gazing at the virtual object, a moderator of the conferencing session gazing at the virtual object, and a leader of a specific topic gazing at the virtual object.

Figure 30:
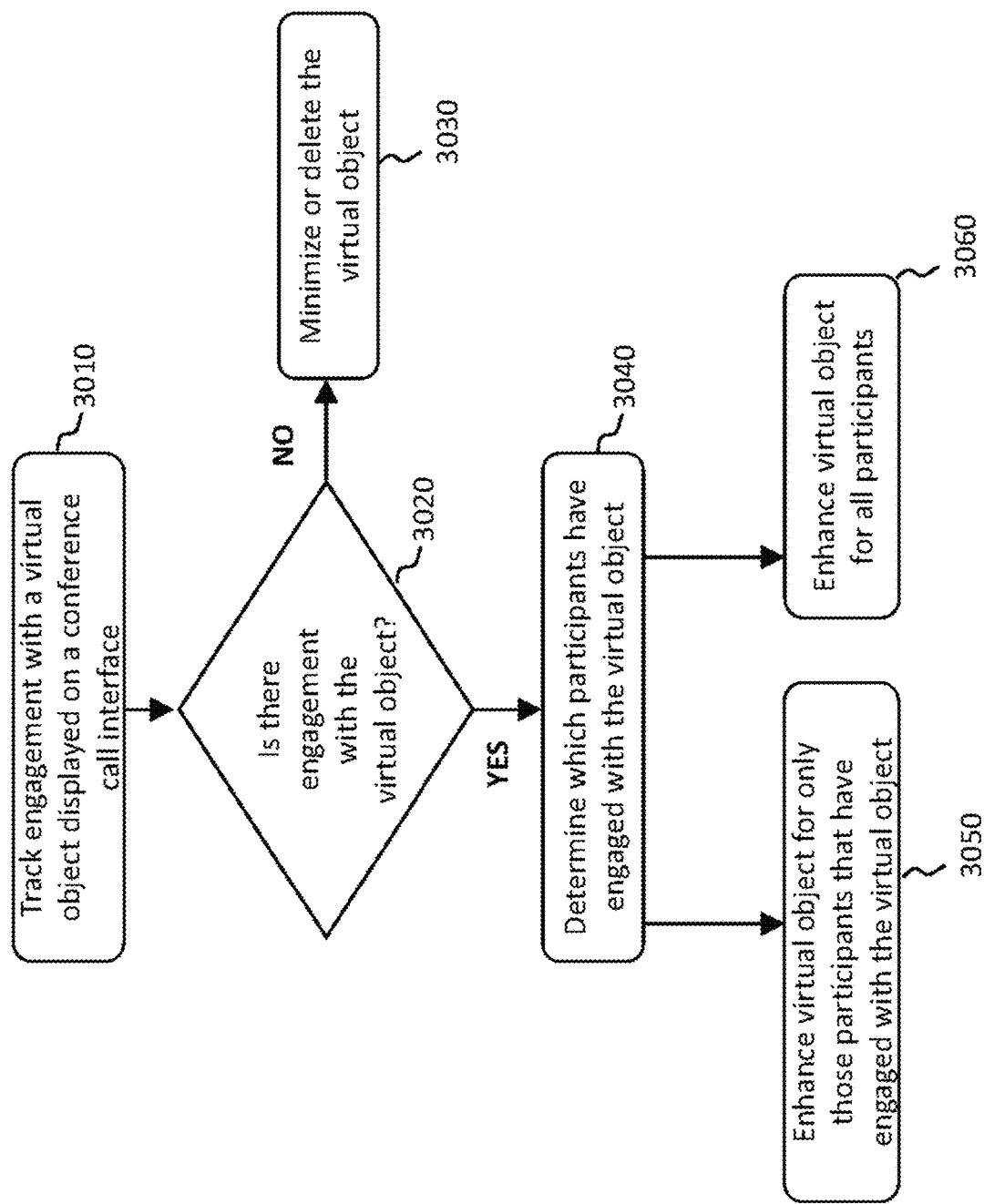
FIG. 30 is a flowchart of a process for determining utilization and engagement with virtual objects displayed on a conferencing interface based on engagement and taking appropriate actions, in accordance with some embodiments of the disclosure.

FIG. 30 is a flowchart of a process for determining utilization and engagement with virtual objects displayed on a conferencing interface based on engagement and taking appropriate actions, in accordance with some embodiments of the disclosure.

At block 3010, the control circuitry, such as control circuitry 3420 of FIG. 34, tracks engagement of users/participants of a conference call session with virtual objects displayed on their conference call interfaces. To determine engagement, the control circuitry may access various components of the electronic device being used by the conference call participant. For example, such components may include a computer mouse, a track pad, and touchscreen components. By accessing such components, the control circuitry may determine whether a participant has hovered over a virtual object; has selected a virtual object using a mouse, trackpad or touchscreen'; or is keeping the virtual object open on their electronic device.

At block 3020, the control circuitry determines whether there is engagement with the virtual object. As described above, this can be through a participant hovering over a virtual object with their computer mouse; selecting the virtual object using a mouse, trackpad or touchscreen'; keeping the application that is associated with the virtual object open on their electronic device; or having recently opened and closed the application.

At block 3030, in response to determining that there has been no engagement, or minimal engagement according to certain embodiments, with the virtual object, the control circuitry 3420 may minimize or delete the virtual object from the user interface of the participant. In some embodiments, where the conferencing session includes several participants, such as the conferencing session depicted in FIG. 28, even though only a few of the participants have engaged with the virtual object, the control circuitry may determine that the virtual object is important to this conferencing session and as such enhance virtual object for all of the participants on the user interfaces displayed on their electronic devices. Factors that lead to enhancing the virtual object despite a user not engaging with it may include a majority of participants of the same conferencing session engaging with the virtual object, key participants of the conferencing session engaging with the virtual object, managers or hosts of the conferencing session engaging with the virtual object, a moderator of the conferencing session engaging with the virtual object, and a leader of a specific topic engaging with the virtual object.

At block 3030, in a scenario where not all the users of the virtual conferencing session have engaged with the virtual object, the control circuitry may determine which participants, from the total number of participants in the conferencing session, have engaged with the virtual object.

At block 3050, the control circuitry may enhance the virtual object for only for those participants that have engaged with the virtual object. The enhancements may include change in the size, geometric properties, color, texture, pose, background, depth, border, shading, and view from different angles of the virtual object. The enhancement may also include animating the virtual object. Other enhancements, such as those described in FIG. 13, may also be applied.

As mentioned above, the control circuitry 3420 may determine that the virtual object is important to this conferencing session and as such, at block 3060, enhance the virtual object for all the participants on the user interfaces displayed on their electronic devices, regardless of their engagement with the virtual object.

Figure 31:
FIG. 31 is a screenshot of a virtual conference call having a reduced set of virtual objects, in accordance with some embodiments of the disclosure.

FIG. 31 is a screenshot of a virtual conference call having a reduced set of virtual objects, in accordance with some embodiments of the disclosure. In one embodiment, having undergone a process of determining engagement with or gaze towards a virtual object, such as the processes described in FIGS. 29 and 30, the control circuitry may delete all the virtual objects that are not being utilized or deemed important to the conferencing session. FIG. 31 displays an example of a user interface that may have started out as the user interface with virtual objects depicted in FIG. 28 and reduced to only those virtual objects with which the participants of the conferencing session have engaged or towards which they have gazed. Reducing such unused or underutilized virtual objects from the user interface provides for a cleaner and less cluttered display of the interface such that participants may easily view and access those virtual objects that are of interest to them.

Figure 32:
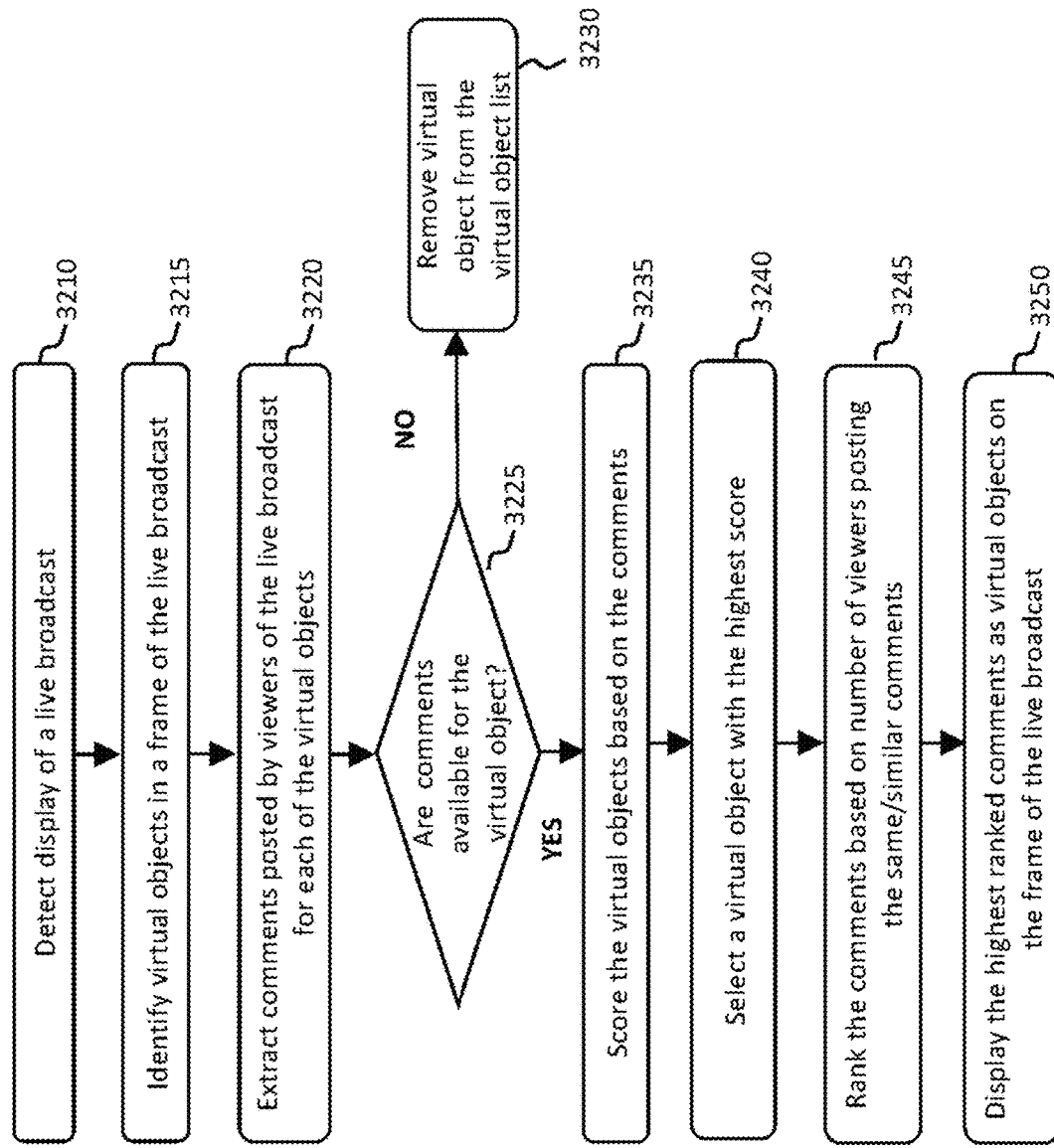
FIG. 32 is a flowchart of a process for extracting and posting virtual objects on the frame of a live broadcast, in accordance with some embodiments of the disclosure.

FIG. 32 is a flowchart of a process for extracting and posting virtual objects on the frame of a live broadcast, in accordance with some embodiments of the disclosure. At block 3210, the control circuitry, such as control circuitry 3420 of FIG. 34, detects the display of a live broadcast on a media device. The media device may be a mobile phone, a television set, a smart TV, a tablet or any other electronic device having a display.

At block 3215, the control circuitry identifies virtual objects in a frame of the live broadcast. For example, if a live broadcast includes a presidential address being given by the president of the United States, the control circuitry may detect virtual objects such as the President, the desk at which the President is sitting during the presidential address and any text displayed on the frame of the live broadcast, such as "Breaking news" or "White House address," or "XYZ News," as depicted in block 21 of FIG. 2 or in FIG. 33.

The control circuitry 3420 may also detect several other virtual objects such as a lamp, drawers of a desk, and surroundings in the frame such as a plant, curtains, carpet, etc. In one embodiment, the control circuitry may execute an AI algorithm to determine which of the virtual objects are relevant and important and which are to be discarded. For example, the AI algorithm may determine that surrounding objects such as a lamp, carpet, curtains, and the like, are not relevant or important to the user. The AI algorithm may also obtain any data from prior consumption history or data executed by an ML algorithm to determine if the user has indicated any surrounding items as of interest in the past. Based on the analysis performed by the AI algorithms and ML algorithms, the control circuitry may narrow the list of virtual objects to those virtual objects that are relevant and important.

At block 3220, the control circuitry may extract comments posted by other viewers of the same live broadcast for each of the virtual objects identified at block 3215. The control circuitry may access a variety of platforms, such as social media platforms, such as Twitter™ or Facebook™. The control circuitry may also obtain comments from a live comments section, such as the comments section in a YouTube™ live broadcast. It may also obtain comments from any devices associated with the user, such as the user's SMS, MMS, or WhatsApp™ feed.

At block 3225, for each of the virtual objects identified at block 3215, the control circuitry 3420 may determine if any comments are available for the virtual object. For those virtual objects for which no comments are available because no viewer has posted any comments, the control circuitry, at block 3230, may remove such virtual objects from the list of identified virtual objects or rank them lower in order as compared to those virtual objects that include comments.

At block 3235, in response to determining that comments are available for the one or more virtual objects, the control circuitry may score all the virtual objects for which comments are available. In one embodiment, the score may be calculated based on the number of comments for each virtual object. For example, if 61 people commented on a virtual object associated with "Breaking News," and 79 people commented on a virtual object associated with "Donald Trump," then "Breaking News" would receive a score of 61 and "Donald Trump" would receive a score of 79.

At block 3240, the control circuitry may select one or more virtual objects based on their score. For example, in some embodiments, the control circuitry may select only the highest scored virtual object. In another embodiment, the control circuitry may select the top two or three that scored the highest. In yet another embodiment, the control circuitry may select a virtual object that scored among the highest and is of interest to the user. The control circuitry may access the user's profile to determine what is of interest to the user. In some embodiments, user interest may be calculated based on prior consumption history of the user or based on any of the categories indicating interest as depicted in FIG. 7.

At block 3245, for the virtual object selected at block 3240, the control circuitry may obtain all the comments that are posted by other viewers. In one embodiment, if the virtual object selected is "Donald Trump" at block 3240, then virtual comments posted for "Donald Trump" may be 1) "Another Tweet today," 2) "Greatest president," 3) "COVID response," 4) "Dangerous," 5) "Tariffs on China," and 6) "Running for a $2^{nd}$ term," as depicted in FIG. 33.

Figure 33:
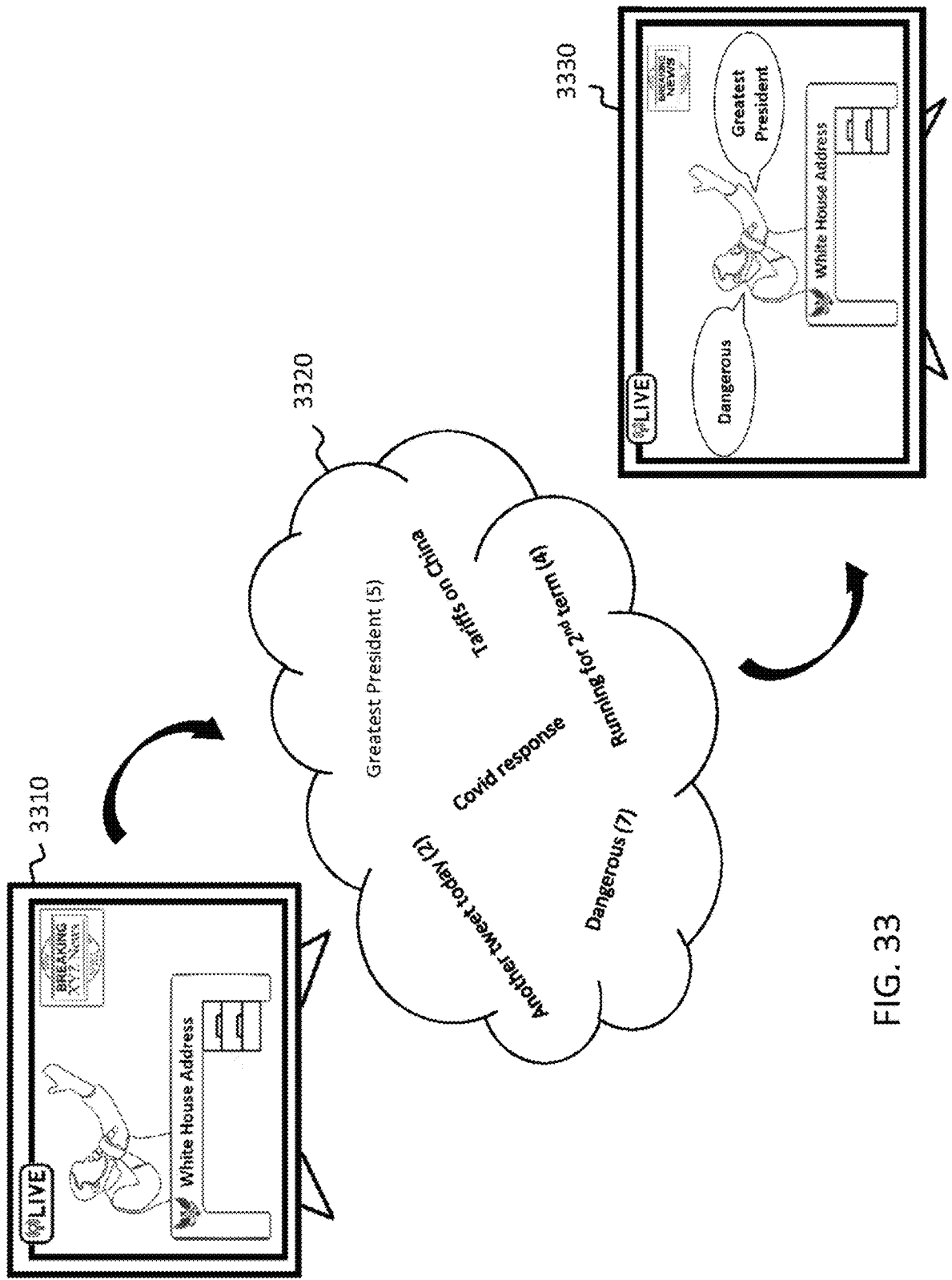
FIG. 33 is block diagram of determining virtual objects to display based on their score, in accordance with some embodiments of the disclosure.

As displayed in block 3320 of FIG. 33, the control circuitry may score or rank the comments based on the number of similar comments. An AI algorithm may be used to determine which comments are similar and can be grouped together. As depicted in FIG. 33, the comments posted for the virtual object associated with "Donald Trump" received the following scores: 1) "Another Tweet today" received a score of 2 since two viewers made the same or similar comments that can be associated with the comment "Another Tweet today"; 2) "Greatest president" received a score of 5 since five viewers made the same or similar comments that can be associated with the comment "Greatest president"; 3) "COVID response" received a score of 1 since only one viewer made such a comment; 4) "Dangerous" received a score of 7 since seven viewers made the same or similar comments that can be associated with the comment "Dangerous"; 5) "Tariffs on China" received a score of 1 since only one viewer made such a comment; and 6) "Running for a $2^{nd}$ term" received a score of 4 since four viewers made the same or similar comments that can be associated with the comment "Running for a $2^{nd}$ term." As such, comments relating to "Dangerous" and "Greatest president" received the highest scores of 7 and 5, respectively. The process, in one embodiment, starts at block 3310, obtained comments at 3320, and then displays selected comments at block 3330.

In another embodiment, at block 3320, the control circuitry may obtain all the comments associated with a virtual object. The control circuitry may then execute an AI algorithm to aggregate all comments that are contextually similar into groups. For example, the AI algorithm may generate three groups, Group A, Group B, and Group C, and place comments that are contextually similar in that group. Comments in Group A may include 1) Greatest President, 2) Donald is great, 3) Best President so far, 4) Greatest President, 5) He is a great President, 6) Isn't he great, 7) Greatest President. The AI algorithm may have aggregated these comments based on their being contextually similar to each other. The AI algorithm may then provide a representative comment from the group of similar comments that can be used for overlaying on the frame of the live broadcast. In one embodiment, the representative comment may be the comments are the same and highest in number, such as "Greatest president," which was commented by three users and is exactly the same in its phraseology. In another embodiment, if no two comments are exactly the same, then the AI algorithm may suggest a representative comment that captures the essence of all the comments in the group. Grouping comments and using a representative comment helps in overlaying only a single comment, or few comments, and not cluttering the frame with all the comments that may be contextually similar.

Referring back to block 3245, once the comments have been scored and ranked, then at block 3250 the control circuitry 3420 made display the comments having the highest score or rank as virtual objects on the frame of the live broadcast. One example of such display of overlaying the virtual objects is depicted in block 3330 of FIG. 33.

The control circuitry may determine whether the post one comment or more than one comment based on a space analysis of space available on the frame of the live broadcast. The control circuitry may also review any policies or restrictions that allow or prevent posting of certain virtual objects on the frame of the live broadcast. The control circuitry may also access a policy module to determine what can and cannot be displayed, such as the policy module depicted in FIG. 9. The control circuitry may also determine if there are any space and location guidelines, allowances, or restrictions for posting virtual objects, such as similar to those indicated in FIG. 10.

Figure 35:
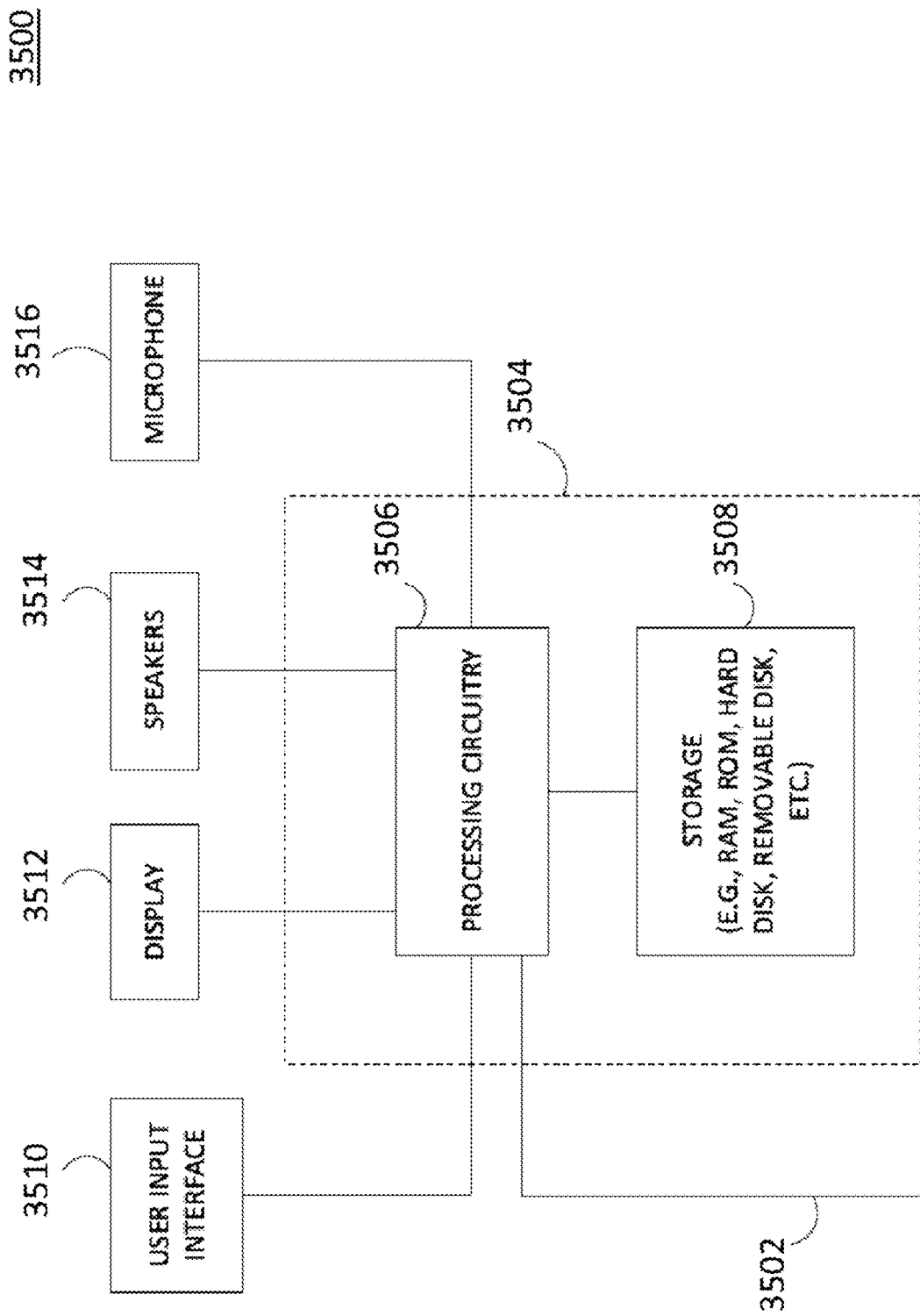
FIG. 35 is a block diagram of a generalized media device, in accordance with some embodiments of the disclosure.

FIGS. 34-35 describe exemplary devices, systems, servers, and related hardware that may be used to implement processes, functions, and functionalities described in relation to FIGS. 2, 32-33.

FIGS. 34-35 may also be used for analyzing surfaces, scoring virtual objects, analyzing policies, overlaying virtual objects, providing virtual object enhancements, detecting live broadcast transmissions, identifying virtual objects in a live broadcast or in an on-demand media asset, obtaining comments posted by viewers, overlaying virtual objects in a frame of a live broadcast or in an on-demand media asset, identifying users of a conference call, identifying icons and all tools, functions, and functionalities displayed on an interface of a participant of a conference call, accessing components of electronic devices, such as cameras, gyroscopes, accelerometers, heart rate monitors, enhancing or removing tools, functions, and functionalities displayed on an interface of a participant of a conference call, invoking an AI or ML algorithm to perform an analysis on any of the above mentioned data, accessing user's consumption history, gauging user's interest in a virtual object, accessing virtual, mixed, or augmented reality headsets and their displays, animating virtual objects, and all the functionalities discussed associated with the figures mentioned in this application.

In the system 3400, there can be more than one user equipment device 3402 but only one is shown in FIG. 34 to avoid overcomplicating the drawing. In addition, a user may utilize more than one type of user equipment device and more than one of each type of user equipment device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 3406.

The user equipment devices may be coupled to communications network 3406. Namely, the user equipment device 3402 is coupled to the communications network 3406 via communications path 3404. The communications network 3406 may be one or more networks including the Internet, a mobile-phone network, mobile-voice or data network (e.g., a 4G, 5G, or LTE network), cable network, public switched telephone network, or other types of communications network or combinations of communications networks. The path 3404 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 3404 can be a wireless path. Communication with the user equipment device may be provided by one or more communications paths but is shown as a single path in FIG. 34 to avoid overcomplicating the drawing.

The system 3400 also includes media asset sources, such as video asset sources 3412, and one or more servers 3414, which can be coupled to any number of databases providing information to the user equipment devices. The information sources 3412 represent any computer-accessible sources, such as servers, databases, platforms (such as video sharing platforms) that store media assets, such as video assets. The server 3414 may store and execute various software modules, such as for example for providing interactive tools for analyzing surfaces, scoring virtual objects, analyzing policies, overlaying virtual objects, providing virtual object enhancements, detecting live broadcast transmissions, identifying virtual objects in a live broadcast or in an on-demand media asset, obtaining comments posted by viewers, overlaying virtual objects in a frame of a live broadcast or in an on-demand media asset, identifying users of a conference call, identifying icons and all tools, functions, and functionalities displayed on an interface of a participant of a conference call, accessing components of electronic devices, such as cameras, gyroscopes, accelerometers, heart rate monitors, enhancing or removing tools, functions, and functionalities displayed on an interface of a participant of a conference call, invoking an AI or ML algorithm to perform an analysis on any of the above mentioned data, accessing user's consumption history, gauging user's interest in a virtual object, accessing virtual, mixed, or augmented reality headsets and their displays, animating virtual objects, and all the functionalities discussed associated with the figures mentioned in this application.

In some embodiments, the user equipment device 3402, media asset sources 3412, and server 3414 may store metadata associated with media assets. In some embodiments, the server may transmit a command to cause the display of a user interface on the display screen of a media asset device. The user interface may be used by the user to select preferences, execute commands, and approve or reject suggested preferred names. The user interface may also be used by the system to obtain user profiles or user consumption history.

FIG. 35 shows a generalized embodiment of a user equipment device 3500, in accordance with one embodiment. In an embodiment, the user equipment device 3500, is the same user equipment device 3402 of FIG. 34. The user equipment device 3500 may receive content and data via input/output (I/O) path 3502. The I/O path 3502 may provide audio content (e.g., broadcast programming, on-demand programming, Internet content, content available over a local area network (LAN) or wide area network (WAN), and/or other content) and data to control circuitry 3504, which includes processing circuitry 3506 and a storage 3508. The control circuitry 3504 may be used to send and receive commands, requests, and other suitable data using the I/O path 3502. The I/O path 3502 may connect the control circuitry 3504 (and specifically the processing circuitry 3506) to one or more communications paths. I/O functions may be provided by one or more of these communications paths but are shown as a single path in FIG. 35 to avoid overcomplicating the drawing.

The control circuitry 3504 may be based on any suitable processing circuitry such as the processing circuitry 3506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The providing of interactive tools for analyzing surfaces, scoring virtual objects, analyzing policies, overlaying virtual objects, providing virtual object enhancements, detecting live broadcast transmissions, identifying virtual objects in a live broadcast or in an on-demand media asset, obtaining comments posted by viewers, overlaying virtual objects in a frame of a live broadcast or in an on-demand media asset, identifying users of a conference call, identifying icons and all tools, functions, and functionalities displayed on an interface of a participant of a conference call, accessing components of electronic devices, such as cameras, gyroscopes, accelerometers, heart rate monitors, enhancing or removing tools, functions, and functionalities displayed on an interface of a participant of a conference call, invoking an AI or ML algorithm to perform an analysis on any of the above mentioned data, accessing user's consumption history, gauging user's interest in a virtual object, accessing virtual, mixed, or augmented reality headsets and their displays, animating virtual objects, and all the functionalities discussed associated with the figures mentioned in this application can be at least partially implemented using the control circuitry 3504. The processes as described herein may be implemented in or supported by any suitable software, hardware, or combination thereof. They may also be implemented on user equipment, on remote servers, or across both.

In client-server-based embodiments, the control circuitry 3504 may include communications circuitry suitable for analyzing surfaces, scoring virtual objects, analyzing policies, overlaying virtual objects, providing virtual object enhancements, detecting live broadcast transmissions, identifying virtual objects in a live broadcast or in an on-demand media asset, obtaining comments posted by viewers, overlaying virtual objects in a frame of a live broadcast or in an on-demand media asset, identifying users of a conference call, identifying icons and all tools, functions, and functionalities displayed on an interface of a participant of a conference call, accessing components of electronic devices, such as cameras, gyroscopes, accelerometers, heart rate monitors, enhancing or removing tools, functions, and functionalities displayed on an interface of a participant of a conference call, invoking an AI or ML algorithm to perform an analysis on any of the above mentioned data, accessing user's consumption history, gauging user's interest in a virtual object, accessing virtual, mixed, or augmented reality headsets and their displays, animating virtual objects, and all related functions and processes as described herein. The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 3508 that is part of the control circuitry 3504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 3508 may be used to store virtual objects, policies, virtual object enhancements, comments posted by viewers, user information of users of a conference call, icons and all tools, functions, and functionalities displayed on an interface of a participant of a conference call, AI or ML algorithms, user's consumption history, user profile that include user's interest in a virtual object, and data associated with all the functionalities and processes discussed herein. Cloud-based storage, described in relation to FIG. 34, may be used to supplement the storage 3508 or instead of the storage 3508.

The control circuitry 3504 may include audio generating circuitry and tuning circuitry, such as one or more analog tuners, audio generation circuitry, filters or any other suitable tuning or audio circuits or combinations of such circuits. The control circuitry 3504 may also include scaler circuitry for upconverting and down converting content into the preferred output format of the user equipment device 3500. The control circuitry 3504 may also include digital-to-analog converter circuitry and analog-to-digital converter circuitry for converting between digital and analog signals. The tuning and encoding circuitry may be used by the user equipment device 3500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 3508 is provided as a separate device from the user equipment device 3500, the tuning and encoding circuitry (including multiple tuners) may be associated with the storage 3508.

The user may utter instructions to the control circuitry 3504, which are received by the microphone 3516. The microphone 3516 may be any microphone (or microphones) capable of detecting human speech. The microphone 3516 is connected to the processing circuitry 3506 to transmit detected voice commands and other speech thereto for processing. In some embodiments, voice assistants (e.g., Siri, Alexa, Google Home and similar such voice assistants) receive and process the voice commands and other speech.

The user equipment device 3500 may include an interface 3510. The interface 3510 may be any suitable user interface, such as a remote control, mouse, trackball, keypad, keyboard, touch screen, touchpad, stylus input, joystick, or other user input interfaces. A display 3512 may be provided as a stand-alone device or integrated with other elements of the user equipment device 3500. For example, the display 3512 may be a touchscreen or touch-sensitive display. In such circumstances, the interface 3510 may be integrated with or combined with the microphone 3516. When the interface 3510 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 3510 may be HDTV-capable. In some embodiments, the display 3512 may be a 3D display. The speaker (or speakers) 3514 may be provided as integrated with other elements of user equipment device 3500 or may be a stand-alone unit. In some embodiments, the display 3512 may be outputted through speaker 3514.

The user equipment device 3500 of FIG. 35 can be implemented in system 3400 of FIG. 34 as user equipment device 3402, but any other type of user equipment suitable for analyzing surfaces, scoring virtual objects, analyzing policies, overlaying virtual objects, providing virtual object enhancements, detecting live broadcast transmissions, identifying virtual objects in a live broadcast or in an on-demand media asset, obtaining comments posted by viewers, overlaying virtual objects in a frame of a live broadcast or in an on-demand media asset, identifying users of a conference call, identifying icons and all tools, functions, and functionalities displayed on an interface of a participant of a conference call, accessing components of electronic devices, such as cameras, gyroscopes, accelerometers, heart rate monitors, enhancing or removing tools, functions, and functionalities displayed on an interface of a participant of a conference call, invoking an AI or ML algorithm to perform an analysis on any of the above mentioned data, accessing user's consumption history, gauging user's interest in a virtual object, accessing virtual, mixed, or augmented reality headsets and their displays, animating virtual objects, and all the functionalities discussed associated with the figures mentioned in this application The user equipment device 3500 of any other type of suitable user equipment suitable may also be used to implement ML and AI algorithms, and related functions and processes as described herein. For example, user equipment devices such as television equipment, computer equipment, wireless user communication devices, or similar such devices may be used. User equipment devices may be part of a network of devices. Various network configurations of devices may be implemented and are discussed in more detail below.

Figure 36:
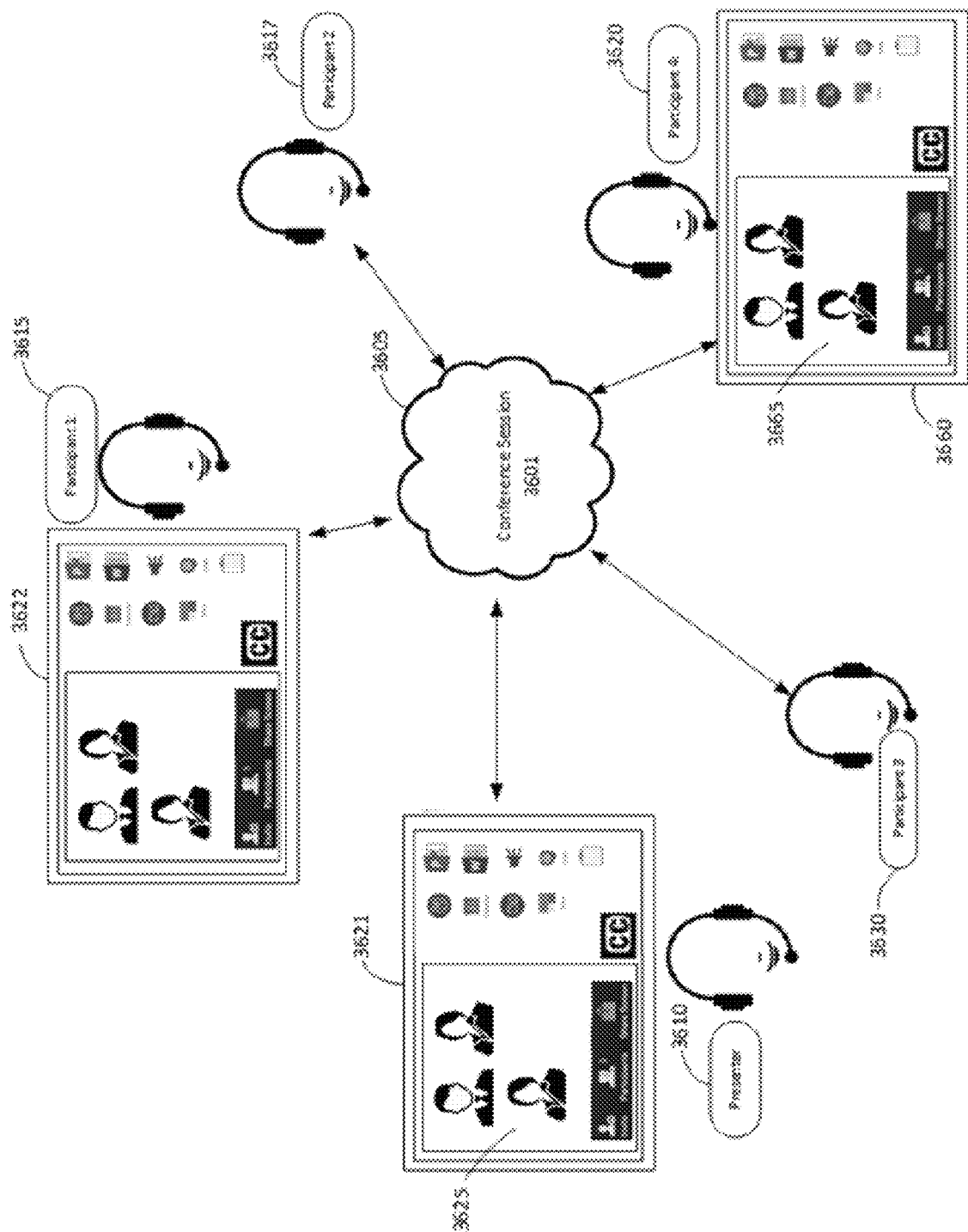
FIG. 36 is block diagram of an example conference call system, in accordance with some embodiments of the disclosure.

FIG. 36 is block diagram of an exemplary conference call, in accordance with some embodiments of the disclosure. The conference call session includes a total of 5 participants 3610, 3615, 3617, 3620, and 3630 that are connected with each other over conference session 3601. In some embodiments the conference call may have a presenter, a leader, or a moderator. In other embodiments there may be a different number or participants.

In some embodiments, each participant may use an electronic device, such as electronic device 3621, during the conference session 3600. The electronic device 3621 may include a graphic user interface having a display. The system, such as the system depicted in FIG. 34 or 35, through its control circuitry, may cause the display on the graphic user interface which depicts the participants of the conference session as well as conferencing tools and documents used or shared in the conference session.

In some embodiments, all the participants may have a graphic user interface on their electronic device and in other embodiments they may be dialing into the conference using a phone system that does not have a graphic user interface. The embodiments described herein primarily to participants using electronic devices having a display screen. As depicted, the control circuitry 3428 displays the conference tools and live feed image of all the participants in the conference session to all the participants.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A system for overlaying a virtual object in a virtual environment on a surface area comprising:
communication circuitry; and
control circuitry configured to:
 detect that a live image of the surface area is displayed by a portable electronic device that is in communication with the system via the communication circuitry;
 determine that a policy associated with the surface area permits overlaying of the virtual object on the surface area in the virtual environment, wherein the policy is generated by an owner of the surface area; and
 in response to determining that the policy permits the overlaying of the virtual object on top of the surface area:
  determine a portion of the surface area that is permitted by the policy for overlaying the virtual object; and
  transmit, by the communication circuitry, a message to the portable electronic device to cause the portable electronic device to overlay the virtual object, on top of the live image of the surface area displayed by the portable electronic device, in the portion of the surface area that is permitted by the policy.

2. The system of claim 1, wherein overlaying the transmitted virtual object, over the live image of the surface area displayed by the portable electronic device, in the portion of the surface area that is permitted by the policy comprises, the control circuitry configured to:
access a field of view of a camera associated with the portable electronic device to provide the live image of the object having the surface area; and
overlay the virtual object on a display associated with the portable electronic device on the portion of the surface area that is in the field of view of the camera.

3. The system of claim 1, further comprising, the control circuitry configured to automatically enhance the virtual object overlayed in the portion of the surface area based on an interactivity factor associated with a user of the electronic device.

4. The system of claim 3, wherein the interactivity factor is the gaze of the user towards the virtual object.

5. The system of claim 3, further comprising, the control circuitry configured to animate the virtual object, wherein animating the virtual object further comprises, the control circuitry configured to:
detect a type of motion being performed by the user; and
animate the virtual object to mimic the same motion performed by the user.

6. The system of claim 3, wherein enhancing the virtual object further comprises, the control circuitry configured to:
calculating a score for the virtual object based on the interactivity factor; and
enhancing, using a selected enhancement option, the virtual object by a magnitude that correlates with the calculated score.

7. The system of claim 3, wherein enhancing the virtual object further comprises, the control circuitry configured to selecting an enhancement option from a group consisting of size, geometric properties, color, texture, pose, background, depth, animation, border, shading, and orientation of the virtual object.

8. The system of claim 1, further comprising, in response to determining that the policy permits the overlaying of the virtual object on the surface area, the control circuitry configured to:
- obtain a plurality of virtual objects;
- score each of the plurality of the obtained virtual objects; and
- select one or more virtual objects based on the calculated score for overlaying in the portion of the surface area that is permitted by the policy.

9. A method of overlaying a virtual object in a virtual environment on a surface area comprising:
- detecting that a live image of the surface area is displayed by a portable electronic device;
- determining that a policy associated with the surface area permits overlaying of the virtual object on the surface area in the virtual environment, wherein the policy is generated by an owner of the surface area; and
- in response to determining that the policy permits the overlaying of the virtual object on top of the surface area:
  - determining a portion of the surface area that is permitted by the policy for overlaying the virtual object; and
  - transmitting a message to the portable electronic device to cause the portable electronic device to overlay the virtual object, on top of the live image of the surface area displayed by the portable electronic device, in the portion of the surface area that is permitted by the policy.

10. The method of claim 9, wherein overlaying the virtual object, over the live image of the surface area displayed by the portable electronic device, in the portion of the surface area that is permitted by the policy comprises:
- accessing a field of view of a camera associated with the portable electronic device to provide the live image of the object having the surface area; and
- overlaying the virtual object on a display associated with the electronic device on the portion of the surface area that is in the field of view of the camera.

11. The method of claim 9, further comprising automatically enhancing the virtual object overlayed in the portion of the surface area based on an interactivity factor associated with a user of the electronic device.

12. The method of claim 11, wherein the interactivity factor is the gaze of the user towards the virtual object that is determined based on user interest, wherein the gaze of the user towards the virtual object is determined by an inward facing camera of the portable electronic device.

13. The method of claim 11, wherein enhancing includes animating the virtual object, wherein animating further comprises:
- detecting a type of motion being performed by the user; and
- animating the virtual object to mimic the same motion performed by the user.

14. The method of claim 13, wherein the motion being performed by the user is detected by accessing any one or more or a gyroscope, accelerometer, heartbeat monitor, and camera associated with the portable electronic device.

15. The method of claim 11, wherein enhancing the virtual object further comprises:
- calculating a score for the virtual object based on the interactivity factor; and
- enhancing, using a selected enhancement option, the virtual object by a magnitude that correlates with the calculated score.

16. The method of claim 11, wherein enhancing the virtual object further comprises selecting an enhancement option from a group consisting of size, geometric properties, color, texture, pose, background, depth, animation, border, shading, and orientation of the virtual object.

17. The method of claim 9, further comprising, in response to determining that the policy permits the overlaying of the virtual object on the surface area:
- obtaining a plurality of virtual objects;
- scoring each of the plurality of the obtained virtual objects; and
- selecting one or more virtual objects based on the calculated score for overlaying in the portion of the surface area that is permitted by the policy.

18. The method of claim 17, wherein the one or more virtual objects, from the plurality of virtual objects, having the highest score are selected for overlaying.

19. The method of claim 9, wherein the policy defines a duration of time for which the virtual object may be overlayed on the surface.

20. A method comprising:
- detecting, by a processor of an electronic device, a display of a virtual object on a display screen of a portable mixed reality, virtual reality, or augmented reality device, wherein the virtual object is overlayed on top of a surface viewed in real-time by the electronic device, wherein the overlay of the virtual object on the surface is in compliance with a policy associated with the surface;
- determining to modify the displayed virtual object, wherein the determination is based on a calculated score of a plurality of factors relating to user interest; and
- in response to determining to modify the virtual object:
  - modifying one or more attributes of the virtual object;
  - transmitting the virtual object with the modified one or more attributes to the portable mixed reality, virtual reality, or augmented reality device; and
  - rendering the modified virtual object as an overlay on the surface.

21. The method of claim 20, wherein, the rendering of the modified virtual object as an overlay on the surface is performed when the surface is in the field of view of the mixed reality, virtual reality, or augmented reality device.

22. The method of claim 20, further comprising:
- accessing the virtual object, from a plurality of virtual objects, stored in one or more databases;
- calculating an interest score for the virtual object based on prior consumption history; and
- selecting the virtual object to be displayed on the display of the portable mixed reality, virtual reality, or augmented reality device if the interest score exceeds an interest score threshold.

* * * * *